(12) United States Patent
Kanatzidis et al.

(10) Patent No.: US 11,857,944 B2
(45) Date of Patent: Jan. 2, 2024

(54) METAL ORGANIC RESINS WITH ZIRCONIUM NODES

(71) Applicant: Northwestern University, Evanston, IL (US)

(72) Inventors: Mercouri G. Kanatzidis, Wilmette, IL (US); Debajit Sarma, Chicago, IL (US); Emmanouil Manos, Ioannina (GR)

(73) Assignee: Northwestern University, Evanston, IL (US)

( * ) Notice: Subject to any disclaimer, the term of this patent is extended or adjusted under 35 U.S.C. 154(b) by 195 days.

(21) Appl. No.: 17/315,833

(22) Filed: May 10, 2021

(65) Prior Publication Data

US 2021/0299634 A1 Sep. 30, 2021

Related U.S. Application Data

(63) Continuation of application No. 15/772,385, filed as application No. PCT/US2016/061241 on Nov. 10, 2016, now Pat. No. 11,020,724.

(60) Provisional application No. 62/253,425, filed on Nov. 10, 2015.

(51) Int. Cl.

| | |
|---|---|
| *B01J 20/22* | (2006.01) |
| *B01D 53/02* | (2006.01) |
| *B01J 41/08* | (2017.01) |
| *B01J 20/32* | (2006.01) |
| *B01J 41/12* | (2017.01) |
| *B01J 41/05* | (2017.01) |
| *C08L 5/04* | (2006.01) |
| *B01J 47/018* | (2017.01) |
| *B01J 47/02* | (2017.01) |

(52) U.S. Cl.
CPC ............ *B01J 20/226* (2013.01); *B01D 53/02* (2013.01); *B01J 20/3206* (2013.01); *B01J 20/3208* (2013.01); *B01J 20/3274* (2013.01); *B01J 41/05* (2017.01); *B01J 41/08* (2013.01); *B01J 41/12* (2013.01); *C08L 5/04* (2013.01); *B01D 2253/204* (2013.01); *B01D 2253/206* (2013.01); *B01J 47/018* (2017.01); *B01J 47/02* (2013.01)

(58) Field of Classification Search
CPC . B01J 20/226; B01J 41/05; B01J 41/12; B01J 20/3206; B01J 20/3208; B01J 20/3274; C08L 5/04
See application file for complete search history.

(56) References Cited

U.S. PATENT DOCUMENTS

| | | | | |
|---|---|---|---|---|
| 8,764,887 B2 ‡ | 7/2014 | Dinca | ........... | C25D 17/002 96/4 |
| 9,114,348 B2 * | 8/2015 | Hafizovic | ........... | C07C 63/15 |
| 2009/0198079 A1 ‡ | 8/2009 | Schubert | ........... | C07F 7/003 556/55 |
| 2014/0178504 A1 ‡ | 6/2014 | Reynolds | ........... | A61L 29/16 424/718 |
| 2015/0031908 A1 ‡ | 1/2015 | Bury | ........... | B01J 31/2239 558/374 |
| 2015/0144568 A1 ‡ | 5/2015 | Kanatzidis | ........... | B01J 39/09 210/681 |
| 2015/0217268 A1 ‡ | 8/2015 | Farha | ........... | B01J 20/3085 95/139 |
| 2016/0318773 A1 | 11/2016 | Wells et al. | | |
| 2021/0299607 A1 | 9/2021 | Xia et al. | | |

FOREIGN PATENT DOCUMENTS

| | | | |
|---|---|---|---|
| CN | 203728900 | ‡ | 7/2014 |
| CN | 104230035 | ‡ | 12/2014 |
| WO | WO2015048907 | ‡ | 4/2015 |
| WO | WO 2020/112899 A1 | | 6/2020 |

OTHER PUBLICATIONS

The International Search Report and the Written Opinion issued for international patent application No. PCT/US2021/58554 dated Mar. 18, 2022; pp. 1-11.

Taddei, "When defects turn into virtues: The curious case of zirconium-based metal-organic frameworks," *Coordination Chemistry Reviews*, vol. 343, pp. 1-24; available online Apr. 29, 2017; Abstract; Figure 2; p. 4, col. 1, para 2; p. 7, col. 2, para 1; p. 21 and col. 1, para 2; p. 21, col. 2, para 2; and the entire document.

\* cited by examiner
‡ imported from a related application

*Primary Examiner* — Yong L Chu
(74) *Attorney, Agent, or Firm* — BELL & MANNING, LLC

(57) ABSTRACT

Metal organic resins, composite materials composed of the metal organic resins, and anion exchange columns packed with the composite materials are provided. Also provided are methods of using the composite materials to remove metal anions from a sample, methods of using the metal organic resins as fluorescence sensors for detecting metal anions in a sample, and methods of making the metal organic resins and the composite materials. The metal organic resins are amine-functionalized metal organic frameworks and their associated counter anions. The composite materials are composed of metal organic resin particles coated with organic polymers, such as alginic acid polymers.

11 Claims, 36 Drawing Sheets

FIG. 14A
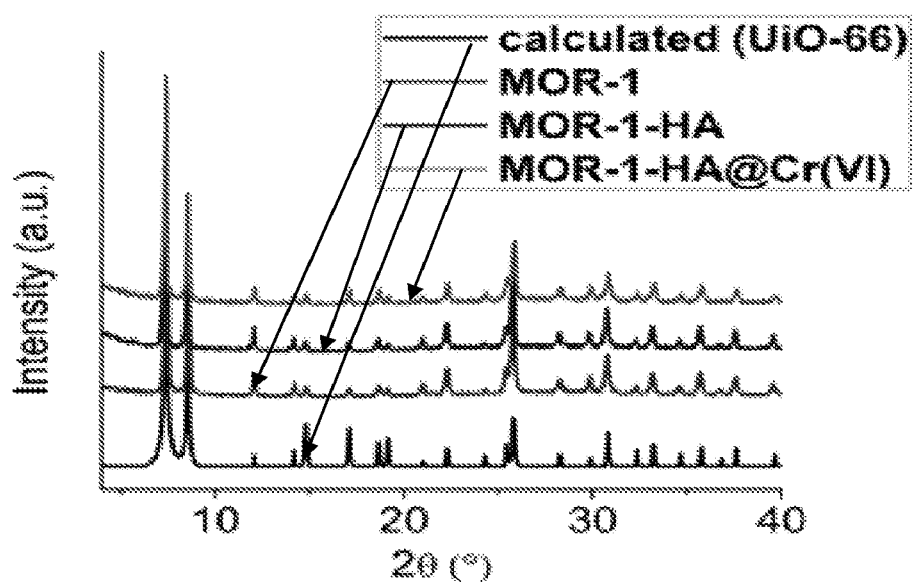
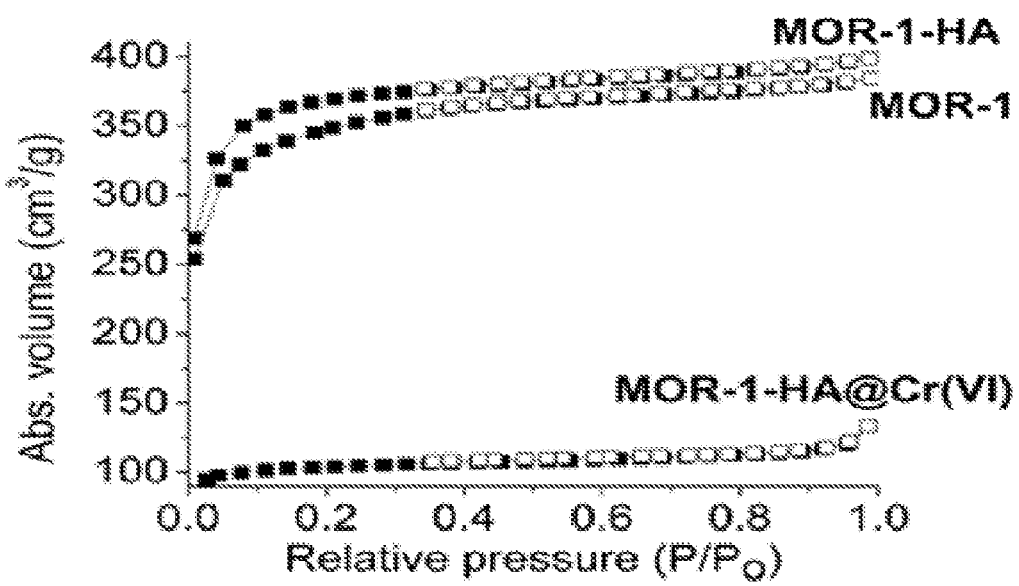
FIG. 14B

Wavelength / nm

METAL ORGANIC RESINS WITH ZIRCONIUM NODES

CROSS-REFERENCE TO RELATED APPLICATIONS

The present application is a continuation of U.S. patent application Ser. No. 15/772,385, now U.S. Pat. No. 11,020,724, that was filed Apr. 30, 2018, the entire contents of which are incorporated herein by reference, which is a National Stage of International Application number PCT/US2016/061241 that was on filed Nov. 10, 2016, the entire contents of which are hereby incorporated by reference, which claims priority to U.S. Provisional Patent Application No. 62/253,425 that was filed on Nov. 10, 2015, the entire contents of which are hereby incorporated by reference.

BACKGROUND

The contamination of water resources from toxic species represents a major cause of global concern. Among the most commonly found pollutants are various oxo-hydroxy anions. A characteristic example is Cr(VI)-oxo species, found as dichromate ($Cr_2O_7^{2-}$), hydrogen chromate ($HCrO_4^-$) or chromate ($CrO_4^{2-}$) ions, depending on the acidity/basicity of water. Cr(VI) is a well-known carcinogen that is released to the environment from the leather tanning, cement, electroplating, and dyes industries, among others. Commonly used and inexpensive methods such as precipitation of the ions from the solutions are not usually effective in lowering the concentration of Cr(VI) below the acceptable limits. They also generate large amounts of metal-containing sludge. Reduction of Cr(VI) to Cr(III) with photocatalytic or other methods results in a high concentration of Cr(III) ions in the solution, and thus a secondary treatment of the solution with a suitable sorbent is required to remove the generated $Cr^{3+}$ ions. Adsorption and ion exchange are considered highly effective and relatively inexpensive methods for the treatment of Cr(VI)-containing waste. Several sorbents have been tested for this purpose. Organic resins containing functional groups suitable for binding of specific cations or anions are the most widely used sorbents in various remediation processes and in the purification of drinking water. Commercially available resins with amine-functional groups have shown promising Cr(VI) sorption properties. Such materials, however, are not only relatively costly, but they also absorb Cr(VI) through reduction-precipitation of Cr(III) species, which is not strongly bound to resins and can be leached from these sorbents under mild acidic conditions. Thus, such resins are actually oxidized-decomposed by Cr(VI) and cannot be regenerated and reused. Furthermore, these Cr(III)-loaded resins are not safe for disposal as non-hazardous solid waste due to significant Cr(III) leaching. On the other hand, layered double hydroxides (LDHs), the typical inorganic anionic exchangers, are inexpensive, but show relatively slow sorption kinetics for Cr(VI) as well as limited selectivity for it in the presence of competitive ions.

Metal Organic Frameworks (MOFs) decorated with organic groups having strong binding affinity for toxic ions may be ideal sorbents for various remediation processes. Such functionalized materials, which can be prepared with facile methods and on a large scale, can be called Metal Organic Resins (MORs), since they combine the organic functionalities of the amorphous organic resins (strong binding groups) and the ordered porous structure of crystalline MOFs. Thus, MORs with a combination of functional-group based selectivity and a highly porous structure with a narrow pore size distribution favoring excellent sorption kinetics are expected to present unprecedented efficiencies in practical separation processes. So far, there are very few reports on MORs showing sorption capability for Cr(VI). These MORs are of limited porosity and, as a result, exhibit relatively slow sorption kinetics (ion-exchange equilibrium is reached after several hours). Furthermore, most of them display limited selectivity for Cr(VI) in the presence of excess of various competitive anions and no regeneration/reuse capability. In addition, all reported materials have been tested with batch methods and no studies on their use in columns have been carried out. Note that industrial wastewater processes require continuous bed flow ion exchange columns. A sorbent material, in order to be appropriate for use in columns, should display: a) high selectivity and fast sorption kinetics for the targeted toxic ion; b) particle size suitable to allow continuous flow of wastewater through the column; and c) good mechanical strength to withstand high water pressures. MORs and other porous materials are usually characterized by very small particle size and insufficient mechanical strength, which hinder their use in columns. Therefore, as-prepared MORs are not suitable for practical environmental remediation applications.

SUMMARY

Metal organic resins, composite materials composed of the metal organic resins, and anion exchange columns packed with the composite materials are provided. Also provided are methods of using the composite materials to remove metal anions from a sample, methods of using the metal organic resins as photoluminescence sensor for detecting metal anions in a sample, and methods of making the composite materials.

Metal organic resins, composite materials composed of the metal organic resins, and anion exchange columns packed with the composite materials are provided. Also provided are methods of using the composite materials to remove metal anions from a sample, methods of using the metal organic resins as fluorescence sensor for detecting metal anions in a sample, and methods of making the composite materials.

One embodiment of a composite material comprises: metal organic resin particles comprising metal organic frameworks and associated counter anions, wherein the metal organic frameworks comprise metal nodes coordinated via organic molecular linkers to form a connected porous network and further wherein the organic molecular linkers are protonated and amine-functionalized; and an organic polymer coating the metal organic resin particles.

One embodiment of an anion exchange column comprises: a column; and a mixture of an inert granular material and a composite material, as described herein, packed within the column.

One embodiment of a method of removing metal anions from a sample comprises: exposing a sample comprising metal anions to the composite material, as described herein, whereby the metal anions undergo anion exchange with the counter anions of the composite material; and separating the composite material from the sample.

One embodiment of a method of making a metal organic framework comprises heating a mixture of a zirconium halide salt and $NH_2$—$H_2BDC$ in an acidic aqueous solution, whereby a reflux reaction between the zirconium halide salt and the $NH_2$—$H_2BDC$ forms particles of a metal organic resin comprising zirconium nodes coordinated via organic molecular linkers in a connected porous network, wherein the organic molecular linkers are protonated and amine-functionalized.

One embodiment of a method of making a composite material comprises heating a mixture of a zirconium halide salt and $NH_2$—$H_2BDC$ in an acidic aqueous solution, where $NH_2$—$H_2BDC$ is 2-amino-terephthalic acid, whereby a reflux reaction between the zirconium halide salt and the $NH_2$—$H_2BDC$ forms a suspension of metal organic resin particles in the solution, the metal organic resin comprising zirconium nodes coordinated via organic molecular linkers in a connected porous network, wherein the organic molecular linkers are protonated and amine-functionalized; and adding an alkali metal alginate salt to the suspension, whereby the alkali metal alginate converts into alginic acid, which forms a water insoluble alginic acid polymer coating on, and flocculates, the metal organic resin particles.

Another embodiment of a method of making a composite material comprises forming an aqueous solution comprising an alkali metal alginate salt and metal organic resin particles, the metal organic resin particles comprising metal nodes coordinated via organic molecular linkers in a connected porous network, wherein the organic molecular linkers are protonated and amine-functionalized, whereby one or more monolayers of alginate-saturated water form a coating on the metal organic resin particles; adding an alkali earth metal halide salt to the aqueous solution, whereby a water-insoluble coating of an alkali earth metal alginate forms around the metal organic resin particles; removing the coated metal organic resin particles from the aqueous solution; and reacting the coated metal organic resin particles with a hydrogen halide to protonate the amine-functionalized metal organic frameworks and convert the alkali earth metal alginate coating into an alginic acid polymer.

Another embodiment of a method of making a composite material comprises forming an aqueous solution comprising and alkali metal alginate salt and metal organic resin particles, the metal organic resin particles comprising metal nodes coordinated via organic molecular linkers in a connected porous network, wherein the organic molecular linkers are protonated and amine-functionalized, whereby one or more monolayers of alginate-saturated water form a coating on the metal organic resin particles; and adding a hydrogen halide to the solution, whereby the hydrogen halide reacts with the alginate and the metal organic resin particles to protonate the amine-functionalized metal organic frameworks and to form an alginic acid polymer coating around the organic resin particles.

One embodiment of a metal organic resin comprises a metal organic framework and associated counter ions, the metal organic framework comprising metal nodes coordinated via organic molecular linkers to form a connected porous network, wherein the organic molecular linkers are protonated and amine-functionalized, the metal organic resin having the formula: $[Zr_6O_4(OH)_8(H_2O)_4(H_2PATP)_4]$ $X^-_6$, or the same formula, but with oxo ligands, aquo ligands, or a combination thereof in place of some or all of the hydroxo ligands, where $H_2PATP$ is 2-((pyridine-1-ium-2-ylmethyl)ammonio)terephthalate and X is a monovalent anion.

One embodiment of a method of detecting metal ions in a sample comprises contacting a sample comprising the metal ions with a metal organic resin comprising metal organic frameworks and associated counter anions, wherein the metal organic frameworks comprise metal nodes coordinated via organic molecular linkers to form a connected porous network and the organic molecular linkers are protonated and amine-functionalized; illuminating the sample with ultraviolet radiation, whereby the metal organic resin absorbs the ultraviolet radiation and produces fluorescence emission; and measuring the fluorescence emission intensity, the fluorescence emission profile, or both.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 14A shows PXRD patterns of MOR-1, MOR-1-HA, MOR-1-HA@Cr(VI) and the calculated pattern for UiO-66. FIG. 14B shows nitrogen sorption isotherms at 77 K for MOR-1, MOR-1-HA and MOR-1-HA@Cr(VI).

DETAILED DESCRIPTION

Metal organic resins, composite materials composed of the metal organic resins, and anion exchange columns packed with the composite materials are provided. Also provided are methods of using the composite materials to remove metal anions from a sample, methods of using the metal organic resins as fluorescence sensor for detecting metal anions in a sample, and methods of making the composite materials.

The metal organic resin (MORs) comprise protonated, amine-functionalized metal organic frameworks with associated counter anions, such as halide anions. In some embodiments of the MORs the halide counter ions are chloride ions.

Metal-organic frameworks (MOFs) are a class of hybrid materials comprising inorganic nodes and organic linkers. More specifically, the MOFs have a structure comprising inorganic (e.g., metal) nodes, also referred to as centers, coordinated via organic molecular linkers to form a highly connected porous network.

Figure 1:
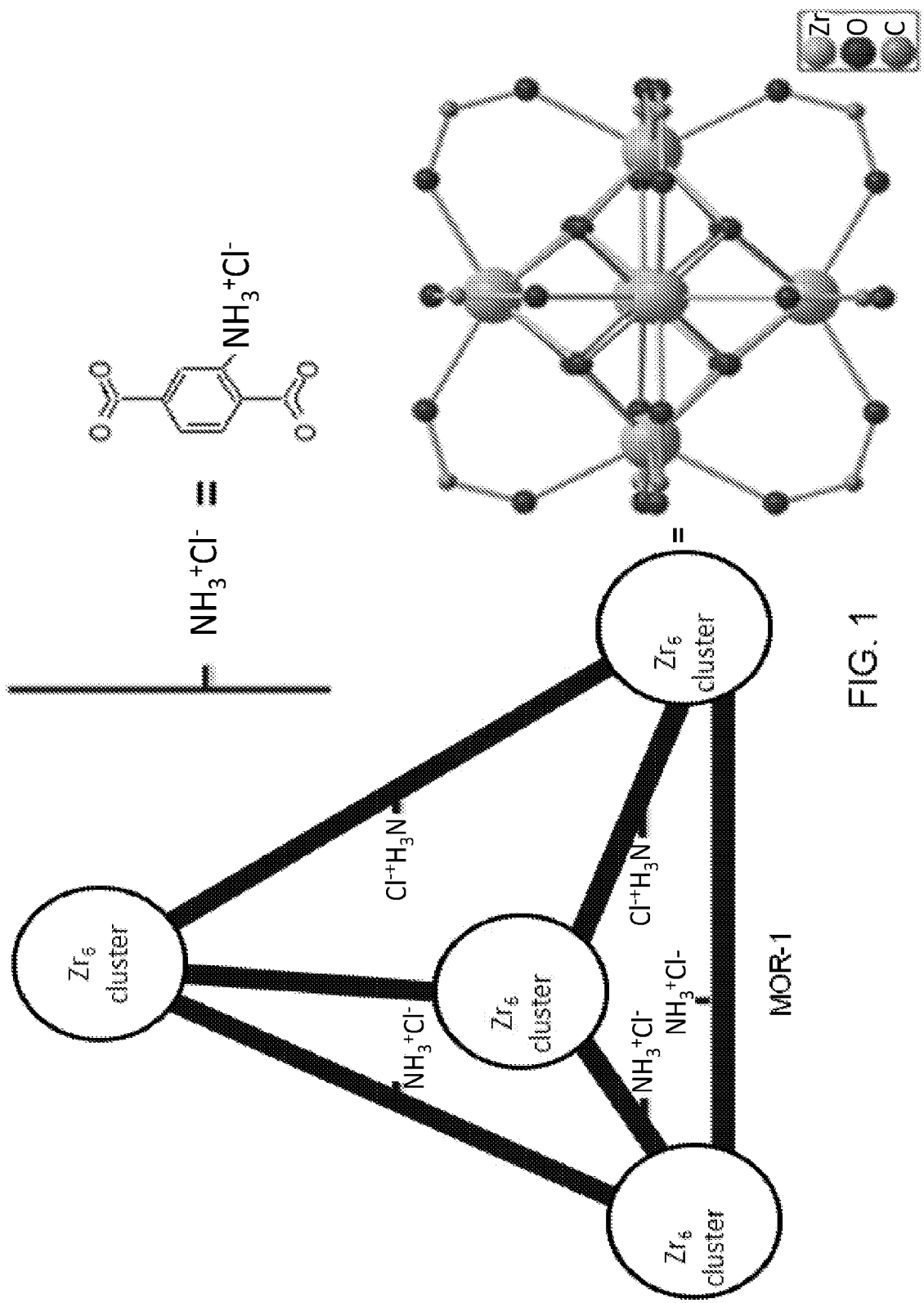
FIG. 1 is a representation of the structure of (protonated) MOR-1 (see Example 1) shown as a tetrahedral cage (based on the structure a UiO-66 metal organic framework).

In some embodiments the MORs are $Zr^{4+}$ MORs of the UiO-66 family, comprising hexa-$Zr^{IV}$ ($Zr_6$) nodes with tetratopic linkers. The metal organic frameworks include those having $Zr_6O_4(OH)_4$ nodes and protonated, amine-functionalized 1,4-benzenedicarboxylate (BDC) linkers. Such MORs can be represented by the formula: [$Zr_6O_4(OH)_4$ ($NH_3^+$-BDC)$_6$]$X^-_6$, where X is a monovalent anion, such as a halide ion and are referred to herein as MOR-1. The structure of these MORs is shown in FIG. 1, where the counter anion is $Cl^-$. Alternative formulations of the structure comprise oxo and/or aquo ligands in place of some or all of the hydroxo ligands. Other metal organic frameworks that can be protonated to provide protonated, amine-functionalized metal organic frameworks include [$Ti_8O_8(OH)_4$ ($H_2N$-BDC)$_6$], [$Al_4(OH)_2(OCH_3)_4(H_2N$-BDC)$_3$], [$Al_3OCl$ ($H_2O)_2(H_2N$-BDC)$_3$], [AlOH($H_2N$-BDC)].

Figure 23:
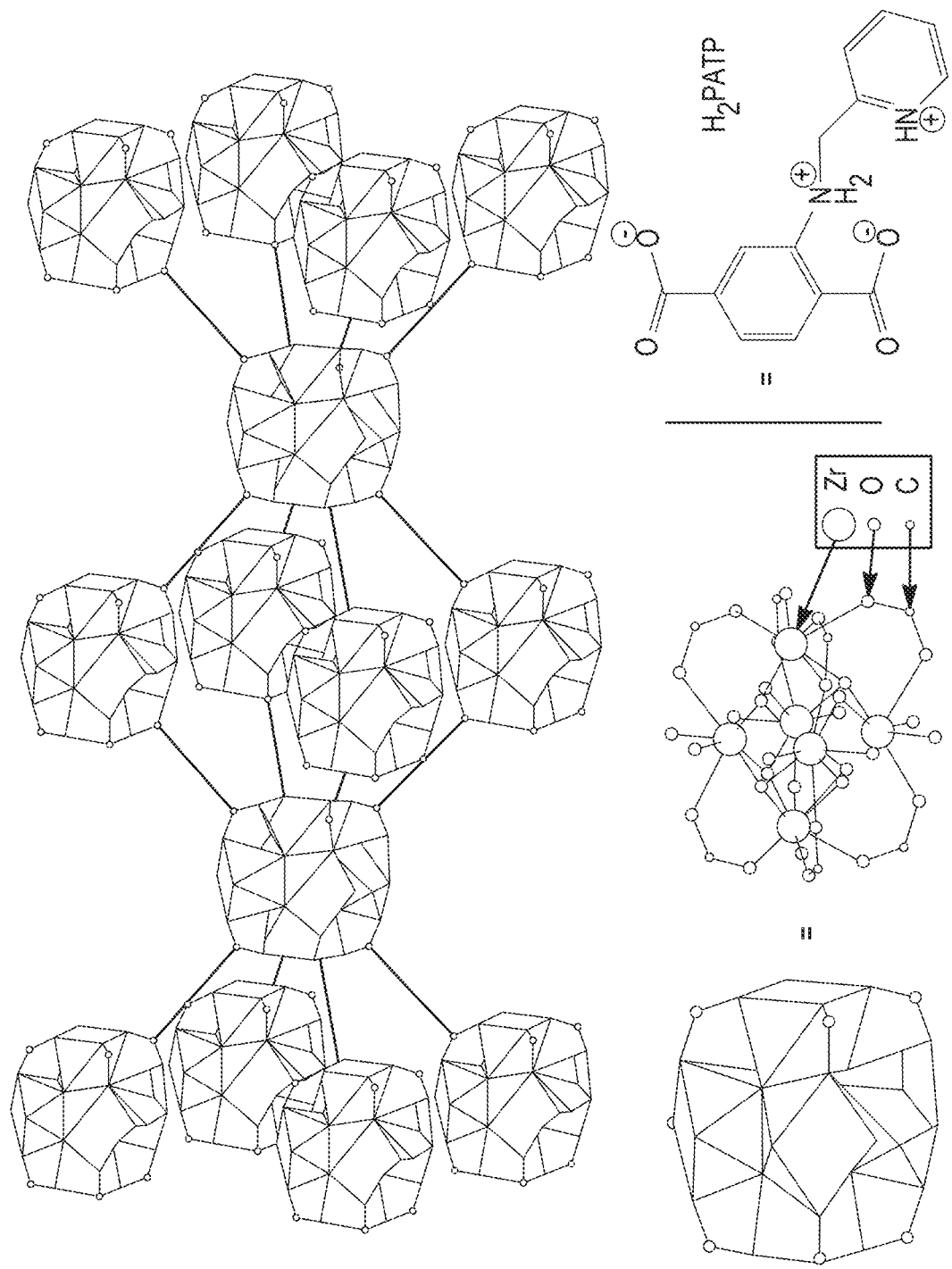
FIG. 23. Representation of a structure of MOR-2 as an 8-connected net.

The metal organic frameworks also include include those having $Zr_6O_4(OH)_8(H_2O)_4$ nodes and 2-((pyridin-1-ium-2-ylmethyl)ammonio)teraphthalate ($H_2PATP$) linkers. Such MORs can be represented by the formula: [$Zr_6O_4(OH)_8$ ($H_2O)_4(H_2PATP)_4$]$X^-_6$, where X is a monovalent anion, such as a halide ion, and are referred to herein as MOR-2. The structure of these MORs is shown in FIG. 23, where the counter anion is $Cl^-$. Alternative formulations of the structure comprise oxo and/or aquo ligands in place of some or all of the hydroxo ligands.

The counter anions of the MORs are able to undergo anion exchange with various metal ions, including heavy metal ions, and, therefore, the composite materials have applications in metal anion remediation. (As used herein the term "metal ion" refers to ions composed only of metal elements and anions that include metal elements and other elements, such as oxygen.) The organic polymer that coats the MOR particles provides the composite materials with increased mechanical strength and increases the average particle size and density of the material (relative to a material comprising the MOR particles without the encapsulating coating), making the coated MOR particles less prone to form a fine powder in aqueous solution. As a result, particles of the composite materials can be formed with particle sizes and mechanical strengths that are able to withstand high water pressures and allow for a continuous flow of a liquid sample through an anion exchange column containing the particles of composite materials. Alginic acid polymers are examples of organic polymers that can be used to encapsulate the MOR particles. Other examples include polyvinyl alkyl resins, such as polyvinyl butyl resins, and polyalkylacrylates and polyalkylmethacrylates, such as polymethylmethacrylates.

The coating on the MOR particles can be thin, so that it does not substantially affect the sorption capacity of the coated MOR particles relative to the uncoated MOR particles. By way of illustration, some embodiment of the polymer coated MOR particles, the organic polymer coating makes up no greater than 5 weight percent of the coated MOR particles. This includes embodiments of the polymer coated MOR particles that comprise no greater than 3 weight percent polymer coating and further includes embodiments of the polymer coated MOR particles that comprise no greater than 2 weight percent polymer coating.

Chromide ions and selenide ions, and other anions (e.g., oxide anions) containing chromium and selenium, are examples of ions that can be removed from a sample via anion exchange using the composite materials. The MORs are able to remove dichromate and chromate ions. The removal of these ions is advantageous because they are toxic. As illustrated in the Examples, both the composite materials and the MORs from which the composite material are made have high sorption capacities for dichromate and/or chromate ions and are able to absorb these species rapidly. For example, sorption capacities of at least 250 mg/g, including at least 300 mg/g can be achieved for dichromate ions and sorption capacities of at least 200 mg/g, including at least 240 mg/g, can be achieved for chromate ions. (Methods for measuring the sorption capacity are described in the Examples.) Other anions that can be removed from a sample using the composite materials include precious metal-containing anions, such as precious metal-containing halide ions, such as $PtCl_4^+$ and $PdCl_4^{2-}$. $MnO_4^-$ anions, $ClO_4^-$ anions, and radioactive anions such as $TcO_4^-$ and $ReO_4^-$ can also be selectively removed from a sample using the composite materials. Pentavalent arsenic (As(V)) and trivalent arsenic (As(III)) anions can also be removed. Some embodiments of the MORs, including those represented by the formula provided above, have a high selectivity for undergoing anion exchange with chromium and selenium ions, relative to other anions, such as $Cl^-$, $NO_3^-$, $Br^-$ and $SO_4^{2-}$. Therefore, chromium and selenium ions can be effectively remediated from a sample comprising one or more of those other anions, even when these other anions are present in excess.

The composite materials can be used to remove anion-exchangeable metal anions (targeted anions) from a sample by contacting the composite materials with a sample, such as an aqueous solution, comprising the targeted metal anions under conditions and for a time sufficient to allow the targeted metal anions to undergo anion exchange with the counter anions of the MORs, and then separating the sample from the composite materials.

Because the composite materials are mechanically robust and can be formed as particles with tailored sizes and size distributions, they are well suited for use as packing materials for ion exchange columns. A basic embodiment of an anion exchange column comprises a column characterized by a length, an input opening for introducing a sample into the column at one end, and an output opening for releasing a sample from the column at another end. The column is packed with a packing material that includes the composite material as an anion-exchange material. The packing material may consist of, or consist essentially of, particles of the composite material. However, the particles of composite material may also be mixed with particles of another material, such as sand or other inert granular materials.

The composite materials are able to remove metal anions from samples having a wide range of pH values, including pH values in the range from 1-8. This is significant because many industries, such as the mining industry, produce waste water samples that are highly acidic—having pH values of less than 7. For example, the composite materials can be used to remediate samples having pH values in the range from 1 to 4.

Even under highly acidic conditions the composite materials are very effective at removing metal anions, such as chromium and selenium anions from a sample. Under less acidic conditions, the effectiveness of the composite materials is even greater. By way of illustration, in some embodiments of the method of removing targeted metal anions (for example, Cr- of Se-containing anions) from a sample, at least 80% of the targeted metal anions are removed. This includes embodiments in which at least 90%, at least 95%, and at least 98% (for example 95 to 99%) of the targeted metal ions are removed. Thus, the composite materials are able to remove metal ions to levels below those required by environmental regulations in the United States and Europe. In addition, the materials are inexpensive to synthesize and can be regenerated after undergoing remediative anion-exchange, allowing the anion-exchange columns to be reused multiple times with only a small—if any—loss in capacity. Industrial wastewaters that can be remediated using the composite materials include those generated by the leather tanning, cement, electroplating, nuclear power, petroleum refining, mining, and dyes industries. In addition, the composite materials can be used to remediate agricultural wastewater (e.g., farm run-off), contaminated drinking water, or contaminated water from natural bodies of water.

Because the metal organic resins are so effective at removing target ions, only a small quantity of the composite material need be included in an anion exchange column. Thus, in some embodiments of the anion exchange columns, the packing material in the column comprises no more than 5 percent of the composite material by weight (wt. %), with the remainder comprising another material—typically an inert granular material, such as sand. This includes embodiments in which the packing material in the column comprises no more than 3 wt. % composite material and further includes embodiments in which the packing material in the column comprises no more than 1 wt. % composite material.

The composite materials can be made by different methods, as illustrated in the Examples. One method uses a reflux reaction to provide a rapid, high yield, relatively inexpensive, and environmentally friendly synthesis. In this method, a metal halide salt and 2 amino-terephthalic acid ($NH_2$—$H_2BDC$) are refluxed in an acidic aqueous solution at an elevated temperature (that is, a temperature above room temperature) to induce a reflux reaction between the halide salt and the 2 amino-terephthalic acid to form a fine particulate suspension of an amine functionalized metal organic resin. By way of illustration, in order to make MOR-1, or an MOR having the same formula as MOR-1, but with oxo ligands, aquo ligands, or a combination thereof in place of some or all of the hydroxo ligands, $ZrCl_4$ salt can be used in the reflux synthesis. Using this procedure, a high yield (e.g., 70% yield) of the metal organic resin can be obtained very quickly; with the maximum yield of the metal organic resin being achieved in an hour or less.

Once the metal organic resin particle suspension has been formed, an alkali-metal alginate salt, such as sodium alginate, is added to the suspension where it is converted into alginic acid. The alginic acid forms a water insoluble alginic acid polymer coating on the metal organic resin particles, which then flocculate in the solution. These polymer coated organic resin particles can then be precipitated from the solution and isolated using, for example, filtration or centrifugation. The resulting particulate material can then be treated with an acid, such as a strong inorganic acid (e.g., HCl) to dissolve the remaining $NH_2$—$H_2BDC$ ligands and to protonate the amino functional groups of the material. An example of this reflux synthesis-based process is illustrated in detail in Example 2.

In another method of making the composite materials, an aqueous solution of an alkali metal alginate salt and the metal organic resin particles is formed. In solution, one or more monolayers of alginate-saturated water form a coating on the metal organic resin particles. An alkali earth metal halide salt is then added to the aqueous solution, whereby a water-insoluble coating of an alkali earth metal alginate forms around the metal organic resin particles. These particles can then be removed from the aqueous solution and reacted with a hydrogen halide to protonate the amine-functionalized metal organic frameworks and convert the alkali earth metal alginate coating into an alginic acid polymer coating. An example of this synthesis process is illustrated in detail in Example 1.

In yet another method of making a composite material, an aqueous solution of an alkali metal alginate salt and the metal organic resin particles is formed. In solution, one or more monolayers of alginate-saturated water form a coating on the metal organic resin particles. A hydrogen halide is then added to the solution, whereby the hydrogen halide reacts with the alginate and the metal organic resin particles to protonate the amine-functionalized metal organic frameworks and to form an alginic acid polymer coating around the organic resin particles. An example of this synthesis process is illustrated in detail in Example 1.

The polymer coated metal organic resin particles formed by these methods typically have a mean particle size in the range from about 100 nm to about 500 nm, including from about 100 nm to about 300 nm. The particles are microporous, typically having mean pore sizes in the range from about 3 Å to about 12 Å. Although mean particle and pore sizes outside of these ranges can be also be achieved.

Another aspect of this invention is a method for making the metal organic resin designated above as MOR-2 and the use of this, and other amine-functionalized metal organic resins, in fluorescence-based sensors for the detection of metal ions. As illustrated in Example 3, MOR-2 can be synthesized via a solvothermal reaction of a zinc halide salt with 2-((pyridine-2-ylmethyl)amino)terephthalic acid ($H_2PATP$) ligand. Different metal halide salts can be used in the solvothermal reaction to form a MOR having the structure of MOR-2, but with different metals, such as $Hf^{4+}$, at the metal nodes. The metal organic resin can be treated with a halide acid, such as HCl, to protonate its pyridine and amine moieties, thereby providing pyridinium and ammonium functional groups charge balanced by halide anions.

Embodiments of the metal organic resins, including MOR-1, MOR-2 and variations of these in which oxo ligands, aquo ligands, or a combination thereof replace some or all of the hydroxo ligands, have absorption bands in the ultraviolet region of the electromagnetic spectrum and produce fluorescence emission upon irradiation with ultraviolet light. This fluorescence emission is quenched by the sorption of metal anions by the metal organic resin. Thus, the photophysical properties of the metal organic resins can be harnessed to detect metal ions, including heavy metal ions, in a sample.

In a method of detecting metal ions in a sample, the metal organic resin is contacted with a sample comprising the metal ions and metal ions in the sample undergo anion exchange with the counter anions of the metal organic resin. The metal organic resin is then irradiated with ultraviolet radiation and the resulting fluorescence spectrum is measured. Because the intensity of the fluorescence emission decreases and/or the fluorescence emissions peaks shift with increasing absorbed metal ion concentration, the intensity and/or fluorescence emission profile of the measured fluorescence can be compared to the fluorescence intensity and fluorescence emission profile of a standard sample that includes the metal organic resin without the metal ions to quantify the concentration of metal ions in the sample. The metal organic resin can be contacted with the sample by, for example, adding it into the sample or by passing the sample over the metal organic resin. The latter process can be achieve by providing polymer coated metal organic resin particles, as described in detail herein, in an anion exchange column. Example 3 illustrates the use of an MOR-2 based fluorescence sensor for detecting both chromate and dichromate metal ions in solution. Other metal anions that can be detected with the fluorescence emission sensors base on this and other MORs described herein include, but are not limited to, $[PdCl_4]^{2-}$ and $[PdCl_4]^{2-}$.

Example 1

This example illustrates an anion exchange composite material based on a protonated amine-functionalized metal organic framework, called Metal Organic Resin-1 (MOR-1), and alginic acid (HA). Additional details regarding the composite material and its use in the capture of hexavalent chromium can be found in Rapti et al., *Chem. Sci.*, 2016, 7, 2427-2436 and its Supplementary Information, the entire contents of which is incorporated herein by reference.

The composite material can be synthesized via a simple and inexpensive method. The sorbent shows an exceptional capability to rapidly and selectively sorb Cr(VI) under a variety of conditions and in the presence of several competitive ions. The composite sorbent can be successfully utilized in an ion-exchange column. Remarkably, an ion exchange column with only 1% wt. MOR-1-HA and 99% wt. sand (an inert and inexpensive material) is capable of reducing moderate and trace Cr(VI) concentrations well below the acceptable limits for water (effluent Cr concentrations ≤1 ppb). Additionally, this column is highly efficient in removing Se (in the form of $SeO_3^{2-}$ and $SeO_4^{2-}$), with the effluent Se concentrations being ≤1 ppb (~50 times smaller than the USA Environmental Protection Agency (EPA)-defined limit for Se).

The anion exchange composite material is based on the $[Zr_6O_4(OH)_4(NH_3^+-BDC)_6]Cl_6$ MOR (MOR-1) and alginic acid (HA) polymer ($NH_2$—$H_2BDC$=2-amino-terephthalic acid). The MOR is the analogue of the UiO-66 material containing $NH_3^+$ functional groups (FIG. 1). Through detailed batch studies, the highly efficient and selective anion exchange properties of the composite for $Cr_2O_7^{2-}$ ions are revealed. The successful use of MORs, in the form of MOR-HA composite, in an ion exchange column are dem-onstrated. The stationary phase in this column is a mixture of MOR-1-HA composite and sand (an inert and inexpensive material). Remarkably, a column with MOR-1-HA/sand stationary phase containing only 1% w/w MOR-1-HA was found to be capable of reducing moderate and trace levels of Cr(VI) well below the allowed safe levels (EU and USA-EPA limits for total Cr in water are 50 and 100 ppb respectively), despite the presence of large excess of competitive ions. Furthermore, the column could be easily regenerated and reused several times with almost no loss of its capacity. The efficiency and relatively low cost of this ion exchange column makes it attractive for use in the decontamination of wide variety of Cr(VI)-containing wastes.

Figure 2:
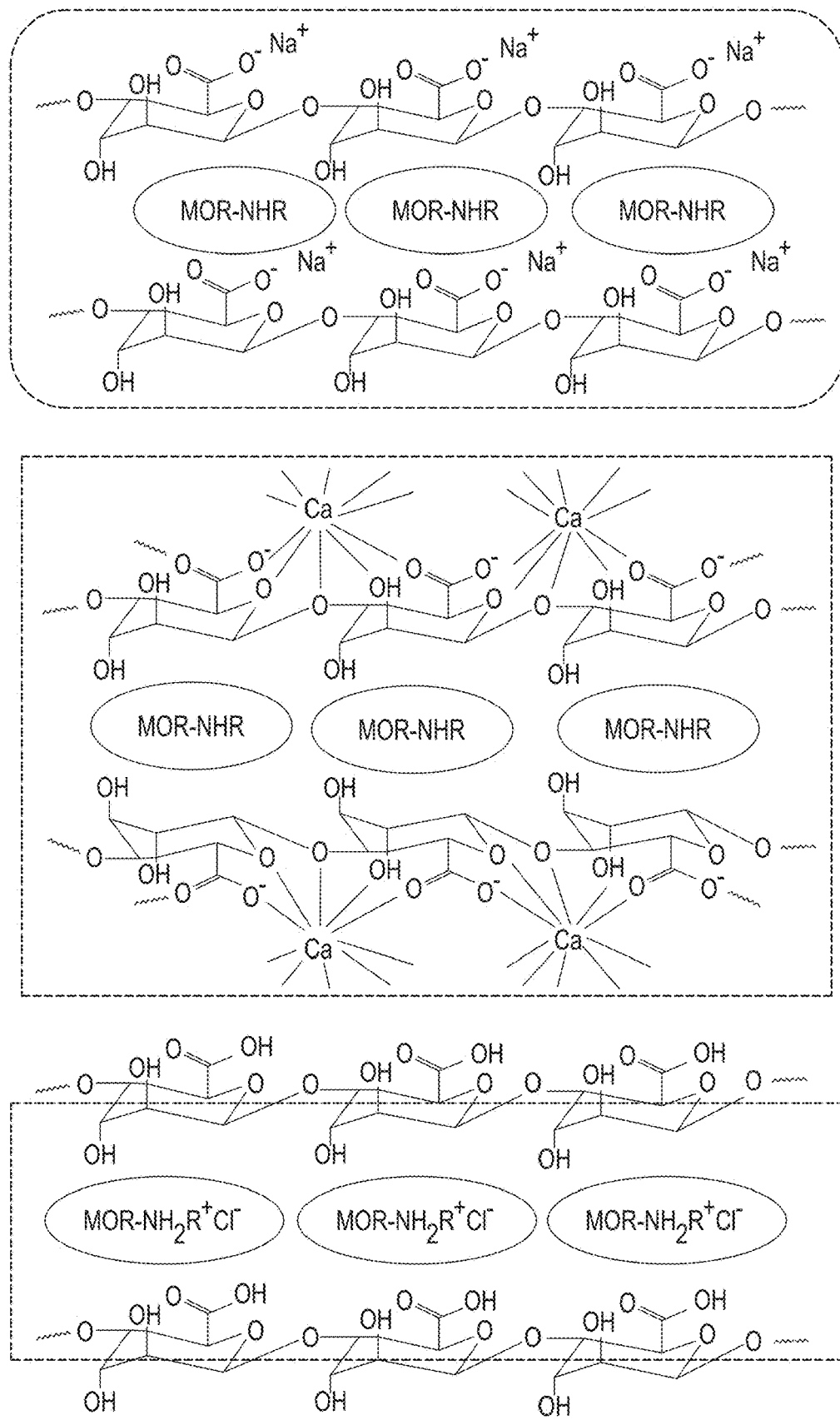
FIG. 2 is a schematic illustration for one method of forming and isolating a MOR-1-HA composite.

$Zr^{4+}$ MORs of the UiO-66 family are useful materials for sorption applications due to their high surface areas, easy incorporation of functional groups and hydrolytic-thermal stability. However, as mentioned above, as-prepared MORs are fine powders and are not suitable for practical ion exchange applications. This is particularly true for UiO-66 type MORs usually isolated as nanoparticles. In fact, as-prepared UiO-66 type MORs form fine suspensions in water and cannot be easily separated from it. The latter is a major drawback for the application of such materials as stationary phases in columns. To this end, a modified alginate encapsulation method was applied to prepare UiO-66 type-composite materials. This encapsulation method involves: a) addition of the sorbent to be encapsulated (i.e. the MOR) into a water solution of sodium alginate (SA), so that one or more monolayers of alginate-saturated water cover each particle of the sorbent (FIG. 2, top panel); b) addition of $CaCl_2$) to the SA-sorbent suspension so that the monolayer is immediately converted to calcium alginate (CA), forming a water-insoluble polymer shell around the sorbent particulates (MOR-1-CA) (FIG. 2, middle panel); and c) treating the MOR-1-CA composite with hydrochloric acid to produce $[Zr_6O_4(OH)_4(NH_3^+-BDC)_6]Cl_6$-HA (MOR-1-HA) (HA=alginic acid) (FIG. 2, bottom panel). Note that only 4% wt. of alginate (i.e., alginate:MOR-1 mass ratio used was ~0.04) was sufficient for the composite to be formed and thus, the MOR was not encapsulated by thick HA particles that would hinder the diffusion of ions into the MOR pores. Alternatively, the MOR-1-HA composite could be prepared directly by adding HCl into a suspension of MOR-1 in SA water solution. The composite material could be also synthesized by heating a mixture of $ZrCl_4+NH_2$—$H_2BDC$ in water-acetic acid solution under reflux conditions for a few hours, which results in the formation of a fine MOR suspension. Adding SA+HCl to the suspension produces the MOR-HA composite in high yield. This synthetic method is inexpensive and environmentally friendly, since no organic solvent is used (except for a relatively small quantity of the inexpensive acetic acid).

Figures 3A, 3B:
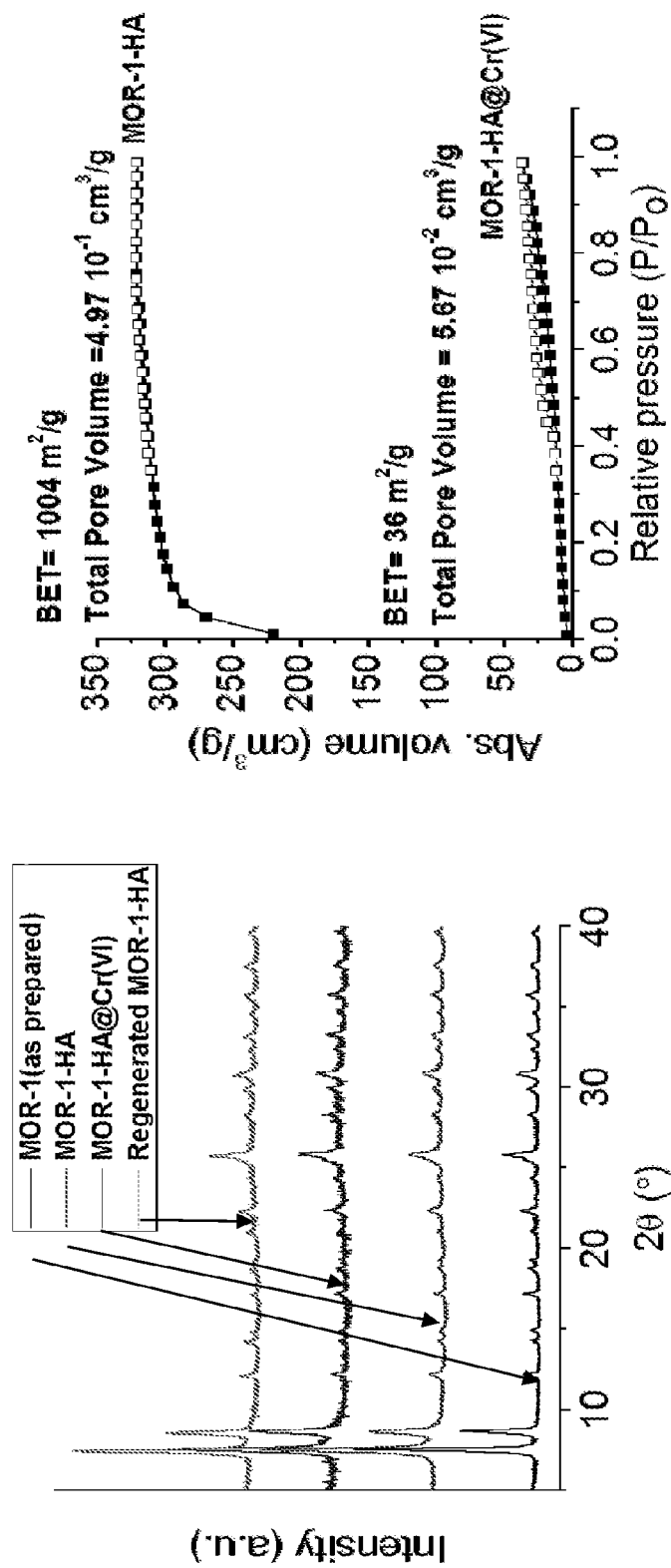
FIG. 3A depicts powder x-ray diffraction (PXRD) patterns for MOR-1 (as prepared), MOR-1-HA, MOR-1-HA@Cr(VI), and regenerated MOR-1-HA.
FIG. 3B shows nitrogen adsorption-desorption isotherms for MOR-1-HA and MOR-1-HA@Cr(VI) at 77 K.

EDS data for the MOR-1-HA sample indicate a Zr:Cl ratio of ~1, which is in agreement with the protonation of the six amino groups of the $Zr_6$ cluster and the presence of six $Cl^-$ counter ions. Thermogravimetric analysis (TGA) was used to determine the lattice water molecules (21 water molecules). Powder X-ray diffraction (PXRD) data indicated that the MOR retained its structure in the composite form (FIG. 3A). The Brunauer-Emmett-Teller (BET) surface area of the MOR-1-HA was 1004 $m^2/g$ (FIG. 3B), a value within the range of surface areas found for amino-functionalized UiO-66 materials.

Detailed Cr(VI) sorption studies for MOR-1-HA were performed at low pH (pH ~3), in order to imitate the usual acidic conditions of Cr(VI) industrial waste (for example tannery wastewater). Under such conditions, the predominant Cr(VI) species were $Cr_2O_7^{2-}$ (with some contribution from $HCrO_4^-$ at dilute solutions). The ion exchange process can be described with the following equation:

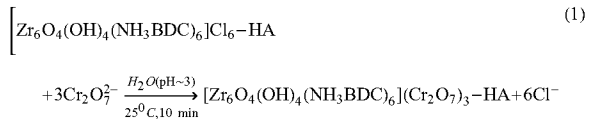

(1)

EDS data revealed no $Cl^-$ anions in the $Cr_2O_7^{2-}$-loaded material. ICP-MS, EDS and UV-Vis data (see below) indicated a Zr:Cr ratio of 0.9-1.2, close to the expected one (theoretical Zr:Cr=1, considering the insertion of 3 $Cr_2O_7^{2-}$ per $Zr_6$ cluster). PXRD data revealed that the MOR structure was retained after the incorporation of the dichromate anions (FIG. 3A). There was a drastic decrease, however, in the BET surface area for the $Cr_2O_7^{2-}$-loaded material, indicating the pores of the structure were filled by $Cr_2O_7^{2-}$ ions. Specifically, after the insertion of $Cr_2O_7^{2-}$ anions, the surface area for MOR-1-HA dropped from ~1000 to 36 m²/g (FIG. 3B).

The presence of Cr(VI) species in the exchanged MOR-1-HA material was further shown using infrared (IR) and X-ray photoelectron spectroscopy (XPS). The IR spectrum (FIG. 3C) of the exchanged material showed the existence of a peak at ~924 cm⁻¹ (not present in the spectra of pristine MOR1-HA material) assigned to the anti-symmetric $CrO_3$- stretch (for more detailed interpretation of IR data see also below). XPS data revealed the presence of $Cr2p_{1/2}$ and $Cr2p_{3/2}$ peaks, with their main components corresponding to binding energies of 588.1 and 579.3 eV (FIG. 3D). These binding energies are consistent with those of Cr(VI).

Figure 4A:
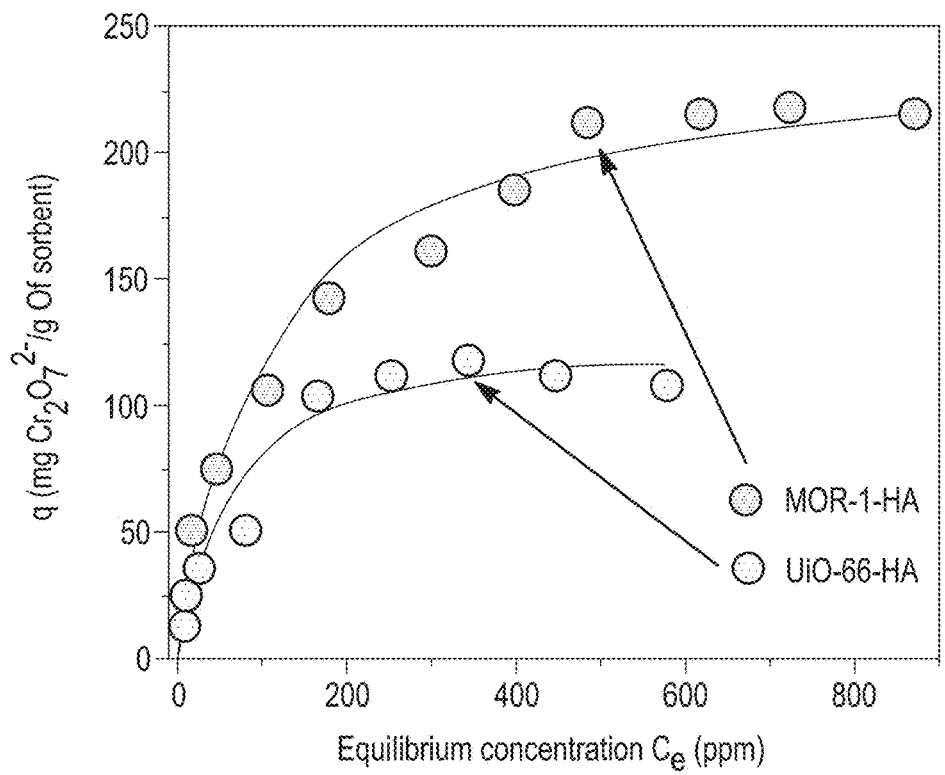
FIG. 4A shows equilibrium $Cr_2O_7^{2-}$ sorption data for MOR-1-HA and UiO-66-HA materials. Solid lines represent the fitting of the data for MOR-1-HA and UiO-66-HA materials with the Langmuir and Langmuir-Freundlich models, respectively.

To gain further insight into the $Cr_2O_7^{2-}$ sorption properties of the MOR-1-HA material, batch studies were first performed. By immersing the MOR-1-HA material in a $Cr_2O_7^{2-}$ solution, the removal of $Cr_2O_7^{2-}$ was accomplished very quickly (within a few minutes), something that could be visually observed by the decolorization of the solution and color change of the sorbent. The $Cr_2O_7^{2-}$ ion exchange equilibrium data for MOR-1-HA composite are shown in FIG. 4A. The description of the data can be provided by the Langmuir model. The sorption capacity for MOR-1-HA was 242(17) mg $Cr_2O_7^{2-}$/g of sorbent (or 242/0.96=252 mg/g of MOR-1), which exceeded those reported for other metal organic materials (60-100 mg/g) and most of known inorganic and organic anion exchangers. This sorption capacity was consistent with the absorption of ~2.7(3) moles of $Cr_2O_7^{2-}$ per formula unit of the MOR, which is close to the expected maximum sorption capacity of the material (3.0 mol per formula unit). The affinity of the MOR-1-HA for dichromate could be expressed in terms of the distribution coefficient $K_d$, which is given by the equation $$K_d = \frac{V[C_0 - C_f]/C_f}{m},$$

where $C_0$ and $C_f$ are the initial and equilibrium concentrations of $Cr_2O_7^{2-}$ (ppm), V is the volume (ml) of the testing solution, and m is the amount of the ion exchanger (g) used in the experiment. Values for $K_d$ equal to 10⁴ L/g and above this value are considered excellent. The maximum $K_dCr_2O_7$ values for the MOR-1-HA material, obtained from the batch equilibrium studies, were in the range 1.2-5.5×10⁴ L/g (FIG. 4B), which revealed the exceptional affinity of the materials for dichromate ions. It should be noted that MOR-1-HA samples loaded with $Cr_2O_7^{2-}$ could be easily regenerated by treating them with concentrated HCl solutions (1-4 M). The PXRD pattern of the regenerated MOF-1-HA was almost identical with that of the as prepared MOR-1-HA material. The regenerated MOR-1-HA showed similar dichromate exchange capacity (220-230 mg/g) to that of the pristine material (more detailed regeneration studies were performed for the ion exchange columns, see below).

Figure 4B:
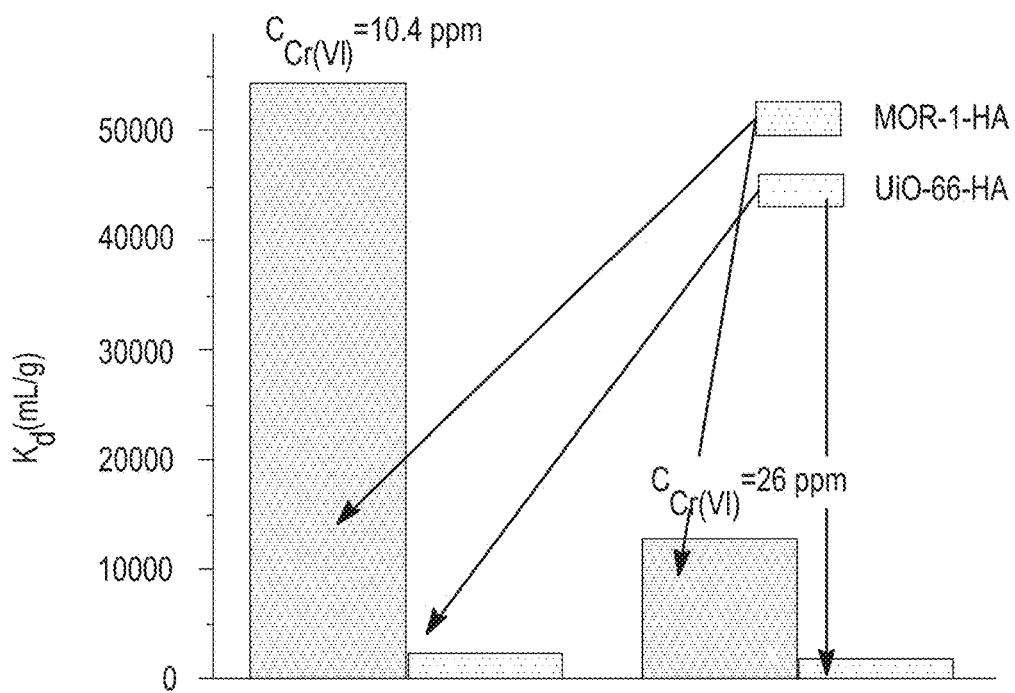
FIG. 4B shows $K_d$ values for MOR-1-HA and UiO-66-HA for initial Cr(VI) concentrations of 10.4 and 26 ppm.
Figure 4C:
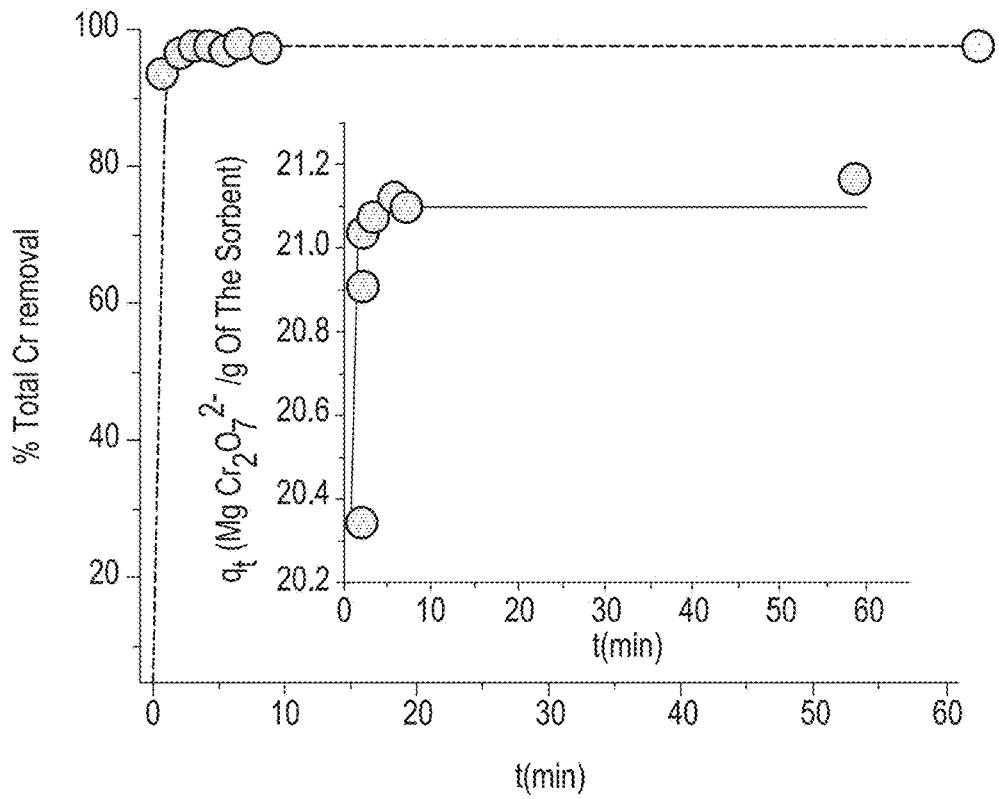
FIG. 4C depicts the kinetics for Cr(VI) sorption by MOR-1-HA (initial Cr(VI) concentration=10.4 ppm, pH~3). Inset graph: Fitting of the kinetics data with the first order Lagergren equation $q_t=q_e[1-\exp(-K_Lt)]$, where $q_e$=the amount (mg/g) of metal ion absorbed in equilibrium, $K_L$=the Lagergren or first-rate order constant (Fitting parameters: $q_e$=21.1(4) mg/g, $K_L$=3.3(1) $min^{-1}$).

The kinetics of the $Cr_2O_7^{2-}$ exchange of the MOR-1-HA composite were also studied. The results indicated that the capture of $Cr_2O_7^{2-}$ by the composite was remarkably fast (FIG. 4C). Within only 1 min of solution/composite contact, ~94.2% of the initial Cr amount (C=10.4 ppm, pH~3) was removed by the solution. After 3 min of solution/composite contact, the Cr(VI) ion exchange almost reached its equilibrium with 97.5% removal capacity. These kinetic data can be fitted with the first order Lagergren equation (FIG. 4C, inset). From these data, it is clear that the ordered highly porous structure of MOR-1-HA facilitating the diffusion of ions in and out of pores, and the presence of protonated amino-functional groups strongly interacting with the $Cr_2O_7^{2-}$ anions, resulted in a sorbent with exceptionally rapid sorption kinetics.

Figure 4D:
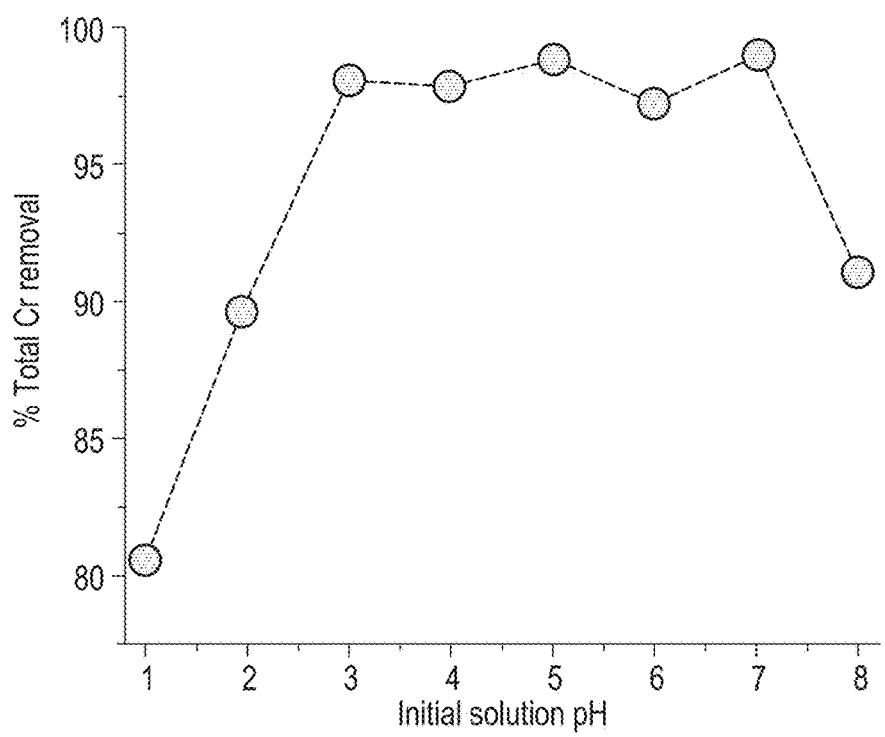
FIG. 4D shows % Total Cr removal by MOR-1-HA vs. pH (initial Cr(VI) concentration=10.4 ppm). For pH≥9, dissolution of the composite was observed.

Although the Cr(VI) ion exchange studies for MOR-1-HA were performed at pH ~3 in order to evaluate the capability of the sorbent to operate under acidic conditions usually present in industrial waste, the composite material was found to be capable of absorbing Cr(VI) from solutions of a relatively wide pH range (1-8), FIG. 4D. Specifically, it showed 91-98% total Cr removal capacities in pH~3-8, whereas it retained high Cr removal capability, even under highly acidic conditions (80.5 and 90.2% removal capacities at pH ~1 and 2 respectively).

$Cr_2O_7^{2-}$-bearing industrial effluent also was found to contain a number of competitive anions, such as $Cl^-$, $NO_3^-$, $Br^-$ and $SO_4^{2-}$, in high concentrations. Thus, competitive $Cr_2O_7^{2-}/Cl^-$, $Cr_2O_7^{2-}/Br^-$, $Cr_2O_7^{2-}/NO_3^-$ and $Cr_2O_7^{2-}/SO_4^{2-}$ sorption experiments for MOR-1-HA were performed. An exceptional ability of MOR-1-HA to absorb $Cr_2O_7^{2-}$ (initial concentration=54 ppm, pH ~3) almost quantitatively (81.6-97.6% dichromate removal capacity) and very high $K_dCr_2O_7$ (4.4×10³-4×10⁴ L/g) in the presence of tremendous (up to 1000-fold) excess of $Cl^-$, $Br^-$, or $NO_3^-$ was observed, which indicates very high selectivity of MOR-1-HA for $Cr_2O_7^{2-}$ against these anions. $SO_4^{2-}$ as a bivalent anion is expected to be a stronger competitor than monovalent anions for dichromate anion exchange. Nevertheless, even with relatively large (20-80-fold) excess of $SO_4^{2-}$, MOR-1-HA retained a very good $Cr_2O_7^{2-}$ removal efficiency (40-68%) and relatively high $K_dCr_2O_7$ values (up to 2.1×10³ mL/g).

Comparative Batch Ion-Exchange Studies

Figure 9:
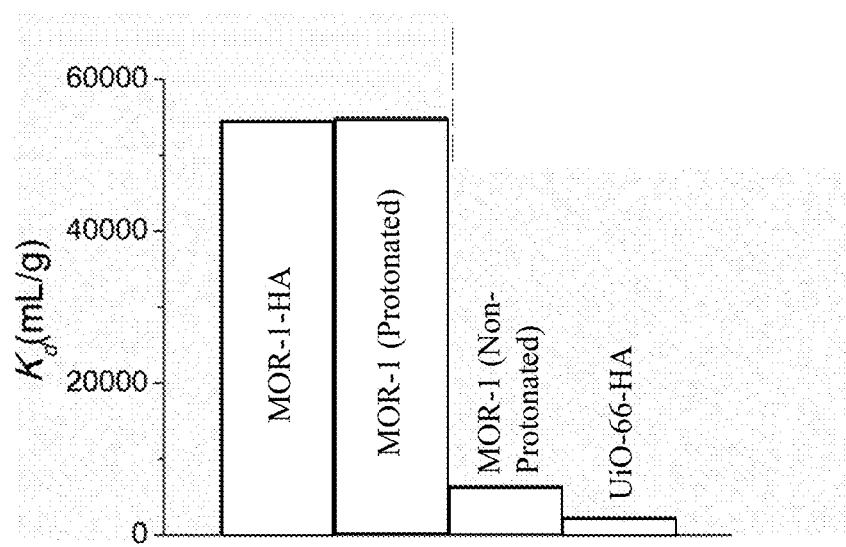
FIG. 9. $K_d$ values for MOR-1-HA, MOR-1 (protonated), MOR-1(non-protonated) and UiO-66-HA (initial dichromate concentration=21.6 ppm).

For comparison, batch $Cr_2O_7^{2-}$ sorption studies (at pH~3) were performed for: a) protonated MOR-1 $[Zr_6O_4(OH)_4(NH_3^+-BDC)_6]Cl_6$ (MOR-1 treated with HCl 4 M); b) non-protonated MOR-1 $[Zr_6O_4(OH)_4(NH_2-BDC)_6]$ (prepared without adding acid in the reaction mixture); and c) UiO-66 MOF ($[Zr_6O_4(OH)_4(BDC)_6]$)-HA composite. The results indicated that the sorption capacities of protonated MOR-1 and non-protonated MOR-1 were similar to each other (247±10 and 267±23 mg/g respectively) and also close to that of the MOR-1-HA composite, whereas the sorption capacity (129±18 mg/g) of UiO-66-HA was almost half of that for MOR-1-HA. The efficiency, however, of protonated MOR-1 and MOR-1-HA for sorption of dichromate in relatively low initial concentrations, as revealed by the $K_dCr_2O_7$ values, was significantly higher than that of non-protonated MOR-1 and UiO-66-HA. Specifically, UiO-66-HA and non-protonated MOR-1 materials showed $K_dCr_2O_7$ values of 2.3 and 6.5×10³ L/g, respectively, for initial dichromate concentration of ~21.6 ppm (FIG. 9), which were one order of magnitude less than those (~5.5×10⁴ L/g) for MOR-1-HA and protonated MOR-1 samples (FIG. 9).

Figures 6, 7:
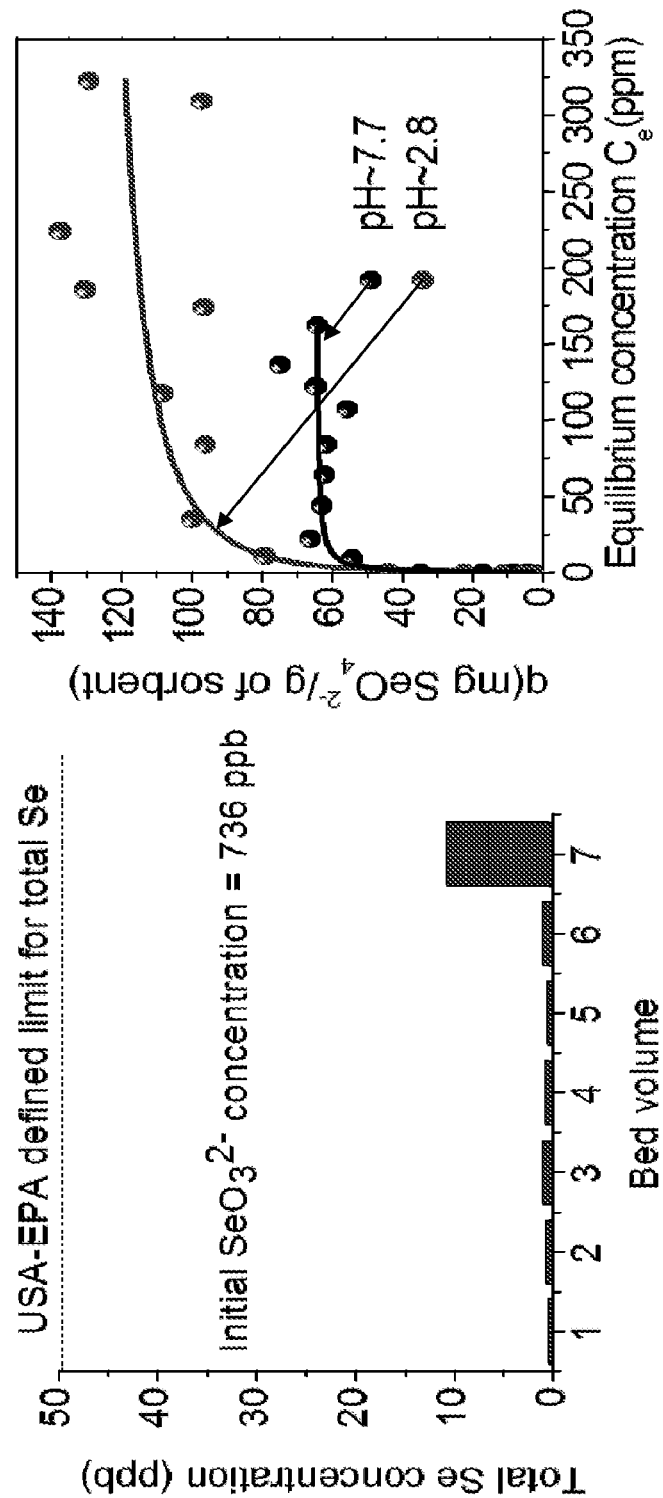
FIG. 6 shows total Se concentration in samples (bed volumes, each bed volume=3.5 mL) of water solutions (initial $SeO_3^{2-}$ concentration ~736 ppb, pH adjusted to 3), after passing them through an ion-exchange column of MOR-1-A/sand (0.05:5 g).
FIG. 7 shows equilibrium $SeO_4^{2-}$ sorption data for MOR-1-HA at pH ~7.7 and 2.8. Solid lines represent the fitting of the data for with the Langmuir and Langmuir-Freundlich models respectively.

As the above results revealed, both protonated and non-protonated MOR-1 materials displayed similar maximum sorption capacities, since at the acidic environment the $NH_2$-groups will be eventually protonated and the inserted $Cl^-$ can be exchanged by dichromate anions. However, at low initial Cr(VI) concentrations, the materials pre-treated with acid (i.e., protonated MOR-1 and MOR-1-HA) were much more effective for the sorption of Cr(VI), as revealed by their much higher $K_d$ values compared to that of MOR-1 used without any pre-treatment (non-protonated MOR-1). Presumably, the pre-existence of exchangeable $Cl^-$ anions in the protonated materials enhances the kinetics of the Cr(VI) sorption, whereas the Cr(VI) sorption by the non-protonated MOR is a slower two-step process involving first protonation of the amine-sites/insertion of $Cl-$ anions and then exchange of $Cl^-$ by Cr(VI) species. The enhancement of sorption kinetics was particularly important in the case of low initial Cr(VI) concentrations, which were not as effective as the high Cr(VI) levels at shifting the ion-exchange equilibrium towards the Cr(VI)-containing material. The above explanation was supported by a kinetic study of the $Cr_2O_7^{2-}$ exchange of the non-protonated MOR-1 using a relatively low initial dichromate concentration (21.6 ppm, pH~3). The results showed that after 1 min of solution/MOR contact only 24% $Cr_2O_7^{2-}$ removal was achieved, whereas even after 60 min of reaction significant amount of dichromate remained in the solution (~76% $Cr_2O_7^{2-}$ removal). These data are in contrast with the corresponding kinetic results for MOR-1-HA, which indicated almost quantitative sorption of dichromate anions within only 1 min of solution/composite contact (FIG. 7). Furthermore, fitting of the kinetic data for the non-protonated MOR-1 with the Lagergren's first order equation revealed a rate constant of 0.55±0.14 min⁻¹, which is six-times smaller than that for the $Cr_2O_7^{2-}$ sorption by MOR-1-HA. This improvement of kinetics via the protonation of the material is key for its substantially higher column sorption efficiency compared to that of non-protonated sorbent.

Figure 5A:
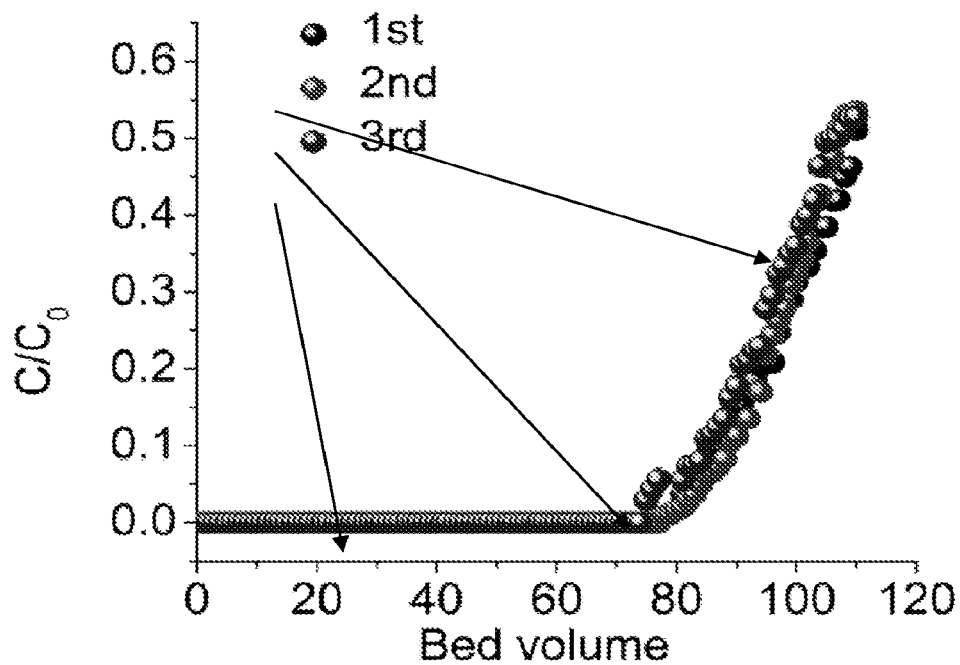
FIG. 5A shows breakthrough curves for three column ion exchange runs (C=concentration of the effluent, $C_0$=initial $Cr_2O_7^{2-}$ concentration ~7 ppm, pH~3, flow rate 1 mL/min, one bed volume=3.5 mL, stationary phase MOR-1-A/sand=0.05:5 g).
Figure 5B:
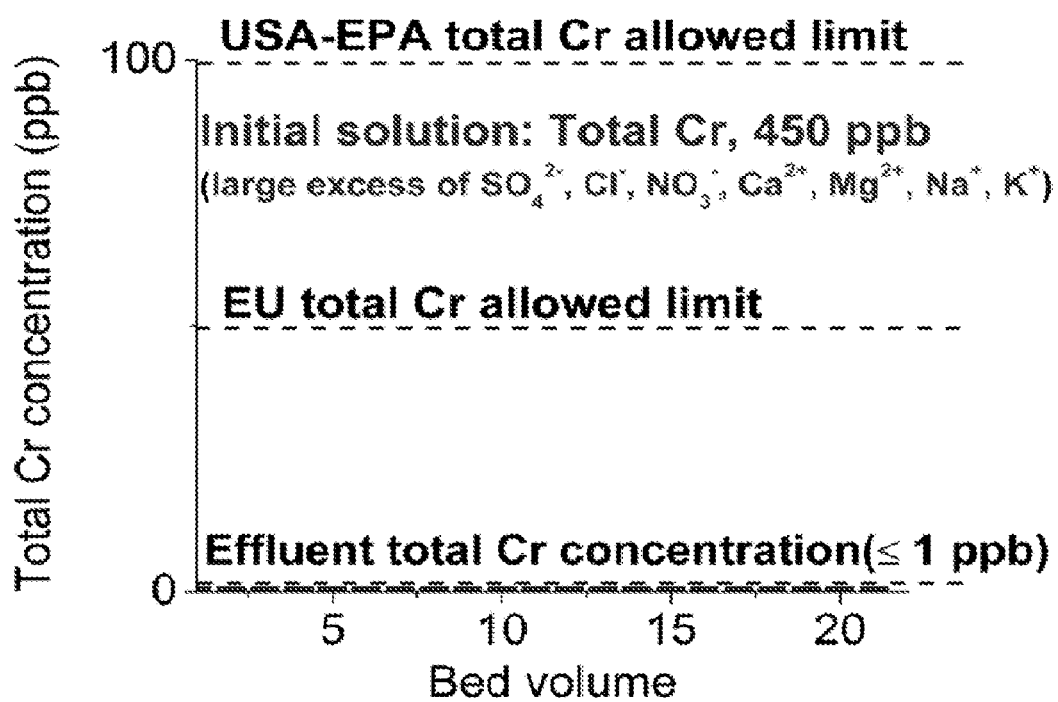
FIG. 5B shows total Cr concentration in samples (bed volumes, each bed volume=3.5 mL) of natural spring water, to which trace Cr(VI) was added (initial total Cr concentration~450 ppb, pH adjusted to 3), after passing them through an ion-exchange column of MOR-1-A/sand (0.05:5 g).

The next step in these investigations was the study of the column Cr(VI) sorption properties of MOR-1-HA material. At this point, it should be mentioned that efforts to use as prepared MOR-1 (even after mixing it with inert materials such as sand) in columns were unsuccessful, since MOR-1 forms fine suspensions in water that pass through the column. Thus, only MOR-1-HA composite could be successfully employed for column sorption studies. The stationary phase in the columns was a mixture of MOR-1-HA and sand, a common inexpensive and inert material typically used in columns. The use of such mixtures instead of the pure composite was found to have several advantages: a) the pieces of the composite material were immobilized (not disturbed and moved by the water flow) and separated by particles of sand, thus ensuring a continuous water flow through the column; b) the pressure exerted by water on the composite was reduced, since part of this pressure was absorbed by the second material (sand); and c) mixing the composite material with a very low cost material such as sand would be economically attractive. It should be noted that no clogging of MOR-1-HA/sand columns was observed after passing several litres of solutions through them. Remarkably, it was found that stationary phases containing only 1% wt. of MOR-1-HA and 99% wt. sand were very effective for the removal of either high or low concentration Cr(VI) from aqueous solutions of various compositions. It could be seen that highly concentrated dichromate solution (C~1080 ppm, pH~3) was decolorized after passing it through the MOR-1-HA/sand column. Also, the stationary phase changed color from cream white to orange(red)-brown after the sorption of significant amount of $Cr_2O_7^{2-}$ anions. The sorbent could be easily regenerated by washing it with ~4 M HCl (FIG. 4B). The regeneration could be visually observed by the restoration of the cream white color of the initial MOR-1-HA/sand stationary phase. Detailed column sorption studies were performed with $Cr_2O_7^{2-}$ solutions of low and trace levels, which cannot be treated with common methods such as precipitation. Specifically, column sorption of a solution (pH~3) of dichromate anions with concentration of 6 ppm resulted in almost no Cr(VI) species (removal capacities ≥98% and total Cr concentrations ≤47 ppb, i.e. below the EU and USA-EPA defined limit for total Cr) for 80 bed volumes (Bed volume=[bed height (cm) cross-sectional area (cm²)] mL) of the effluent (FIG. 5A). After regeneration, a breakthrough curve almost identical to that of the first run was obtained, whereas only a small decrease (~3 bed volumes) of the breakthrough capacity was observed for a third run of the column (FIG. 5A). Column sorption studies have been also conducted with dichromate solutions (pH~3, C=7 ppm) containing 100-fold excess of each of $Cl^-$, $Br^-$ and $NO_3$. Still, the ion exchange column showed significant breakthrough capacity (~43 bed volumes), which was retained exactly the same after its regeneration. Because of the excellent $Cr_2O_7^{2-}$-column sorption properties described above, it was decided to examine the applicability of MOR-1-HA/sand column for remediation of real world water samples intentionally contaminated by trace concentrations of $Cr_2O_7^{2-}$. Specifically, the performance of this ion exchange column was tested for the decontamination of natural spring water solutions (with the pH of the solution adjusted to ~3), to which trace levels of $Cr_2O_7^{2-}$ (total Cr concentration analyzed with ICP-MS ~450 ppb) were added. Note that the tested water solutions contained 27, 28 and 305-fold excess of $SO_4^{2-}$, $NO_3^-$ and $Cl^-$ anions, compared to the initial concentration of dichromate anions. The results indicated that at least 21 samples (bed volumes) collected after running the column three times (with regeneration of the column after each run) contained total Cr in a concentration ≤1 ppb, i.e. well below the allowed total Cr concentration in water, FIG. 5B. Finally, it should be mentioned that no Zr was found in the effluent samples, thus excluding MOR leaching from the column.

The MOR-1-HA sorbent was also capable of absorbing Se species. Thus, the MOR-1-HA/sand column was very effective for the sorption of $SeO_3^{2-}$ in trace levels. Specifically, after passing a solution of $SeO_3^{2-}$ (initial concentration=736 ppb, pH~3) through the column, at least 7 samples (bed volumes) contained Se in concentrations well below the USA-EPA limit (50 ppb) for Se in water (FIG. 6).

In addition, batch $SeO_4^{2-}$ sorption studies were performed. The selenate ion-exchange equilibrium data at two different pH values are shown in FIG. 7. These data could be fitted with the Langmuir or Langmuir-Freundlich models. The maximum sorption capacity was found to be 65(3) and 135(22) mg/g at pH~7.7 and 2.8, respectively. These values correspond to 1.1(1) (pH~7.7) and 2.3(4) (pH~2.8) moles of selenate per formula of MOR-1. Thus, the selenate sorption capacity of the material was close to its theoretical maximum value (3 selenate moles per formula of MOR-1) only at pH ~2.8. Presumably, all amino-groups remain protonated at the low pH value and thus, the material contains more anions (counter ions) to be exchanged by $SeO_4^{2-}$.

Figures 8A, 8B:
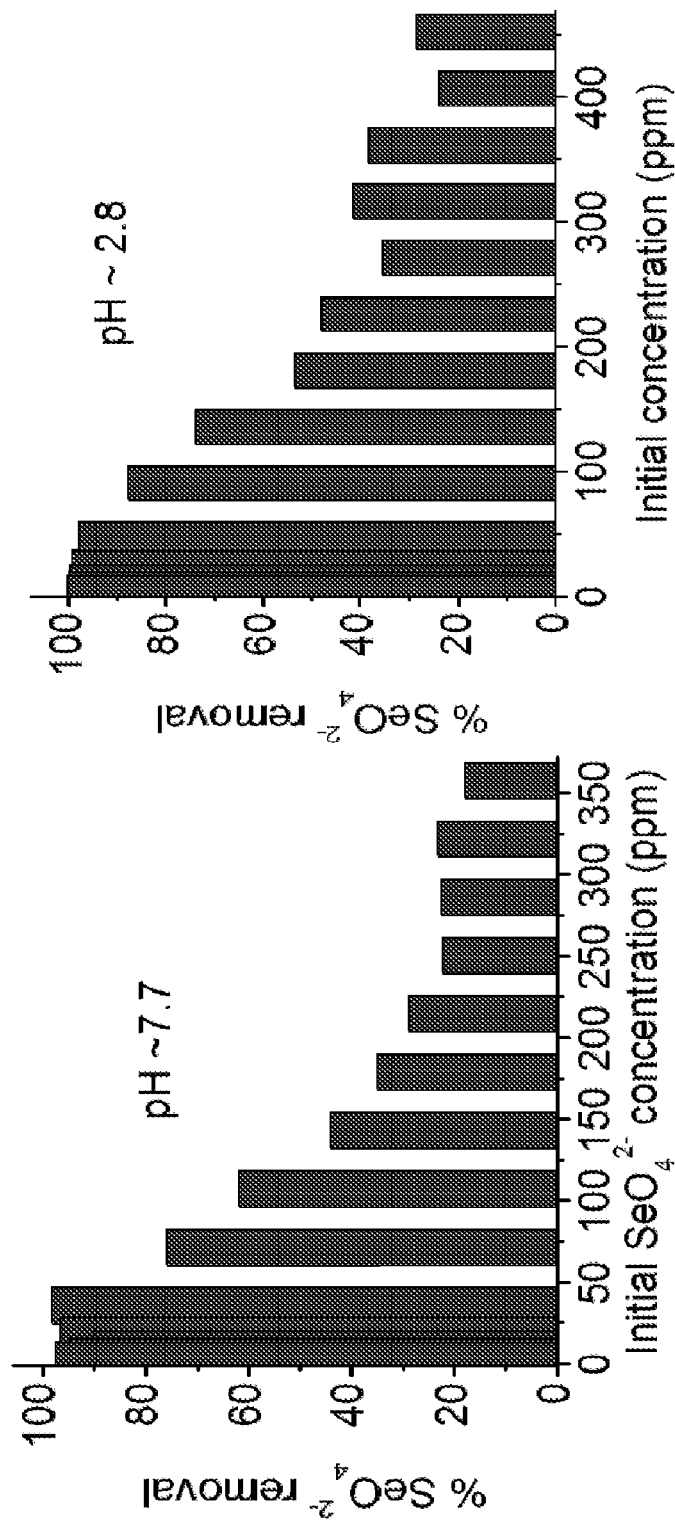
FIG. 8A depicts % selenate removal vs. initial selenate concentration at pH 7.7.
FIG. 8B shows % selenate removal vs. initial selenate concentration at pH 2.8.
Figures 8C, 8D:
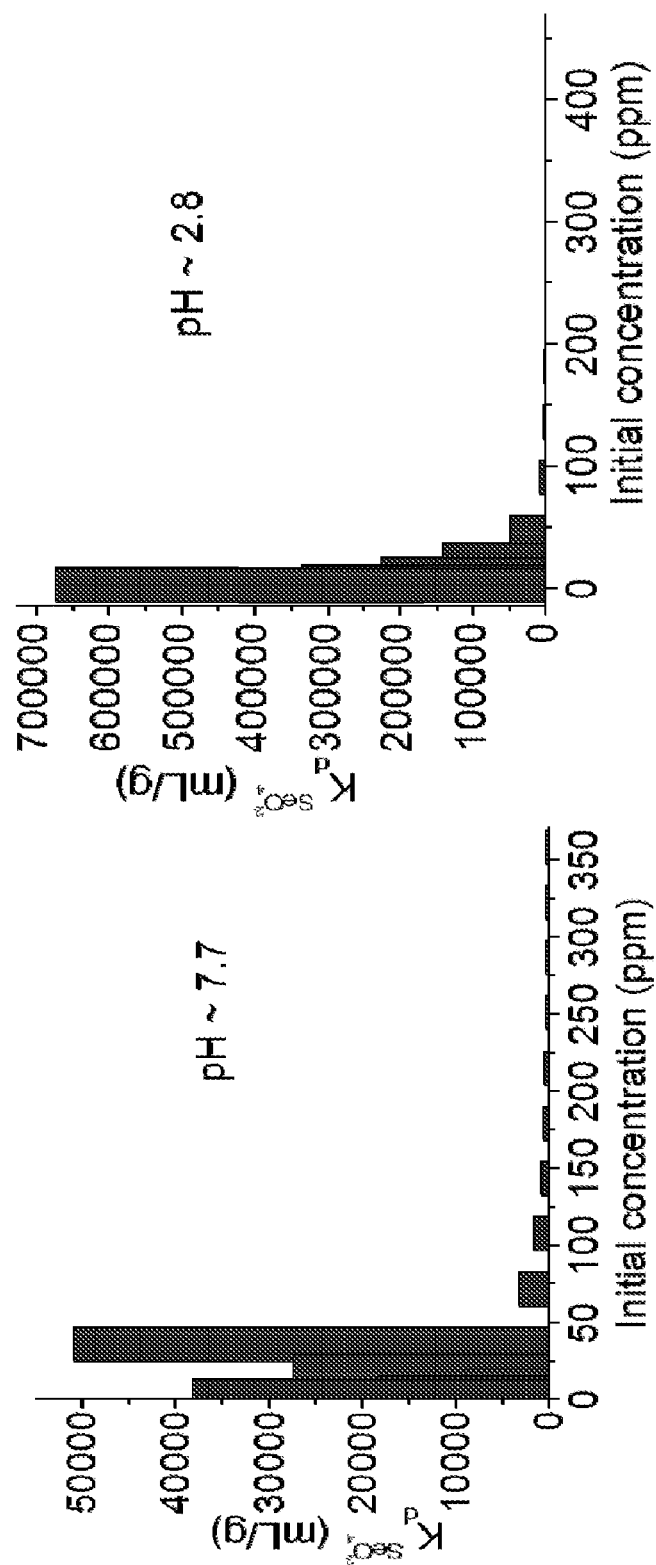
FIG. 8C depicts $K_d$ for selenate removal vs. initial selenate concentration at pH 7.7.
FIG. 8D shows $K_d$ for selenate removal vs. initial selenate concentration at pH 2.8.

The sorbent was particularly effective for the removal of selenate in moderate and trace concentrations. It could be seen that the % $SeO_4^{2-}$ removal capacities were 90-98% for initial concentrations of 2.2-35.7 ppm at pH~7.7 (FIG. 8A), whereas the corresponding values at pH~2.8 were 98-99.9% (FIG. 8B). The maximum $K_d$ values for selenate removal were $5\times10^4$ and $6.7\times10^5$ mL/g at pH ~7.7 and 2.8, respectively. (FIGS. 8(C) and 8(D) The above indicate significantly higher affinity of the sorbent for selenate removal at low pH. Thus, the sorbent may be particularly effective for removing Se species from mining wastewater, which is usually acidic.

Mechanism of Cr(VI)-Sorption

To provide an explanation for the remarkable selectivity of the protonated amino functionalized material for dichromate anions, the interaction energies of $Cr_2O_7^{2-}$, $HOCrO_3^-$, Cl Br, $NO_3^-$, $HOSO_3^-$ and $SO_4^{2-}$ anions with the $[Zr_6O_4(OH)_4(NH_3^+\text{-}BDC)_6]Cl_6$-HA (MOR-1-HA) was calculated, represented by the simple anilinium Ar—$NH_3^+$ cation, employing DFT methods. The calculated interaction energies along with selected structural parameters of the respective associations are compiled in Table 1.

Figure 3C:
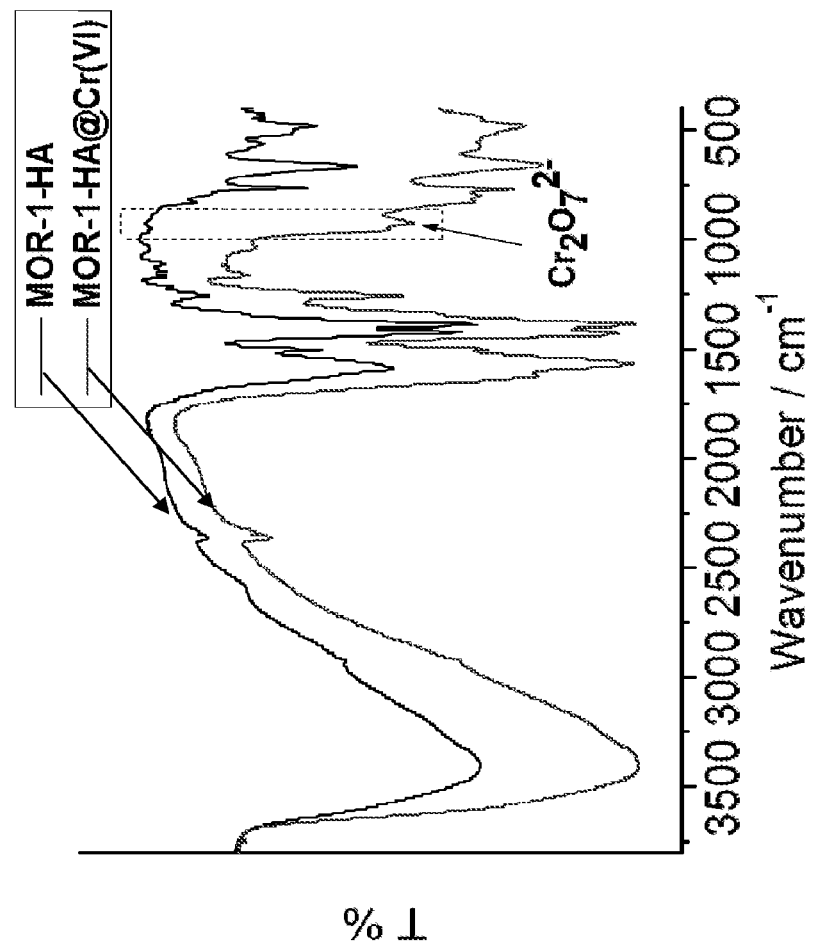
FIG. 3C shows infrared (IR) spectra of MOR-1-HA and MOR-1-HA@Cr(VI).
Figure 3D:
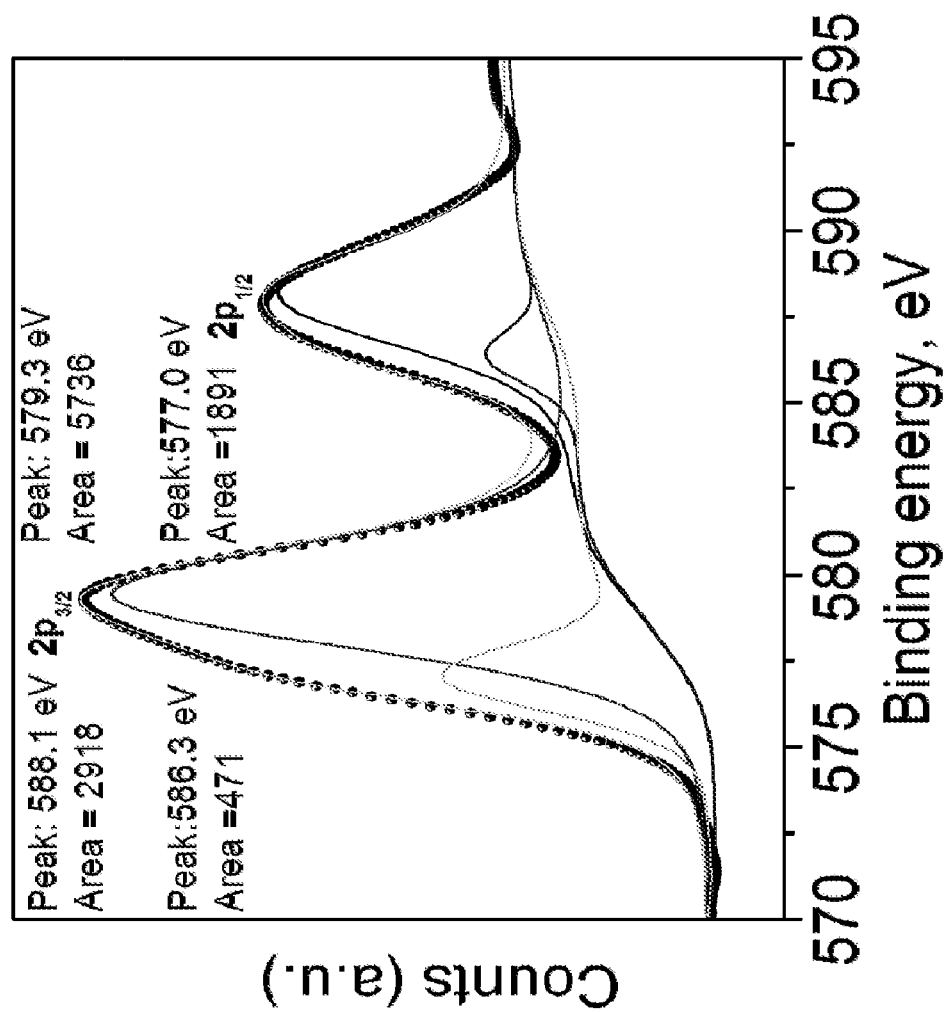
FIG. 3D shows high resolution $Cr2p_{1/2}$ and $Cr2p_{3/2}$ core-level photoelectron spectra (XPS) for MOR-1-HA de-convoluted into two components. The minor signals with binding energy at 586.3 and 577.0 eV are attributed to Cr(III) traces resulted from the known reduction effects under x-ray irradiation.

MOR-1 (1580 cm$^{-1}$) samples (FIG. 3C). Furthermore, the IR peak at 1620 cm$^{-1}$ (assigned to ring stretching vibration) in the spectrum of MOR-1-HA@Cr(VI), which was also present in the IR spectrum of non-protonated MOR, but it is not shown or is of very weak intensity in the spectrum of MOR-1-HA, is indicative of $NH_2$ rather than $NH_3^+$-containing phenyl ring. In addition, the solid-state UV-Vis spectrum for MOR-1-HA@Cr(VI) revealed a broad feature (around 500 nm) in the visible region (not shown in the spectrum of as-prepared MOR-1 and MOR-1-HA), which may be due to charge transfer from the electron rich $NH_2$-$BDC^{2-}$ ligand to the Cr(VI) species (LMCT). The above support strong $NH_2$—Cr(VI) interactions in MOR-1-HA@Cr(VI).

This suggests the transformation of dichromate to $Cr^{VI}O_3$ species, which in turn forms the tetrahedral [(Ar—$NH_2$)$CrO_3$] complex. To test this hypothesis, the equilibrium geometry of the [(Ar—$NH_2$)$CrO_3$] complex in aqueous solution was optimized at the wB97XD/Def2-TZVPPD level of theory, FIGS. 10A-10B. The formation of such a complex may be promoted by the significant acidity of anilinium ion (the pKa of the anilinium ion is lower than 4.6). Anilinium may interact with the bridging O atom (nucleophilic center) of $Cr_2O_7^{2-}$, enforcing the rupture of a O—Cr bridging bond with concomitant coordination of aniline to $CrO_3$ fragment and formation of $HOCrO_3^-$ anion. The latter subsequently re-equilibrates to produce $Cr_2O_7^{2-}$:

TABLE 1

Interaction energies, IE (in kcal/mol) and selected structural parameters (bond lengths in Å, bond angles in degrees) for the Ar—$NH_3^+$···A (A = Cl$^-$, Br$^-$, $NO_3^-$, $HOSO_3^-$, $HOCrO_3^-$, $Cr_2O_7^{2-}$) associations in aqueous solutions calculated by the wB97XD/Def2-TZVPPD/PCM computational protocol.

| Anion | IE | R(O···H—N) | R(N—H) | <O···H—N |
|---|---|---|---|---|
| Cl$^-$ | 11.7 | 1.942 | 1.070 | 176.1 |
| Br$^-$ | 9.9 | 2.139 | 1.061 | 176.0 |
| $NO_3^-$ | 13.3 | 1.597 | 1.071 | 175.7 |
| $HOSO_3^-$ | 12.0 | 1.660 | 1.055 | 166.6 |
|  |  | 2.478 | 1.020 | 110.3 |
| $HOCrO_3^-$ | 12.6 | 1.672 | 1.052 | 159.4 |
|  |  | 2.142 | 1.024 | 127.9 |
| $Cr_2O_7^{2-}$ | 15.5 | 1.637 | 1.055 | 163.1 |

Interestingly, the calculations indicated that $SO_4^{2-}$ abstracts a $NH_3^+$ proton from the Ar—$NH_3^+$ cation yielding $HOSO_3^-$ anions via an exothermic process (exothermicity of −26.7 kcal/mol). Thus, in $Cr_2O_7^{2-}$/$SO_4^{2-}$ competition ion-exchange reactions with MOR-1-HA, the actual competitor for dichromate exchange was $HOSO_3^-$. The latter as a monovalent anion is expected to be less competitive than $SO_4^{2-}$ for Cr(VI) sorption. This can be one of the reasons for the relatively high selectivity of MOR-1-HA for Cr(VI) vs. $SO_4^{2-}$, which was experimentally observed.

Among the anions studied, the $Cr_2O_7^{2-}$ anion shows the strongest interactions (15.6 kcal/mol). However, the estimated values of the interaction energies for the Ar—$NH_3^+$ . . . A (A=Cl$^-$, Br$^-$, $NO_3^-$, $HOSO_3^-$, $HOCrO_3^-$, $Cr_2O_7^{2-}$) associations could not fully explain the high selectivity of the material under study towards $Cr_2O_7^{2-}$ anions and the limited selectivity for the rest of the competitive anions in the series. Therefore, this selectivity could be due to much stronger interactions between the $Cr_2O_7^{2-}$ anions and the Ar—$NH_3^+$ cation. Experimental IR-data indicated that the amine-deformation band was significantly red-shifted for MOR-1-HA@Cr(VI) (1565 cm$^{-1}$) compared to that for pristine MOR-1-HA (1590 cm$^{-1}$) and as prepared

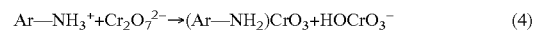

The condensation of the $HOCrO_3^-$ anion to form $Cr_2O_7^{2-}$ is particularly an enthalpy driven reaction with a dimerization constant K=159 at standard conditions.

The formation of the (Ar—$NH_2$)$CrO_3$ complex is an almost thermoneutral process, the endothermicity found to be 1.8 kcal/mol. The presence of six $NH_3^+$ functional groups per $Zr_6$ cluster affords six moles of the (Ar—$NH_2$)$CrO_3$ complex, thus accounting well for the experimentally observed sorption of ~3 moles of $Cr_2O_7^{2-}$ per formula unit of the MOR (FIGS. 10A-10B).

Oxochromium(VI)-amine complexes are well-known compounds and many of them have been used as oxidants in organic synthesis. The brick-red color of the oxochromium (VI)-amine complexes can account well for the change of color from cream white to orange(red)-brown of the MOR-1-HA sorbent observed experimentally.

Figure 10A:
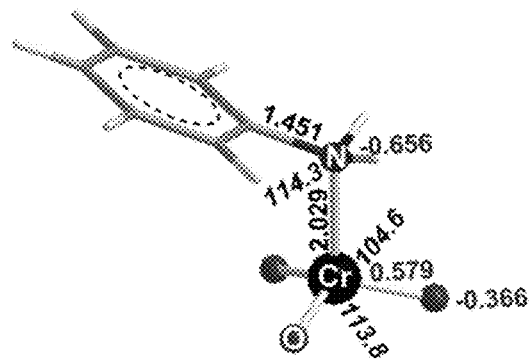
FIG. 10A shows equilibrium geometry of the (Ar—NH$_2$) CrO$_3$ complex in aqueous solution, along with selected structural parameters (bond lengths in A and bond angles in degrees and the natural atomic charges on the donor atoms constituting the coordination sphere and the central Cr atom.
Figure 10B:
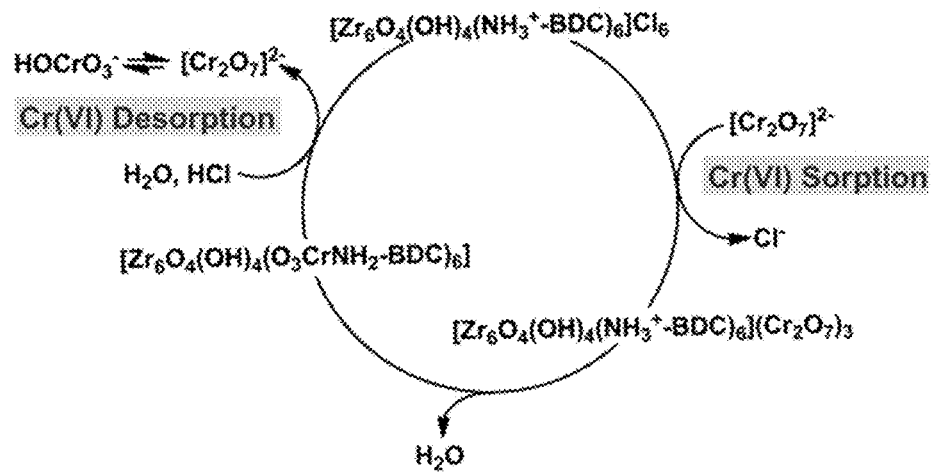
FIG. 10B shows a suggested mechanism for the Cr(VI) sorption and desorption.

The regeneration of the MOR-1-HA columns by treating them with concentrated HCl solutions (1.2-4 M) can be easily explained by the acidic hydrolysis of the (Ar—$NH_2$)$CrO_3$ complex [(Ar—$NH_2$)$CrO_3$]+$H_2O$→Ar-$NH_3^+$+HO- $CrO_3^-$ with concomitant dimerization of $HOCrO_3^-$ to $Cr_2O_7^{2-}$ (FIGS. 10A-10B). The exothermicity of the hydrolysis is predicted to be 30.5 kcal/mol at the wB97XD/Def2-TZVPPD level. The estimated binding energy of the aniline ligand with the $CrO_3$ moiety was 34.4 kcal/mol, while the negative natural atomic charge on the coordinated N donor atom renders the N atom susceptible to electrophilic attack by the $H^+$ ions, which is transformed to ammonium $NH_3^+$ salt, thus regenerating the MOR-1-HA column.

Experimental Section

Synthesis of MOR-1

$ZrCl_4$ (0.625 gr, 2.7 mmol) and $NH_2$—$H_2BDC$ (0.679 gr, 3.75 mmol) were dissolved in 75 mL DMF and 5 mL HCl in a jar. The jar was sealed and placed in an oven operated at 120° C., remained undisturbed at this temperature for 20 h, and then was allowed to cool at room temperature. White powder of MOR-1 was isolated by filtration and dried in the air. Yield: 1 g.

Synthesis of MOR-1-HA Composite

Method A. 0.1 g of sodium alginate was dissolved in 200 mL of warm water, and the solution was allowed to cool. To the alginate solution 0.1 g of MOR-1 was added. 0.1 g of $CaCl_2$ was then added into the alginate-MOR-1 suspension with continuous stirring. The composite MOR-1-CA immediately precipitated and was then isolated by filtration, washed with water and acetone and vacuum dried. To isolate the MOR-1-HA material, MOR-1-CA (0.2 g) was treated with 4 M HCl (50 mL) for ~1 h. Yield: 0.85 g.

Method B. This method is similar to Method A, with the difference that HCl solution (final concentration ~4 M) was added to the alginate-MOR-1 suspension instead of $CaCl_2$). Prior to the batch and column sorption studies, the MOR-1-HA was further treated with 4 M HCl to ensure full protonation of the MOR-1.

Method C. $ZrCl_4$ (0.625 gr, 2.7 mmol) and $NH_2$—$H_2BDC$ (0.679 gr, 3.75 mmol) were dissolved in 40 mL $H_2O$ and 10 mL $CH_3COOH$ in a round-bottom flask. The solution was heated under reflux conditions for ~2 h. A fine suspension of the MOR-1 formed and was allowed to cool. Then, SA solution (80 mL of 0.05% SA water solution) was added to the suspension of MOR-1. Precipitation of the MOR-1-HA was immediately observed. To complete the precipitation, HCl was added (final concentration ~4 M). MOR-1-HA was isolated by filtration, washed with water and acetone and vacuum dried. Yield ~1 g. Thermal analysis data (in combination with EDS) indicated the formula $[Zr_6(OH)_4O_4(NH_3C_8O_4H_3)_6]Cl_6 \cdot 21H_2O$-HA.

Preparation of the Column 50 mg of MOR-1-HA composite and 5 g of sand (50-70 mesh) was mixed in a mortar and pestle and filled in a glass column.

Batch Ion-Exchange Studies

A typical ion-exchange experiment of MOR-1-HA with $Cr_2O_7^{2-}$ was the following: In a solution of $K_2Cr_2O_7$ (0.4 mmol, 117 mg) in water (10 mL, pH ~3), compound MOR-1-HA (0.04 mmol, 100 mg) was added as a solid. The mixture was kept under magnetic stirring for ≈1 h. Then, the polycrystalline material, which had orange(red)-brown color, was isolated by filtration, washed several times with water and acetone and dried in air.

The Cr(VI) uptake from solutions of various concentrations was studied by the batch method at V:m ~1000 mL/g, room temperature and 1 h contact. These data were used to determine Cr(VI) sorption isotherms. UV-Vis was used for analysis of dichromate solutions with concentration ≥1 ppm. The solutions with Cr(VI) content less than 1 ppm were analyzed with ICP-MS.

The competitive and variable pH ion exchange experiments were also carried out with the batch method at V:m ratio (1000) mL/g, room temperature and 1 h contact.

To determine the sorption kinetics, Cr(VI) ion-exchange experiments of various reaction times (1-60 min) have been performed. For each experiment, a 10 mL sample of $Cr_2O_7^{2-}$ solution (initial dichromate concentration=21.6 ppm, pH~3) was added to each vial and the mixtures were kept under magnetic stirring for the designated reaction times. The suspensions from the various reactions were filtrated and the resulting solutions were analyzed for their chromium content with ICP-MS. Batch sorption studies for Se-containing solutions were performed similarly as for Cr(VI).

Column Ion-Exchange Studies

Several bed volumes of the solution were passed through the column and collected at the bottom in glass vials. The solutions with $Cr_2O_7^{2-}$ concentration ≥1 ppm were analyzed with UV-Vis, whereas the Cr content of those with smaller concentration was determined with ICP-MS. Column sorption studies for Se-containing solution were performed similarly as for Cr(VI).

Physical Measurements

PXRD diffraction patterns were recorded on a Bruker D8 Advance X-ray diffractometer (CuKa radiation, λ=1.5418 Å). Energy Dispersive Spectroscopy (EDS) were performed using a JEOL JSM-6400V scanning electron microscope (SEM) equipped with a Tracor Northern EDS detector. Data acquisition was performed with an accelerating voltage of 25 kV and 40 s accumulation time. Thermogravimetric analysis (TGA) was carried out with a Shimatzu TGA 50. Samples (10±0.5 mg) were placed in a quartz crucible. X-ray photoelectron spectroscopy was performed on a Perkin Elmer Phi 5400 ESCA system equipped with a Mg Kα x-ray source. Samples were analyzed at pressures between $10^{-9}$ and $10^{-8}$ Torr with a pass energy of 29.35 eV and a take-off angle of 45°. All peaks were referred to the signature $C_{1s}$ peak for adventitious carbon at 284.6 eV. The peaks were fitted by using the software XPSPEAK41. UV/vis Cr(VI) solution spectra were obtained on a Shimadzu 1200 PC in the wavelength range of 200-800 nm. IR spectra were recorded on KBr pellets in the 4000-400 $cm^{-1}$ range using a Perkin-Elmer Spectrum GX spectrometer. Gas sorption isotherms were measured on a Quantachrome NOVA 3200e volumetric analyzer. The solutions with Cr(VI) content less than 1 ppm were analyzed with Inductively Coupled Plasma-Mass Spectroscopy (ICP-MS) using a computer-controlled Thermo Fisher X Series II Inductively Coupled Plasma Mass Spectrometer with a quadruple set-up equipped with Collision Cell Technology.

Example 2

Figure 11:
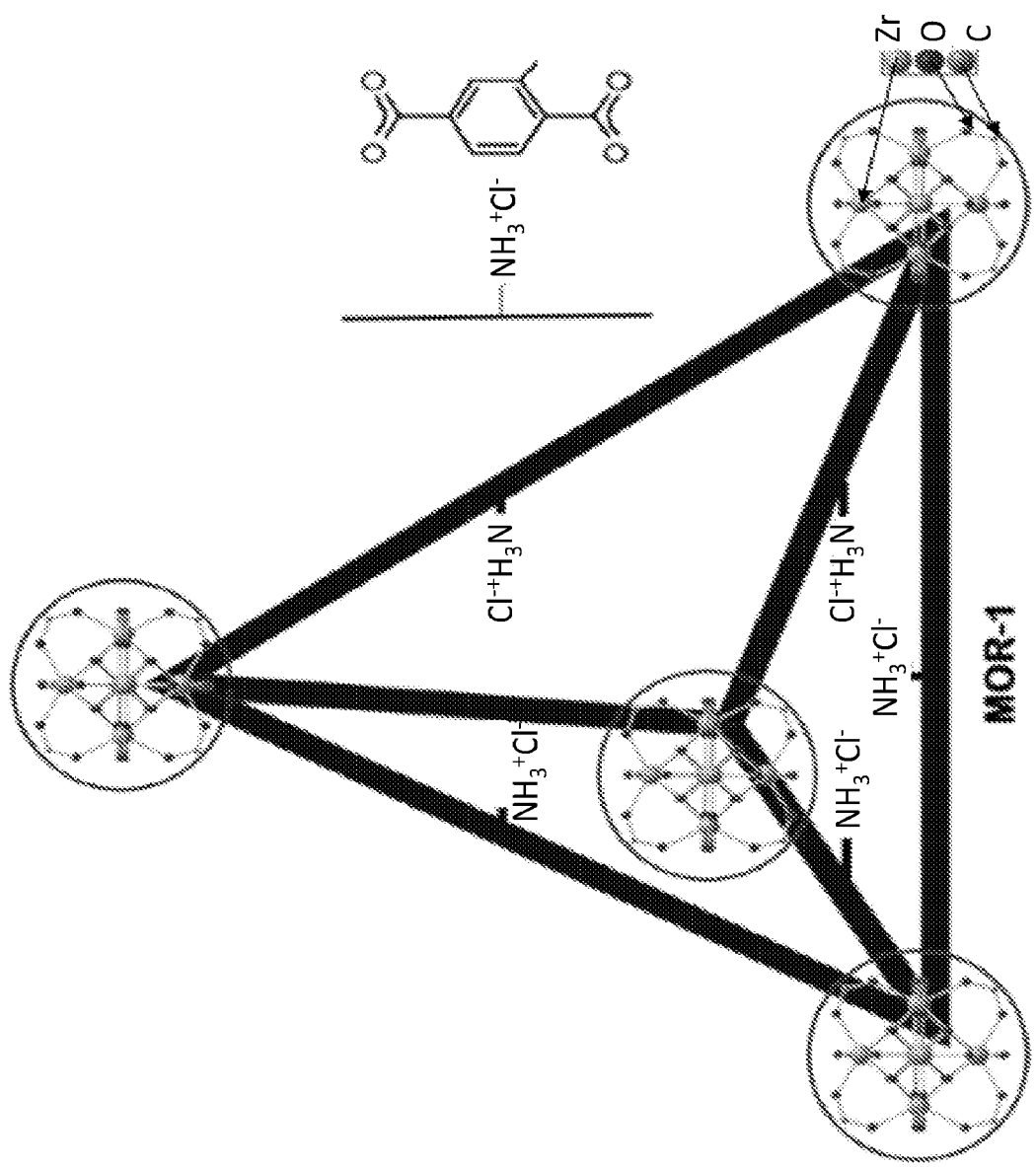
FIG. 11 depicts the structure of (protonated) MOR-1, represented as a tetrahedral cage.

This example reports a new synthetic method for the isolation of purely microporous and highly crystalline MOR-1 and its composite form MOR-1-HA, which involves acidified water as a solvent and is completed within an hour. (The structure of (protonated) MOR-1 is shown in FIG. 11.) The obtained materials show exceptional capability to absorb hexavalent chromium under a diverse range of experimental conditions, including pH of the solution and the presence of competitive ions. Importantly, the composite MOR-1-HA is particularly suitable to be used in an ion-exchange column, showing excellent Cr(VI) absorption properties. In addition, for the first time it is shown that the MOR-1-HA column is efficient for the decontamination of industrial (chrome plating) Cr(VI) wastewater samples. Considering the relatively low cost, and the fast and environmentally friendly synthesis method of the MOR-1-HA reported here, the MOR-1-HA column seems promising for real-world applications in the field of environmental remediation.

Results and Discussion

Synthesis of MOR-1 and MOR-1-HA Composite

Figure 12:
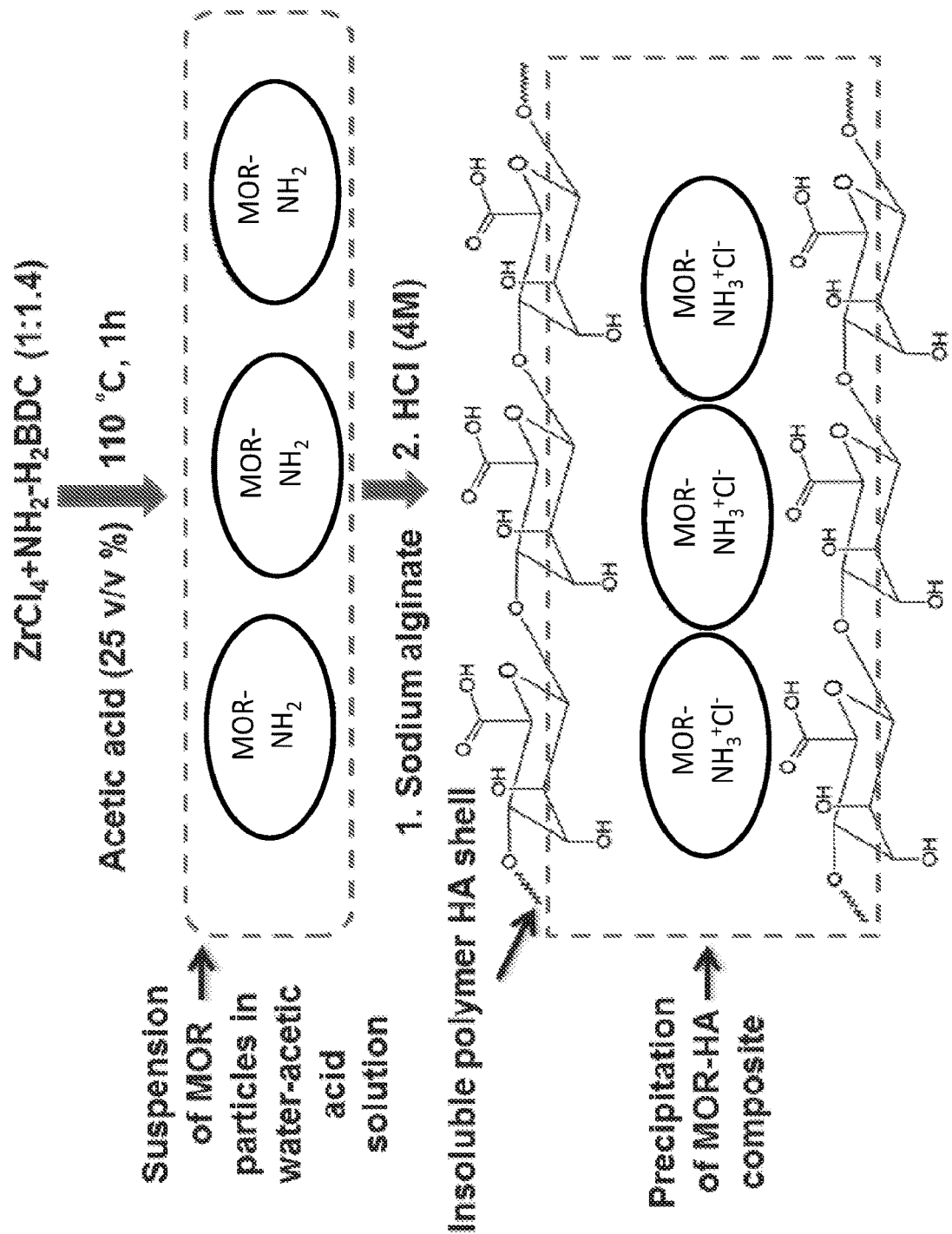
FIG. 12 shows schematics for the isolation of the MOR-1-HA composite with the reflux-SA addition method.

In Example 1, MOR-1-HA composite was prepared via a three-step procedure involving: a) synthesis of MOR-1 via a solvothermal reaction in DMF/HCl solution; b) encapsulation of MOR-1 by calcium alginate (CA) resulting in a MOR-1-CA composite; and c) formation of MOR-1-HA material by treatment of MOR-1-CA with HCl acid. Alternatively, the MOR-1-HA could be prepared by addition of HCl acid in a water suspension of MOR-1 and sodium alginate (SA). As mentioned above, the material would be more attractive for applications if it could be synthesized with a fast and inexpensive synthesis method involving minimal quantities of organic solvents. Recently, it was shown that a UiO-66-amino functionalized type metal organic framework could be isolated with a reflux reaction of almost equimolar $Zr(NO_3)_4$ and $NH_2$—$H_2BDC$ (2-aminoterephthalic acid) in water-acetic acid solutions. (Z. Hu, Y. Peng, Z. Kang, Y. Qian, and D. Zhao, Inorg. Chem., 2015, 54, 4862.) However, the reported material showed structural characteristics that differ from those of the compound isolated from the reaction with DMF (J. H. Cavka, S. Jakobsen, U. Olsbye, N. Guillou, C. Lamberti, S. Bordiga and K. P. Lillerud, J. Am. Chem. Soc., 2008, 130, 13850; M. J. Katz, Z. J. Brown, Y. J. Colon, P. W. Siu, K. A. Scheidt, R. Q. Snurr, J. T. Hupp and O. K. Farha, Chem. Commun., 2013, 49, 9449; M. Kandiah, M. H. Nilsen, S. Usseglio, S. Jakobsen, U. Olsbye, M. Tilset, C. Larabi, E. A. Quadrelli, F. Bonino and K. P. Lillerud, Chem. Mater., 2010, 22, 6632). It was thus challenging to isolate hydrothermally a UiO-66-amino functionalized material (i.e. MOR-1) with the same features as those of the well-known material prepared with solvothermal reaction. This synthesis was attempted by modifying the reported reflux synthesis method (FIG. 12). Thus, the same $Zr^{4+}$ source (i.e. $ZrCl_4$) and a ligand to metal salt molar ratio (~1.4) equal to those used in the solvothermal synthesis of UiO-66-$NH_2$BDC were employed, with the difference that in our synthesis the solvent was a mixture of water and acetic acid (25 v/v % acetic acid). This reaction resulted in a fine suspension of the MOR which was formed in less than 1 h. The product of this reaction, isolated via centrifugation, contained impurities, probably some amount of unreacted organic ligand. Indeed, treating the product with HCl acid solution, which can dissolve the $NH_2$—$H_2BDC$ ligand, resulted in the isolation of pure MOR-1 in ~70% yield. After the method for the isolation of the high quality UiO-66 amino-functionalized material was established, the next step was the preparation of the MOR-1-HA composite. Fortunately, the isolation of the composite did not involve the separation process via centrifugation followed for MOR-1, which is time-consuming and not attractive for large scale synthesis of materials. The isolation of materials forming colloidal solutions requires the use of flocculation agent that causes agglomeration of the particles thus simplifying the separation process. Such a flocculation agent could be sodium alginate, which in an acidic environment is transformed to alginic acid. The latter forms an insoluble polymer shell around MOR particulates, resulting in the precipitation-easy separation of the solid from the solution (FIG. 12). Indeed, by adding sodium alginate to the MOR-1 water-acetic acid suspension, the MOR-1-HA was readily precipitated and could be isolated via simple filtration. Only a small amount of sodium alginate was required for the isolation of the composite material, and thus the composite showed almost identical properties to those of the pristine MOR material. Specifically, the composite isolated contained alginic acid in an amount up to 2.1% wt. (see experimental section, supporting information). The obtained product was further treated with HCl acid to dissolve the unreacted $NH_2$—$H_2BDC$ ligand and complete the protonation of the amino-functional groups of the material. Studies for the formation of the material vs. the reaction time were also performed. The results indicated that a) a significant amount of MOR-1-HA was formed within only 5 min; and b) an hour of reflux reaction was enough to achieve the maximum possible yield for the isolation of the MOR-1-HA composite material.

Characterization of MOR-1 and MOR-HA Materials

Figure 13:
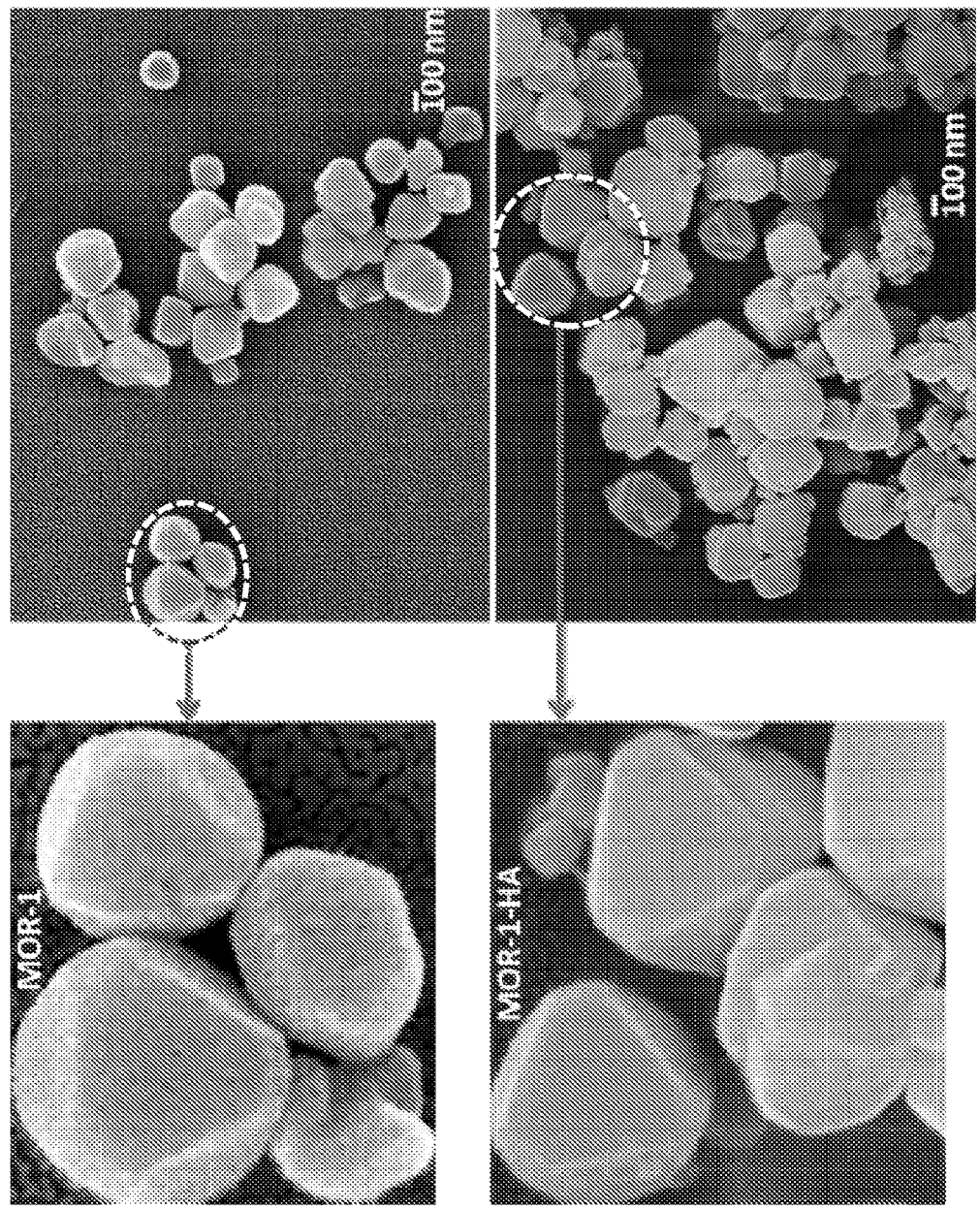
FIG. 13 contains FE-SEM images for MOR-1 and MOR-1-HA and enlarged views of some particles of these materials.

Field Emission-Scanning electronic microscopy (FE-EM) images showed that both the MOR-1 and MOR-1-HA materials were composed of aggregated polyhedral-shape nanoparticles with size ~150-300 nm. (FIG. 13). High-magnification images revealed that the nanoparticles of MOR-1 were spongy with relatively large voids, whereas those of MOR-1-HA contained significantly smaller pores in their surface. Presumably, this was due to the fact that a thin layer of alginic acid covered the large pores in the surface of MOR-1 nanoparticles, thus creating the denser nanoparticles of the composite. Therefore, MOR-1-HA isolated in a relatively compact form was much less dispersed in water, and thus could be successfully utilized in columns (see below). Note that no clear shape and size of nanoparticles could be observed by SEM studies of MOR-1 isolated from the solvothermal reaction in DMF and the corresponding MOR-1-HA material. Thus, in this case, differences in morphology between MOR-1 and MOR-1-HA particles could not be observed. Here, for the first time, the clear differences between MOR-1 and MOR-1-HA materials could be visualized, which may explain their different capability to form or not fine suspension in water.

Powder X-ray diffraction (PXRD) studies indicated that MOR-1 isolated with the 1 h reflux reaction after its purification with HCl acid shows the typical structure of UiO-66 type materials (FIG. 14A. Elemental (C,H,N), energy-dispersive spectroscopy (EDS) (indicating Zr:Cl molar ratio ~1) and thermal analysis (TGA) data indicated the formula $[Zr_6O_4(OH)_4(NH_3^+\text{-}BDC)_6]Cl_6.35H_2O$ for MOR-1. PXRD (FIG. 14A) and EDS (revealing Zr:Cl molar ratio-1) data for the composite sample confirmed its close similarity to the pristine MOR-1 solid. TGA data were also used for the determination of the water content of composite material (~19 water molecules).

Nitrogen physisorption measurements recorded at 77 K for the activated MOR-1 and MOR-1-HA revealed type-I adsorption isotherms, characteristic of microporous solids (FIG. 14B). The Brunauer-Emmett-Teller (BET) surface areas of the MOR-1 and MOR-1-HA were determined to be 1097 (Langmuir 1638 $m^2/g$) and 1182 (Langmuir 1670 $m^2/g$) $m^2/g$ respectively. These values fall within the range of surface areas found for amino-functionalized UiO-66 type materials prepared with solvothermal reactions (J. H. Cavka, S. Jakobsen, U. Olsbye, N. Guillou, C. Lamberti, S. Bordiga and K. P. Lillerud, J. Am. Chem. Soc., 2008, 130, 13850; M. J. Katz, Z. J. Brown, Y. J. Colon, P. W. Siu, K. A. Scheidt, R. Q. Snurr, J. T. Hupp and O. K. Farha, Chem. Commun., 2013, 49, 9449; M. Kandiah, M. H. Nilsen, S. Usseglio, S. Jakobsen, U. Olsbye, M. Tilset, C. Larabi, E. A. Quadrelli, F. Bonino and K. P. Lillerud, Chem. Mater., 2010, 22, 6632.) $CO_2$ adsorption isotherms at 1 bar and 273 K indicated a sorption capacity of ~4.4 mmol/g for both samples. Analysis of $CO_2$ adsorption data with the density function theory (DFT) suggested that both MOR-1 and MOR-1-HA had a microporous network with pore size in the range of 8-9 Å. Interestingly, the MOR-1 and MOR-1-HA polymers presented here showed significantly higher surface area and $CO_2$ sorption capacity compared to those (BET=833 m$^2$/g, Langmuir=1073 m$^2$/g; $CO_2$ sorption capacity=2.8 mmol/g at 273 K) for the reported UiO-66 amino-functionalized compound prepared by a hydrothermal reaction. (Z. Hu, Y. Peng, Z. Kang, Y. Qian, and D. Zhao, *Inorg. Chem.*, 2015, 54, 4862.) Furthermore, the type-I shape for the isotherms of MOR-1 and MOR-1-HA indicated a predominantly microporous structure, whereas the reported UiO-66-$NH_2$BDC solid isolated hydrothermally showed a combination of type-I and type-IV isotherms revealing the existence of both micro- and mesoporosity. Thus, here is proposed for the first time a hydrothermal synthesis approach that yields amino-functionalized UiO-66-type materials with same characteristics as those found in the UiO-66-$NH_2$BDC compound prepared with typical solvothermal reaction.

Isolation and Characterization of Cr(VI)-Containing Material

The isolation of the Cr(VI)-loaded composite material [MOR-1-HA@Cr(VI)] was achieved by treating it with a $Cr_2O_7^{2-}$ water solution for ~1 h. An anion-exchange reaction is taking place represented by the following equation:

$[Zr_6O_4(OH)_4(NH_3^+\text{-}BDC)_6]Cl_6\text{-}HA+3Cr_2O_7^{2-} \rightarrow$ $[Zr_6O_4(OH)_4(NH_3^+\text{-}BDC)_6](Cr_2O_7)_3\text{-}HA+6Cl^-$ (1)

EDS analysis showed no Cl in the Cr(VI)-exchanged material. Furthermore, analytical data from ICP-MS, EDS and UV-Vis spectroscopy indicated a Zr:Cr molar ratio of ~1, consistent with the replacement of 6 Cl$^-$ by 3 $Cr_2O_7^{2-}$ anions. PXRD data of MOR-1-HA@Cr(VI) indicated that the structure of the UiO-66 type framework was preserved after the ion-exchange process (FIG. 14A). The presence of Cr(VI) ions was also evidenced by IR, which showed a characteristic peak at 924 cm$^{-1}$ attributed to the anti-symmetric Cr$^{VI}$O$_3$-stretch. Furthermore, XPS data showed the presence of Cr2p$_{1/2}$ and Cr2p$_{3/2}$ core-level signals. The main components of these peaks corresponded to binding energies (588.1 and 579.2 eV), which are characteristic of Cr in the (VI) valence state. The insertion of Cr(VI) species into the pores was also demonstrated by the substantially smaller BET surface area of Cr(VI) exchanged samples compared to that of pristine composite material. Thus, after the Cr(VI) exchange process, the surface area dropped from 1182 m$^2$/g for MOR-1-HA to 298 m$^2$/g for MOR-1-HA@Cr(VI) (FIG. 14B).

Figure 15:
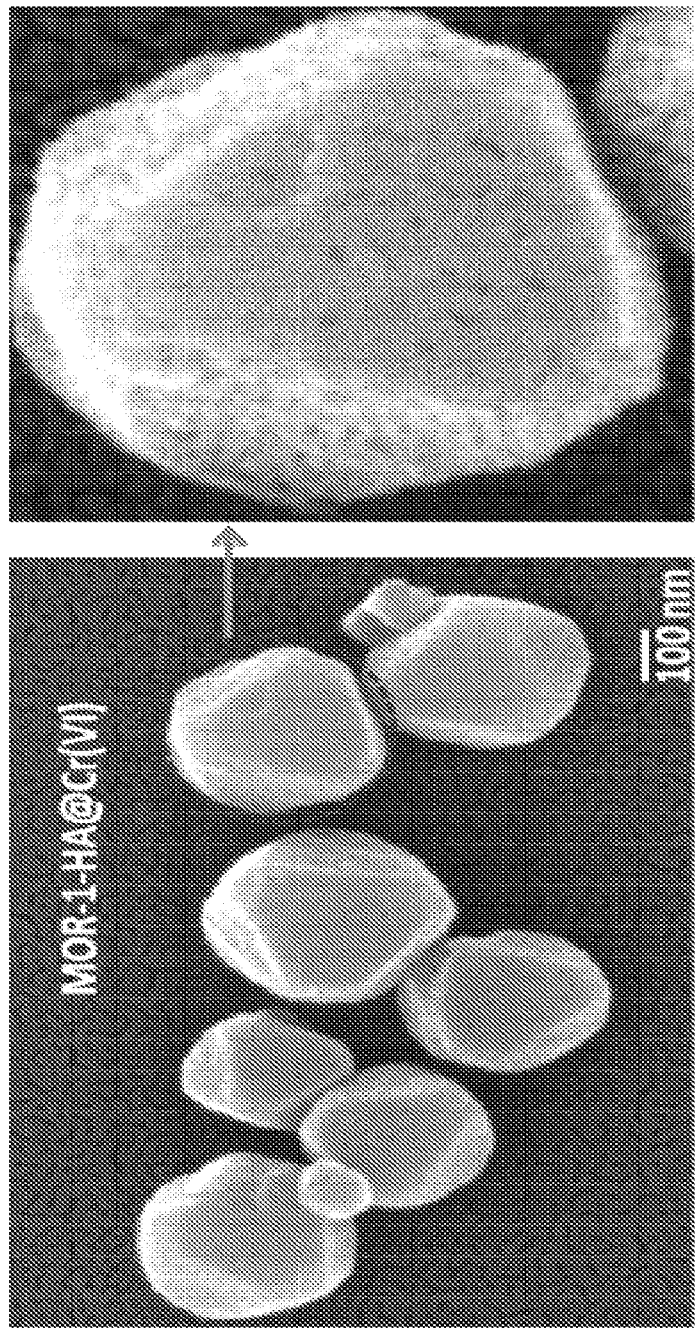
FIG. 15 is an FE-SEM image for MOR-1-HA@Cr(VI) and an enlarged view of one MOR-1-HA@Cr(VI) particle.

Finally, FE-SEM studies indicated that the nanoparticles of MOR-1-HA@Cr(VI) retained the polyhedral shape of the MOR-1-HA particles (FIG. 15). However, the MOR-1-HA@Cr(VI) nanoparticles contained some defects and relatively large pores in their surface, which presumably resulted from the ion-exchange process.

Batch Ion Exchange Studies

Ion-Exchange Isotherm Data

Cr(VI) equilibrium ion-exchange studies for MOR-1-HA were performed at pH~3, in order to reproduce the usual acidic conditions of Cr(VI)-bearing industrial wastewater. Under such conditions, the main form of Cr(VI) was $Cr_2O_7^{2-}$, with some contribution from $HCrO_4^-$ at dilute Cr(VI) acidic solutions.

Figure 16:
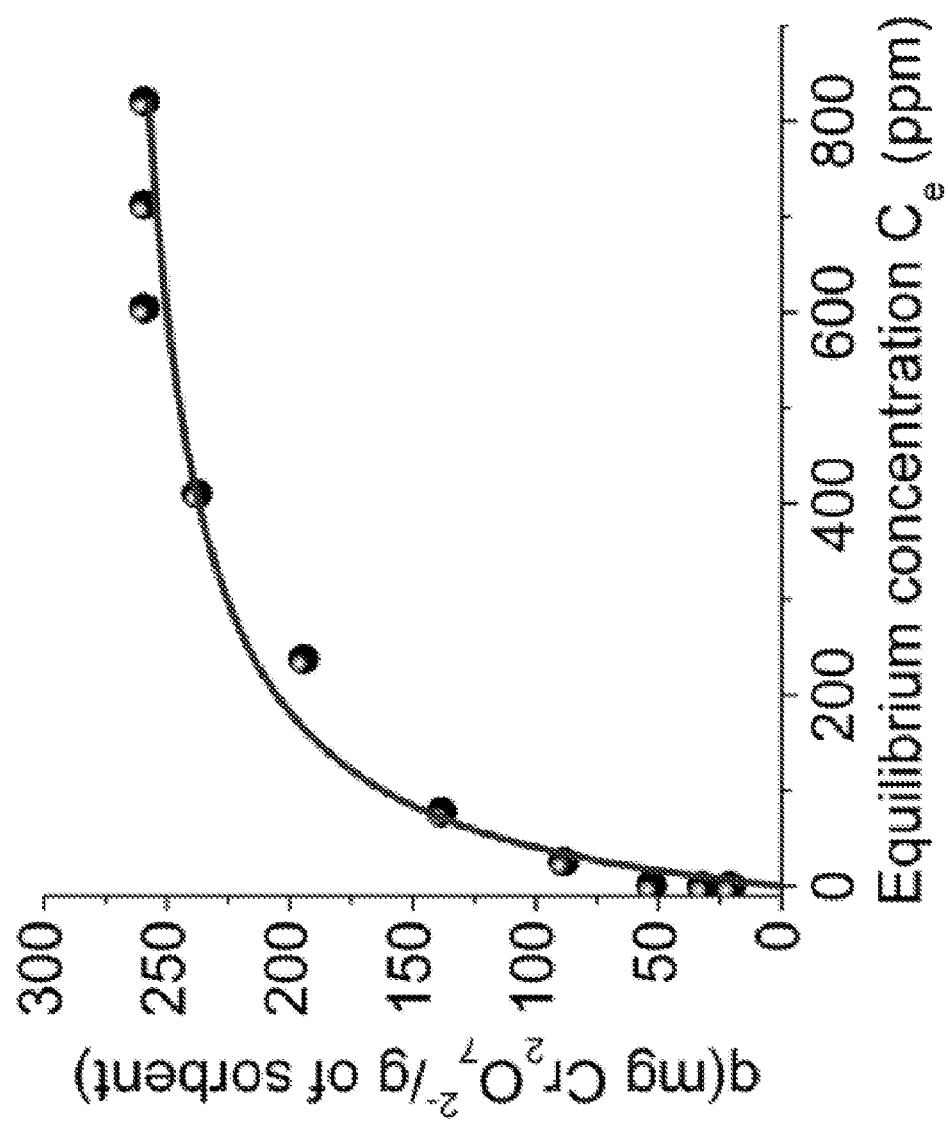
FIG. 16 shows equilibrium $Cr_2O_7^{2-}$ sorption data for MOR-1-HA material (pH~3). The solid line represents the fitting of the data with the Langmuir model.

Fitting of the isotherm data with the Langmuir equation (FIG. 16) revealed a maximum sorption capacity of 280±19 mg $Cr_2O_7^{2-}$/g of MOR-1-HA, which corresponded to a capacity of 286.0±19.4 $Cr_2O_7^{2-}$ mg/g of MOR-1, considering that the composite contains ~97.9% MOR-1. This sorption capacity was consistent with the absorption of 3.1±0.2 moles of $Cr_2O_7^{2-}$ per formula unit of the MOR ([$Zr_6O_4$(OH)$_4$(NH$_3^+$-BDC)$_6$]Cl$_6$·xH$_2$O, x~19 for the MOR component of the composite), which was close to its maximum sorption capacity (3 moles per formula unit). Fitting of the isotherm data could also be done using the Freundlich model.

The high efficiency of the composite for dichromate sorption was also revealed by the values of the distribution coefficient $K_d$ calculated by the following equation:

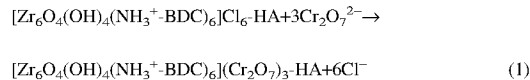

$$K_d = \frac{V[C_0 - C_f]/C_f}{m} \quad (2)$$

where $C_0$ and $C_f$ are the initial and equilibrium concentrations of $Cr_2O_7^{2-}$ (ppm) respectively, V is the volume (ml) of the testing solution and m is the amount of the ion exchanger (g) used in the experiment. The maximum $K_d Cr_2O_7$ values obtained from the batch equilibrium studies are in the range 4.5×10$^4$-1.2×10$^5$ mL/g. Such values are considered excellent and indicate the exceptional affinity of the material for Cr(VI). The material could be also regenerated and reused for Cr(VI) sorption, as indicated by the column sorption studies (see below).

The ion-exchange studies focused on the composite and not on the pristine MOR, since only the composite form is suitable for column ion-exchange (see below). For comparison, however, the isotherm $Cr_2O_7^{2-}$ sorption data for the MOR-1 material has also been determined). The results revealed a maximum sorption capacity of 321±16 $Cr_2O_7^{2-}$ mg/g of MOR-1, slightly higher than that found for the composite. Thus, the presence of alginic acid in such a small quantity (~2% wt.) in the composite resulted in a minor differentiation of the ion-exchange properties of the metal organic material.

Figure 17A:
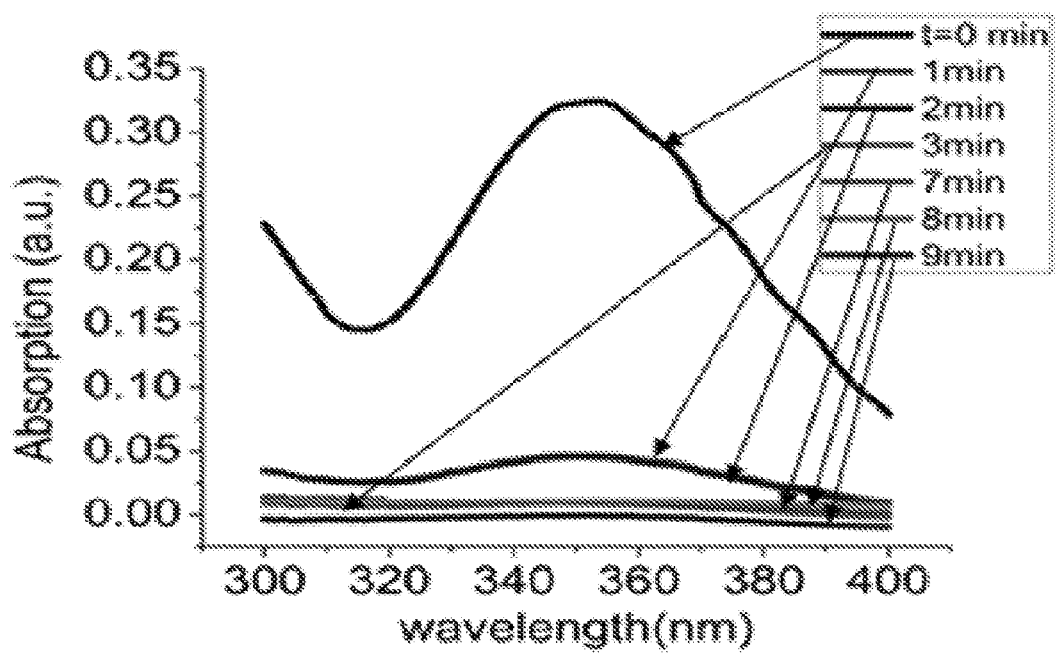
FIG. 17A shows UV-Vis data from the kinetic experiments (initial dichromate concentration=21.2 ppm, pH~3). The $Cr_2O_7^{2-}$ anions are not detectable with UV-Vis after 3 min and thus, the total Cr concentrations of the solutions were determined by ICP-MS.
Figure 17B:
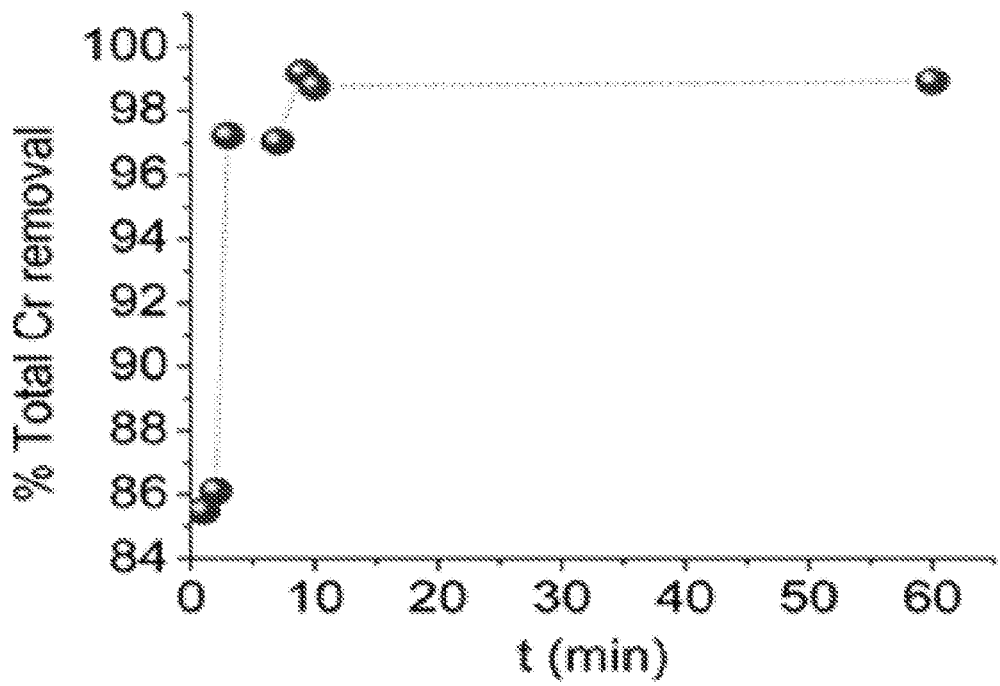
FIG. 17B shows % Total Cr removal by MOR-1-HA vs. time (min).

Kinetic studies. The kinetics of the $Cr_2O_7^{2-}$ absorption by MOR-1-HA were also investigated. FIG. 17A shows UV-Vis data from the kinetic experiments (initial dichromate concentration=21.2 ppm, pH~3). FIG. 17B shows % Total Cr removal by MOR-1-HA vs. time (min). The results indicated that this sorption process was quite fast, with ~85.5% of the initial $Cr_2O_7^{2-}$ content ($C_0$=21.2 ppm, pH~3) removed within only 1 min MOR-1-HA/solution contact. After 3 min, the $Cr_2O_7^{2-}$ removal percentage increased to 97.2%, whereas the ion exchange reached its equilibrium within 9 min, and more than 99% $Cr_2O_7^{2-}$ sorption was observed. The kinetic data could be roughly fitted with the Lagergren's first order equation:

$$q_t = q_e[1-\exp(-K_L t)] \quad (3)$$

where $q_e$=the amount (mg/g) of metal ion absorbed in equilibrium and $K_L$=the Lagergren or first-order rate constant (Fitting parameters: $q_e$=20.6±0.4 mg/g, $K_L$=1.9±0.3 min$^{-1}$).

The rapid Cr(VI) sorption kinetics observed for MOR-1-HA resulted from its highly porous structure, allowing fast diffusion of ions within the pores and the strong Cr(VI)-amine groups interactions.

Figure 18:
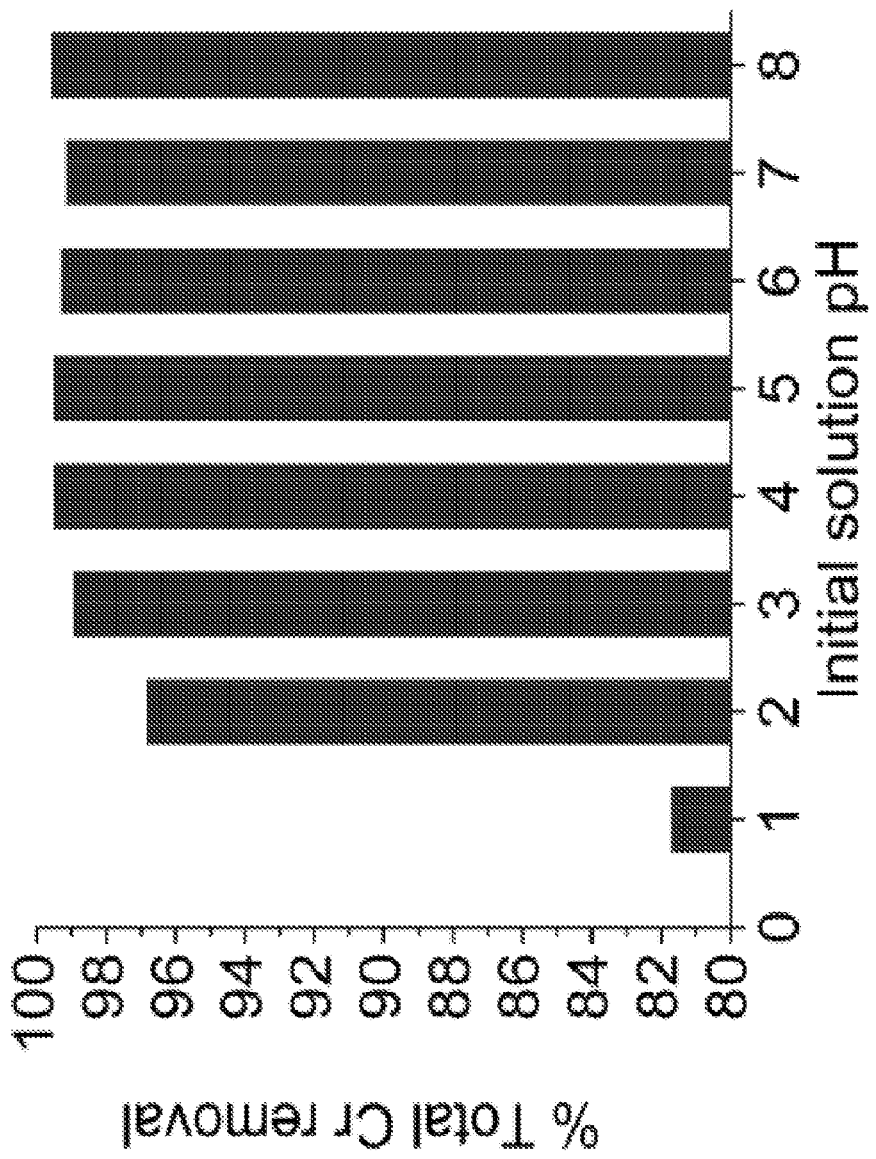
FIG. 18 shows % Total Cr removal by MOR-1-HA vs. pH. The total Cr concentration was determined by ICP-MS.

Variable pH studies. Although more focus was placed on the Cr(VI) sorption under acidic conditions that are usually observed in industrial waste, also studied was the Cr(VI) ion exchange by MOR-1-HA in a relatively wide pH range (1-8). The results indicated that the material was capable of absorbing Cr(VI) from highly acidic to alkaline solutions (FIG. 18). In particular, it showed 97-99.6% Cr(VI) removal capacities in the pH range 2-8 (initial total chromium concentration=10.2 ppm), whereas even at pH~1, MOR-1-HA displays a high Cr(VI) removal capacity (~82%).

Selectivity Studies

Competitive $Cr_2O_7^{2-}/Cl^-$, $Cr_2O_7^{2-}/Br^-$, $Cr_2O_7^{2-}/NO_3^-$ and $Cr_2O_7^{2-}/SO_4^{2-}$ sorption experiments were also performed for MOR-1-HA. $Cl^-$, $Br^-$ and $NO_3^-$ ions had no effect on the dichromate (initial concentration 0.25 mM, pH~3) sorption by MOR-1-HA. Thus, high dichromate removal capacities ~98-99% and excellent $K_dCr_2O_7$~1.0-2.2×10$^5$ mL/g were observed even in the presence of a large excess of $Cl^-$, $Br^-$ and $NO_3^-$ ions ($Cl^-$, $Br^-$, $NO_3^-$ concentration=2.5 mM). $SO_4^{2-}$, as a divalent cation, was expected to be a stronger competitor for dichromate ion exchange. Still, even in the presence of ten-fold excess of $SO_4^{2-}$ ions (concentration=2.5 mM), a significant dichromate removal capacity (~55%) was obtained. The selectivity of MOR-1-HA for dichromate anions was explained on the basis of strong $O_3Cr^{VI} \ldots NH_2$ interactions.

Column Ion Exchange Studies

Initial check of the sorbents. The next step was the study of the column ion-exchange properties of the materials. The stationary phase in the columns prepared was a mixture of the sorbent and sand, an inexpensive and inert material. The use of such a mixture instead of the pure sorbent material ensured a continuous flow of the water through the column, since a) the sorbent particles were immobilized and separated by sand pieces; and b) the pressure exerted by water was absorbed mainly by the sand, thus keeping the sorbent particles intact. Columns containing a sorbent to sand mass ratio of 1:100 proved to be highly effective for Cr(VI) sorption and also showed a stable and relatively fast water flow (see below and reference 3). That columns with high efficiency for Cr(VI) removal contained only a small quantity of the sorbent (~1% by weight), and the main component (99% by weight) of the stationary phase is sand, an abundant and very low cost material, are both economically attractive features.

Prior to the breakthrough sorption experiments, MOR-1 and MOR-1-HA/sand columns (with a sorbent to sand mass ratio of 1:100) were tested to determine the capability of the sorbent to remain fixed in the stationary phase, as well as the flow rate for the column. SEM studies, presented above, indicated that the MOR-1 particles were porous and spongy, and thus it was expected to be easily dispersed in water. Indeed, MOR-1 (even mixed with an inert material as sand) was gradually removed from the column, since it formed a fine water suspension. Thus, clearly MOR-1 was not suitable to be used for column sorption applications. The composite material, however, was composed of relatively compact MOR particles partially coated by the insoluble alginic acid shell (see SEM images above), and thus it had limited capability to form suspensions in water. As a result, the effluents flowing out of the composite/sand columns were clear solutions.

Flow rate for the columns should be also taken into account. Sorbents that result in column clogging are not desirable for applications. Thus, the flow rate of a MOR-1-HA/sand column was investigated. The water flow through the MOR-1-HA/sand column was observed to be stable over several runs and relatively fast (1.2-1.4 mL/min). MOR-1-HA particles were of uniform (polyhedral) shape (FIG. 14), and thus they could be distributed evenly in the column allowing a continuous and stable water flow. Thus, the MOR-1-HA/sand column seems promising in terms of immobilization of the sorbent in the stationary phase and flow rate.

Figure 19A:
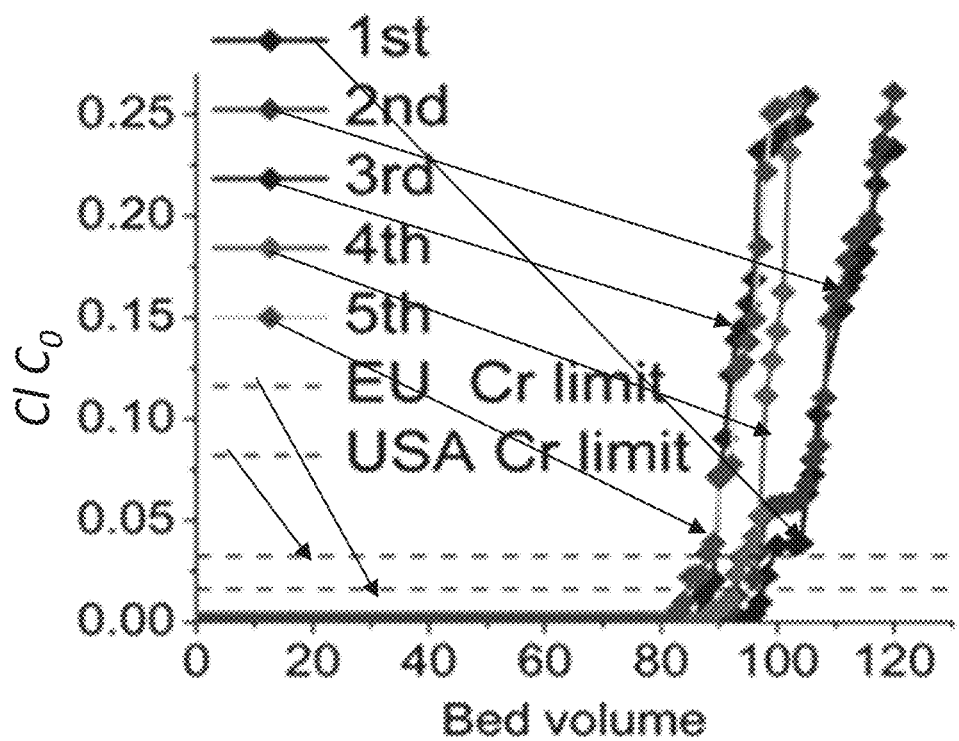
FIG. 19(A) depicts breakthrough curves for five column ion exchange runs (C=$Cr_2O_7^{2-}$ concentration of the effluent, $C_0$=initial $Cr_2O_7^{2-}$ concentration=6.4 ppm, pH~3, flow rate~1.2 mL/min, one bed volume=3.5 mL, stationary phase MOR-1-HA/sand=0.05 g:5 g). The lines are only a guide for the eye.
Figure 19B:
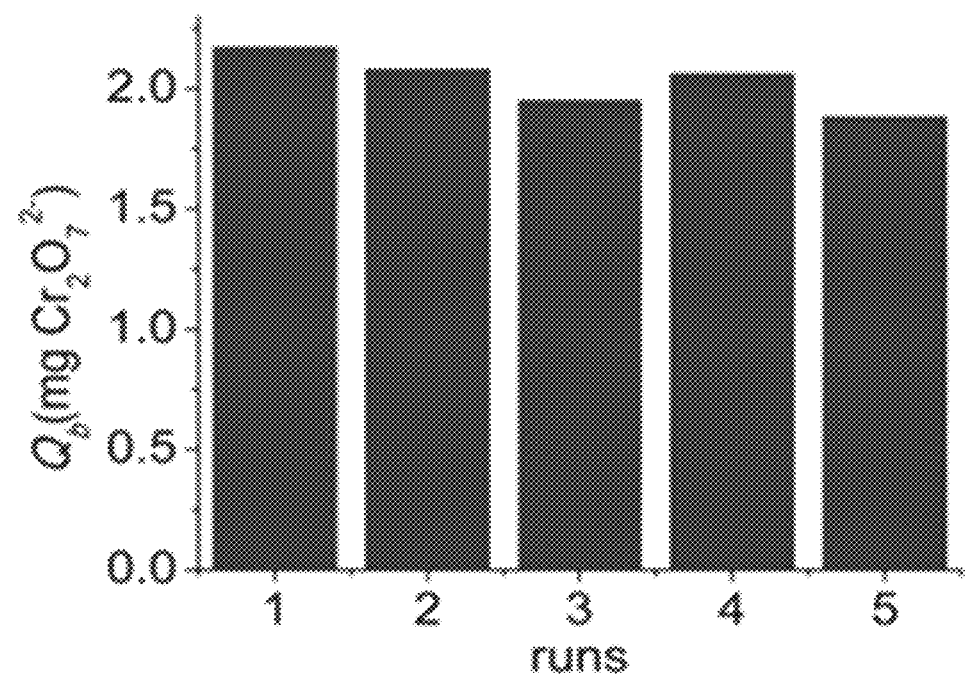
FIG. 19(B) depicts breakthrough capacities obtained from the five column ion exchange runs.

Determination of breakthrough curves and sorption capacity. Sorption experiments with the MOR-1-HA/sand (mass ratio 1:100) column and initial $Cr_2O_7^{2-}$ concentration of 6.4 ppm (pH~3) revealed that 97 bed volumes (Bed volume=bed height (cm)×cross sectional area (cm$^2$)=3.5 mL) of the effluent samples (bed volumes) showed a total Cr content ≤30 ppb, significantly below the acceptable safety limits defined by the US EPA (100 ppb) and EU (50 ppb) (FIGS. 19A and 19B). The column could be regenerated by washing it with HCl acid solution (4M). The regeneration process could be visually observed by the decolorization of the (yellow-colored) Cr(VI)-loaded column. After regeneration, the column could be reused, showing only a small decrease (~4) of bed volumes, with Cr content below the Cr safety limits. Even after a fifth run the column displayed a high number of bed volumes (84) with total Cr concentration ≤30 ppb. The breakthrough capacity $Q_b$ (mg) of this ion-exchange column could be determined by the equation:

$$Q_b = C_0 \cdot V_b \tag{4}$$

where $C_0$ is the initial concentration of $Cr_2O_7^{2-}$ (mg/L), and $V_b$ is the volume (L) passed until the breakpoint concentration (usually defined as the maximum acceptable concentration of the contaminant).

The numbers of bed volumes passed through the column until the break-point concentration (i.e., total Cr concentration ≤50 ppb) were 97, 93, 87, 92 and 84 for the 1$^{st}$-5$^{th}$ column runs, respectively. Thus, the $Q_b$ values for the different runs of the specific MOR-1-HA/sand column and $Cr_2O_7^{2-}$ initial concentration of 6.4 ppm were calculated 2.17 (1$^{st}$ run), 2.08 (2$^{nd}$ run), 1.95 (3$^{rd}$ run), 2.06 (4$^{th}$ run) and 1.88 (5$^{th}$ run) mg $Cr_2O_7^{2-}$ (FIG. 19).

The effect of the initial Cr(VI) concentration on the breakthrough sorption capacity of this MOR-1-HA/sand column was also examined. It was observed that breakthrough capacities of 2.06-2.25 and 2.25-2.34 mg $Cr_2O_7^{2-}$ were obtained for initial dichromate concentrations of 53.5 and 25.7 ppm, respectively. Thus, similar breakthrough capacity was observed independently of the initial Cr(VI) concentration, thus emphasizing the reproducible sorption results obtained with the MOR-1-HA/sand column.

Figure 20:
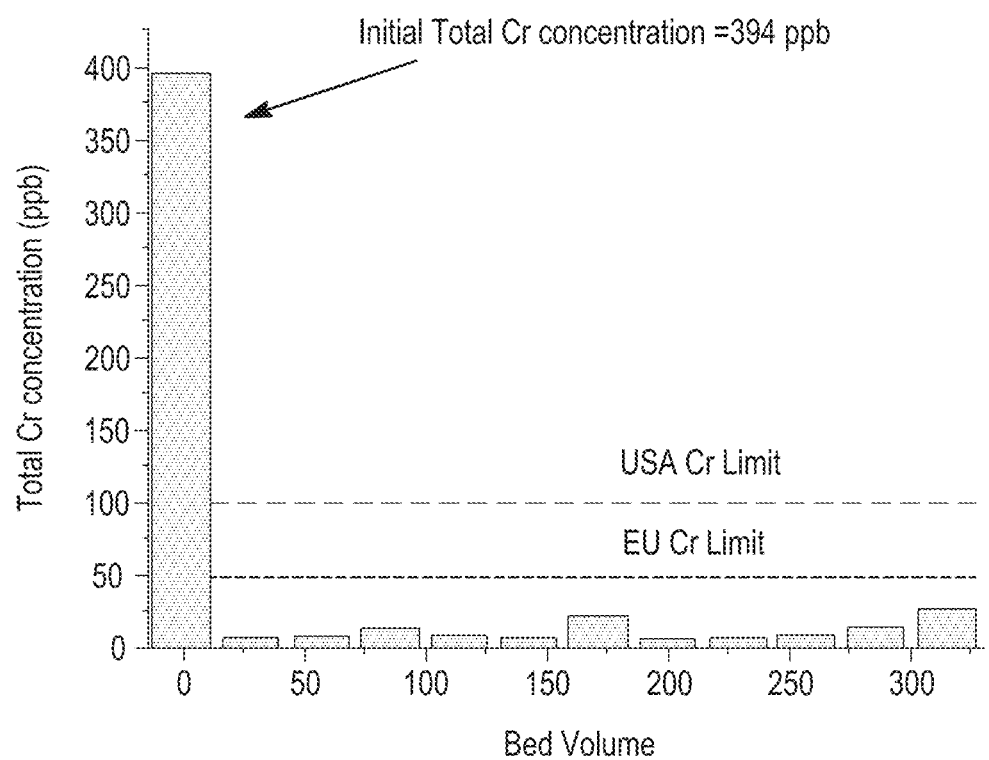
FIG. 20 shows total Cr concentration vs. bed volume (1 bed volume=3.5 mL) of a water solution (total volume=1.1 L, initial total Cr concentration=394 ppb, pH~3), after passing it through the MOR-1-HA/sand (0.05 g:5 g) column.

In addition, the performance of the MOR-1-HA/sand column was tested for the decontamination of solutions containing low Cr levels. However, these were above the safety limits. Thus, 1.1 L (~315 bed volumes) of a solution with a total Cr concentration of 394 ppb (pH~3) was passed through the MOR-1-HA/sand column. ICP-MS analysis for the Cr content of the effluents collected indicated that the Cr concentrations were 7-27 ppb (FIG. 20), which was well below the EU and US EPA acceptable limits. These results indicated the exceptional capability of the MOR-1-HA/sand column to remediate water contaminated with extremely low Cr levels. Note that it is not easy to treat wastewater with quite low Cr concentrations (<1000 ppb) with common methods such as precipitation. Thus, the development of new technologies that are effective for such low Cr levels is particularly desirable.

The performance of MOR-1-HA/sand column (MOR-1-HA to sand mass ratio=1/100), containing MOR-1-HA prepared with the reflux synthesis/SA addition, may be compared to that of the corresponding column with composite isolated from solvothermally prepared MOR-1. The latter displayed breakthrough capacity of 1.55-1.68 mg $Cr_2O_7^{2-}$ (number of bed volume till the breakpoint concentration=74-80, 1 bed volume=3.5 mL, initial $Cr_2O_7^{2-}$ concentration=6 ppm), lower than that (1.88-2.17 mg $Cr_2O_7^{2-}$ for initial dichromate concentration of 6.4 ppm) of the column with MOR-1-HA isolated from reflux synthesis-SA addition. Thus, high quality MOR-1-HA could be prepared with a fast, low-cost and environmentally-friendly synthesis that, at the same time, showed improved column Cr(VI) sorption properties.

Column Sorption of Chrome Plating Wastewater

A common type of Cr(VI)-containing industrial waste is chrome plating wastewater. Such Cr(VI)-bearing water is generated by rinsing the plated parts upon their removal from the plating bath. It should be noted that the Cr(VI) concentration in metal plating effluents may vary from very high to moderate or low levels depending on the amount of water used in the rinsing step of the metal plating process. Thus, Cr(VI) concentrations greater than 1000 and lower than 10 ppm have been reported for metal plating waste. Encouraged by the above excellent column sorption results, it was decided to test the performance of the column for the removal of Cr(VI) from chrome plating wastewater. A metal plating company (located in Northern Greece) provided us with two different types of hexavalent chromium waste: Sample (A) contained dichromate ions in very high concentrations (4855 ppm, pH~1.6); and sample (B) was a neutral pH solution with lower Cr(VI) content (analysis of the Cr(VI) concentration of this solution was done after adjusting its pH to ~3, see below).

Figure 21A:
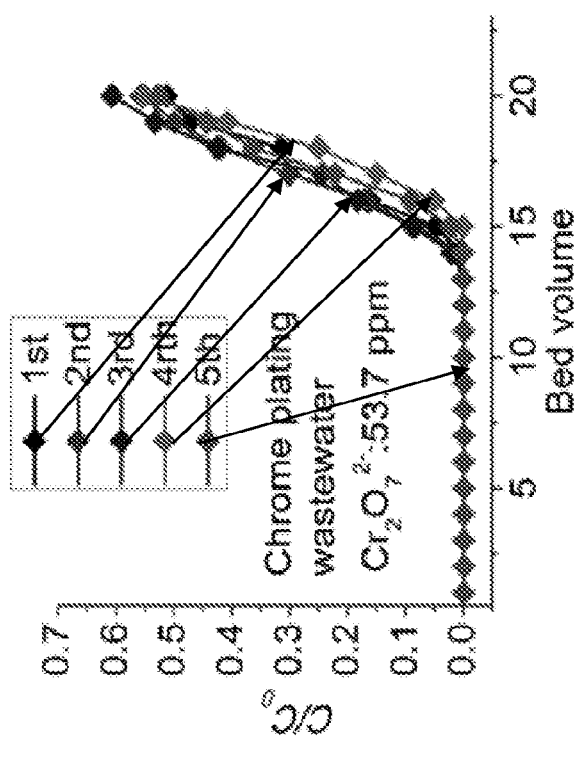
FIG. 21A depicts breakthrough curves for five column ion exchange runs with the wastewater sample A (C=$Cr_2O_7^{2-}$ concentration of the effluent, $C_0$=initial $Cr_2O_7^{2-}$ concentration=53.7 ppm, pH~3.5, flow rate~1.2 mL/min, one bed volume=3.5 mL, stationary phase MOR-1-HA/sand=0.05 g:5 g). The lines are only a guide for the eye.
Figure 21B:
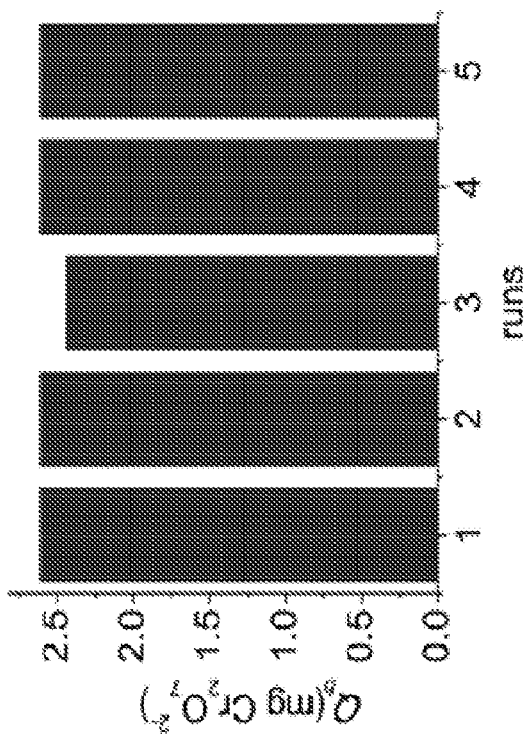
FIG. 21B depicts breakthrough capacities obtained from the five column ion exchange runs.

Sample A was too concentrated to be treated with our laboratory-scale ion exchange columns. Thus, Cr(VI)-contaminated wastewater was prepared by diluting the original sample A to ~54 ppm of $Cr_2O_7^{2-}$ (pH~3.5 after the dilution). The column was very efficient in decontaminating this wastewater, something that could be seen even with the naked eye. The breakthrough curves (FIG. 21A) obtained from five column runs (with regeneration of the column after each run) indicated 13-14 bed volumes with total Cr concentration <50 ppb (EU defined acceptable Cr limit), and a breakthrough capacity of 2.44-2.63 mg $Cr_2O_7^{2-}$ (FIG. 21B). These breakthrough capacity values were similar to those obtained for the experiments with the laboratory prepared dichromate solutions.

Figure 22A:
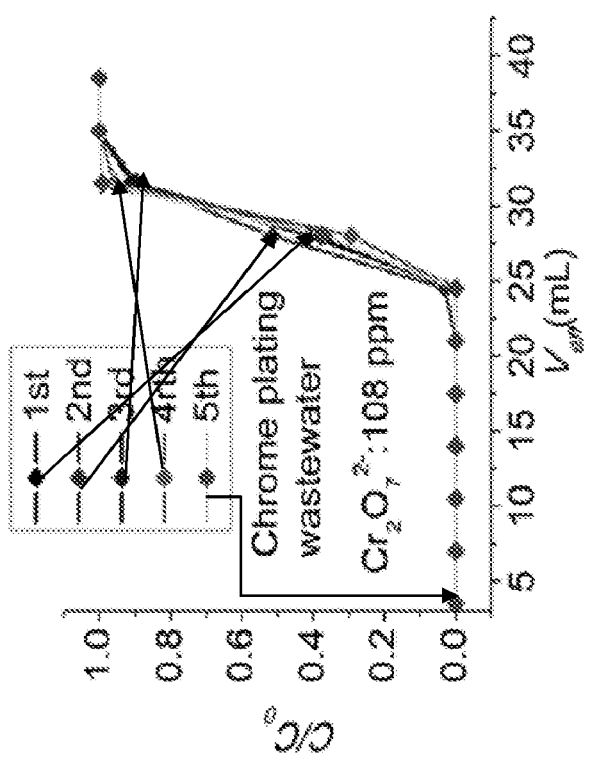
FIG. 22A depicts breakthrough curves for five column ion exchange runs with the wastewater sample B (C=$Cr_2O_7^{2-}$ concentration of the effluent, $C_0$=initial $Cr_2O_7^{2-}$ concentration=108 ppm, pH~3, flow rate~1.2 mL/min, stationary phase MOR-1-HA/sand=0.05 g:5 g). The lines are only a guide for the eye.

Also studied were the column ion-exchange properties with sample B supplied by the metal plating company. Prior the sorption experiments, the pH of sample B was adjusted to ~3 in order to enable the UV-Vis analysis of Cr(VI) as $Cr_2O_7^{2-}$ anions (at neutral pH there is equilibrium between chromate and dichromate anions) and allow a comparison with the results for the synthetic dichromate solutions. The UV-Vis data for sample B revealed a concentration of $Cr_2O_7^{2-}$ of 108 ppm. The decontamination of the wastewater sample after its treatment with the MOR-1-HA/sand column was apparent even with the naked eye. Five runs of the column with sample B (FIG. 22A) revealed breakthrough capacities of 2.268-2.646 mg, relatively close to those observed for the experiments with sample A and the laboratory-prepared solutions. In these column ion-exchange experiments, due to the relatively high initial Cr(VI) concentration of sample B, the sorbent rapidly reached complete saturation with Cr(VI).

Figure 22B:
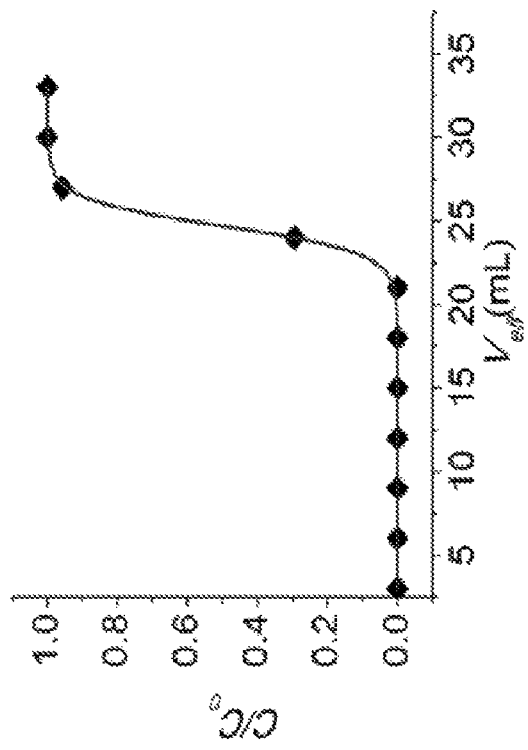
FIG. 22B shows the excellent fit (solid line, correlation coefficient $R^2$=99.9%) of one breakthrough curve (4rth column run) with the Thomas equation.

The MOR-1-HA/sand column performance for the decontamination of sample B could be very well modelled by the Thomas equation:

$$\frac{C}{C_0} = \frac{1}{1 + \exp\left(\frac{k_{Th}}{Q}(q_{max}m - C_0 V_{eff})\right)} \quad (5)$$

where C, $C_0$ are the concentrations (mg/L) of the ion in the effluent and its initial concentration (mg/L), respectively; $k_{Th}$ (L $mg^{-1}$ $min^{-1}$) is the Thomas model or sorption rate constant; $q_{max}$(mg/g) is the predicted maximum sorption capacity; m (mg) is the mass of the sorbent; and Q (mL $min^{-1}$) is the volumetric flow and $V_{eff}$ is the effluent volume (mL). (V. J. Inglezakis and S. G Poulopoulos, Adsorption, Ion Exchange and Catalysis. Design of Operations and Environmental Applications, Elsevier, 2006.) The fitting of the data with the Thomas equation (FIG. 22B) revealed maximum column sorption capacities of 61-63 mg $Cr_2O_7^{2-}$/g of the sorbent. These predicted column sorption capacities were close to those experimentally observed (67-70 mg/g). The latter were calculated from the difference between the $Cr_2O_7^{2-}$ content of the initial and effluent solutions. The excellent description of the column ion exchange generated using the Thomas model indicated that the external (fluid-film) and intra-particle mass transfer resistance had negligible effect on the column ion-exchange of the MOR-1-HA sorbent.

Finally, another important feature of the breakthrough curve was the degree of column utilization defined as the ratio of breakthrough to total column sorption capacity. For practical applications, it is desirable to achieve a degree of column utilization as close as possible to unity. For the column ion exchange experiments with wastewater sample B, the degree of column utilization (%) lay in the range of 78-89%, thus revealing the highly efficient performance of the MOR-1-HA sand column.

Conclusions

In conclusion, a new rapid, green and low-cost synthetic method for MOR-1 and composite MOR-1-HA materials was developed, which involved 1 h reflux reaction in water-acetic solvent (yielding MOR-1) and addition of sodium alginate (SA) to the resulted suspension of MOR-1 under reflux conditions (yielding MOR-1-HA). The hydrothermal synthesis approach used, for the first time, afforded UiO-66 type amino-functionalized materials which were purely microporous as the well-known UiO-66-$NH_2$BDC compound prepared with the solvothermal method. It is important that high quality UiO-66 amino-functionalized compounds could be prepared very fast via an inexpensive reflux synthesis in acidified water, since such materials are of great interest not only for their Cr(VI) sorption capacity but also for their gas sorption and photocatalytic properties, post-synthetic chemistry etc. Furthermore, the presented synthetic method revealed the usefulness of sodium alginate (SA), being a) the precursor for the formation of the alginic acid component of the composite; and b) a flocculation agent for the easy separation of MOR-1 from its fine suspension in water. Thus, SA could be useful for the large scale synthesis and facile isolation of a number of metal organic materials forming colloidal water solutions, such as various UiO-66, UiO-67 analogues, MOFs of the MIL-family, etc.

Detailed batch Cr(VI) sorption studies for the MOR-1-HA composite isolated with the new method revealed its exceptional capability to absorb Cr(VI) under various conditions. This sorbent was particularly able to be used in ion-exchange columns. It comprised of relatively compact and polyhedral shape nanoparticles that could be uniformly distributed in the column allowing a stable flow rate. In addition, this sorbent, due to the coating of MOR-1 particles by alginic acid, was not easily dispersed in water (in contrast to the pristine MOR-1 material), and thus could be immobilized in the stationary phase of the column. Thus, an ion-exchange column containing MOR-1-HA showed relatively high and reproducible Cr(VI) sorption capacities, as well as excellent regeneration capability and reusability. Compared to columns with composites isolated from solvothermally prepared MOR-1, the column with MOR-1-HA synthesized with the new method exhibited improved performance. Importantly, this column was highly efficient for the removal of Cr(VI) not only from laboratory prepared solutions, but also from industrial wastewater samples. Overall, the results indicated that MOR-1-HA ion-exchange column could be inexpensive, considering the relatively low cost of the new synthetic method for MOR-1-HA, and also promising for the remediation of real-world wastewater. The next step of this research could be thus the development of large scale MOR-1-HA columns and their application in wastewater treatment plants.

Example 3

This example reports a new member of the UiO-66 series, namely the MOF $[Zr_6O_4(OH)_8(H_2O)_4(H_2PATP)_4]Cl_8.12H_2O$ (MOR-2) ($H_2PATP$=2-((pyridin-1-ium-2-ylmethyl)ammonio)terephthalate). MOR-2 showed exceptionally high dichromate sorption capacity (~402 mg/g) and remarkably rapid sorption kinetics (equilibrium is reached within 1 min). MOR-2 also exhibited excellent chromate sorption capacity (~264 mg/g) and rapid uptake of this Cr(VI) species. MOR-2 was capable of eliminating Cr(VI) from a variety of solutions including industrial and drinking water samples. MOR-2-alginic acid (MOR-2-HA) composite is also described herein. This material was successfully employed in ion-exchange columns that showed very efficient performance for the sorption of both high and trace amounts of Cr(VI) from simulated and industrial waste samples, with noticeable recyclability of the column. Furthermore, the ability of MOR-2 toward selective and real-time luminescence sensing of ppb levels of Cr(VI) in real-world water samples was demonstrated.
Results and Discussion
Synthesis of MOR-2 and MOR-2-HA MOR-2 was synthesized via a solvothermal reaction of $ZrCl_4$ and the new ligand $H_2PATP$ (=2-((pyridin-2-ylmethyl)amino)terephthalic acid, FIG. 23) in DMF-HCl solution. To introduce positive charge on the framework of MOR-2 and thus unlock its anion exchange properties, the material was treated with relatively concentrated HCl solution (4 M) in order to protonate its pyridine and amine moieties, affording pyridinium and ammonium functional groups charge balanced by $Cl^-$ anions. The pyridinium-methyl-ammonium moieties were expected to be particularly capable of strongly binding Cr(VI) via the formation of both covalent and hydrogen bonds (see below).

Pristine MOR-2 is not suitable for use as a stationary-phase in ion-exchange columns since it is isolated as a very fine powder which passes through the frits into the eluding fractions (see below). To tackle this problem, the composite of MOR-2 was prepared with alginic acid, MOR-2-HA, by adding HCl into a suspension of MOR-2 in a sodium alginate (SA) solution in water. The composite material could be easily separated from water because a thin HA shell covered the MOR particles, which were now far less prone to form fine suspensions in aqueous solutions. In contrast, as-prepared MOR-2 forms very fine suspension upon its contact with water. Note that the composite can be successfully isolated (and used in ion-exchange columns) using only 1% wt. of alginate. Thus, the particles of MOR-2 were not covered by a thick layer of alginic acid that could slow the sorption kinetics.

Characterization of MOR-2 and MOR-2-HA

Field-emission scanning electron microscopy (FE-SEM) studies revealed that the MOR-2 was composed of sponge-like aggregates of particles. In contrast, due to the alginic acid coating, the particles of MOR-2-HA were more compact and, as a consequence, were less dispersed in water. Powder X-ray diffraction (PXRD) data indicated the structural similarity of MOR-2 (and MOR-2-HA) with the UiO-66 MOF.

Nevertheless, a series of analytical data (C,H,N, EDS, Zr analyses and TGA) were consistent with the formula $H_{16}[Zr_6O_{16}(H_2PATP)_4]Cl_8.12H_2O$ for the MOR-2 material. Nitrogen physisorption measurements carried out at 77 K for the activated MOR-2 and MOR-2-HA samples showed typical type-I adsorption isotherms, characteristic of microporous solids. The Brunauer-Emmett-Teller (BET) surface areas of the MOR-2 and MOR-2-HA were measured to be 354 and 442 $m^2 g^{-1}$ respectively. $CO_2$ adsorption isotherms recorded at 1 bar and 273 K indicated a sorption capacity of ~0.94 and 1.66 mmol $g^{-1}$ for MOR-2 and MOR-2-HA respectively. Analysis of $CO_2$ adsorption data with the density functional theory (DFT) suggests that both MOR-2 and MOR-2-HA have a microporous network with a pore size of about 5.5 Å.
Isolation and Characterization of Cr(VI)-Loaded Materials The porous structure of MOR-2 in combination with the presence of labile $Cl^-$ anions and pyridinium-methyl-ammonium functional groups (which are expected to show high affinity for Cr(VI)) motivated the study of the Cr(VI) anion exchange properties of this material. The sorption of dichromate and chromate species by MOR-2 can be visually observed by the change of the color of the pristine compound (from light yellow to orange-brown and yellow-brown after the sorption of $Cr_2O_7^{2-}$ and $CrO_4^{2-}$, respectively). EDS analytical data revealed that no existed in the Cr(VI)-exchanged products. Furthermore, various analytical (EDS, ICP-MS and UV-Vis) data indicated the presence of 9 and 6 Cr(VI) per formula unit of dichromate and chromate-loaded MOR-2, respectively. The mechanism of the anion exchange processes is discussed below.

Figure 24A:
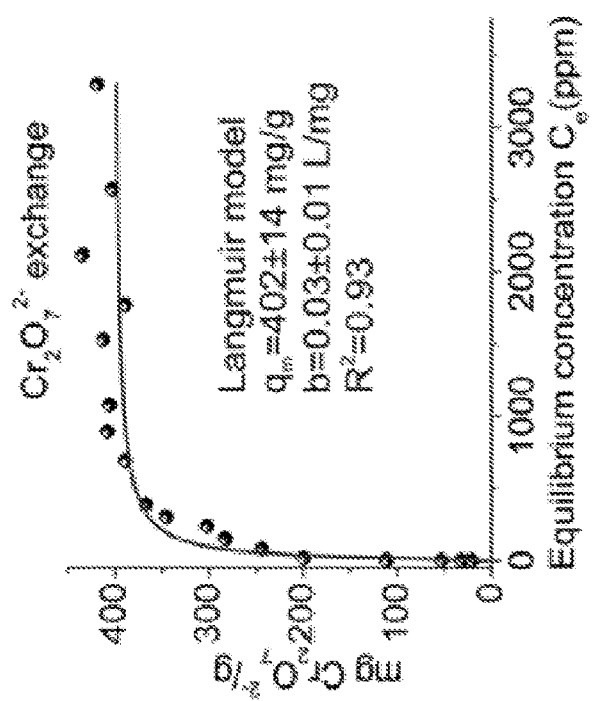
FIG. 24A depicts isotherm data for $Cr_2O_7^{2-}$ exchange.

PXRD data indicated that the crystal structure of MOR-2 was retained after the Cr(VI) exchange processes. However, both dichromate and chromate loaded materials showed a BET surface area of ~23 $m^2/g$, substantially lower than that of pristine MOR-2. This result confirmed the incorporation of the Cr(VI) species into the pores of the material. The IR spectra of the Cr(VI)-containing compounds exhibited a characteristic peak at ~926 $cm^{-1}$ (not existing in the IR spectrum of the pristine material) attributed to the anti-symmetric $Cr^{VI}O_3$-stretch. X-ray photoelectron spectroscopy (XPS) data showed $Cr2p_{1/2}$ and $Cr2p_{3/2}$ core-level signals, with their main components corresponding to binding energies of 589 and 580 eV, respectively. These values were consistent with hexavalent chromium species.
Batch Ion Exchange Studies Batch ion exchange experiments were performed in order to gain further insight into the Cr(VI) sorption properties of MOR-2. Both dichromate and chromate ion exchange properties of MOR-2 are presented.
$Cr_2O_7^{2-}$ Exchange
Determination of Isotherm Ion-exchange experiments using relatively low (~20 ppm) to extremely high (up to 3700 ppm) initial dichromate concentration were carried out. Note that such a wide range of Cr(VI) concentrations is commonly observed in industrial effluents (see below). The isotherm dichromate ion exchange data, obtained at pH~3, are shown in FIG. 24A.

These data can be described with the Langmuir model (eq. 1)

$$q = q_m \frac{bC_e}{1 + bC_e} \quad (1)$$

where q (mg/g) is the amount of the cation sorbed at the equilibrium concentration $C_e$ (ppm), $q_m$ is the maximum sorption capacity of the sorbent and b (L/mg) is the Langmuir constant related to the free energy of the sorption.

The fitting results indicated a maximum sorption capacity of 402±14 mg $Cr_2O_7^{2-}$/g, which was the highest sorption capacity reported so far for MOFs (Table 2) and, in general, anion exchange sorbents (LDHs, organic resins and porous organic polymers show dichromate sorption capacities in the range 90-358 mg/g).

This sorption capacity corresponded to the insertion of 4.5 $Cr_2O_7^{2-}$ ions per formula unit of MOR-2. The affinity of the sorbent for $Cr_2O_7^{2-}$ can be expressed by the distribution coefficient ($K_d$) defined by the equation (eq. 2)

$$K_d = \frac{V[C_0 - C_e]/C_e}{m} \quad (2)$$

where $C_0$ and $C_e$ are the initial and equilibrium concentration of $Cr_2O_7^{2-}$ (ppm), respectively; V is the volume (ml) of the testing solution; and m is the amount of the ion exchanger (g) used in the experiment (Manos, M. J.; Kanatzidis, M. G. Chem. Sci. 2016, 7, 4804).

The $K_d$ values, calculated for a relatively wide range of initial concentrations (21.6-216 ppm), were found to be $1.2 \times 10^4$-$1.19 \times 10^5$ mL/g, which is particularly high ($K_d$ values above $10^4$ mL/g are considered excellent).

Regeneration of MOR-2 after the $Cr_2O_7^{2-}$ sorption could be achieved by treatment of the Cr(VI)-loaded material with 4M HCl acid. Detailed studies of regeneration/reuse of the sorbent are reported below in the section for the column experiments.

The isotherm dichromate exchange data for the MOR-2-HA material was also determined. The fitting of the results with the Langmuir model revealed a maximum sorption capacity of 338±19 mg/g. Although this value was smaller than that for MOR-2, it was still higher than the sorption capacities of reported MOF-based sorbents (Table 2).

TABLE 2

Selected Cr(VI) sorption characteristics of reported MOFs

| MOF | Sorption capacity (mg/g) | Kinetic studies- Equilibrium time at RT | Reference |
|---|---|---|---|
| $CrO_4^{2-}$ | | | |
| 1-$ClO_4$ | 62.9 | 6 h | P. F. Shi, B. Zhao, G. Xiong, Y. L. Hou and P. Cheng, Chem. Commun., 2012, 48, 8231 |
| SLUG-21 | 60 | 48 h | H. H. Fei, M. R. Bresler and S. R. J. Oliver, J. Am. Chem. Soc., 2011, 133, 11110. |
| Zn-Co-SLUG-35 | 68.5 | 2 h | H. H. Fei, C. S. Han, J. C. Robins, and S. R. J. Oliver, Chem. Mater. 2013, 25, 647. |
| MOR-2 | 264 | 1 min | This work |
| MOR-2-HA | 243 | 1 min | This work |
| $Cr_2O_7^{2-}$ | | | |
| ABT·2$ClO_4$ | 213-271 | 48 h | X. X. Li, H. Y. Xu, F. Z. Kong and R. H. Wang, Angew. Chem. Int. Ed., 2013, 52, 13769. |
| FIR-53 | 74 | 10 min | H. R. Fu, Z. X. Xu and J. Zhang, Chem. Mater. 2015, 27, 205. |
| FIR-54 | 103 | 30 min | H. R. Fu, Z. X. Xu and J. Zhang, Chem. Mater. 2015, 27, 205. |
| ZJU-101 | 245 | 10 min | Q. Zhang, J. Yu, J. Cai, L. Zhang, Y. Cui, Y Yang, B. Chen and G. Qian, Chem. Commun., 2015, 51, 14732. |
| MOF-867 | 53 | >12 h | Q. Zhang, J. Yu, J. Cai, L. Zhang, Y. Cui, Y Yang, B. Chen and G. Qian, Chem. Commun., 2015, 51, 14732. |
| MOR-1-HA | 242-280 | 3-9 min | S. Rapti, A. Poumara, D. Sarma, I. T. Papadas, G. S. Armatas, A. C. Tsipis, T. Lazarides, M. G. Kanatzidis and M. J. Manos, Chem. Sci. 2016, 7, 2467; and Y. S. Hassan, M. H. Alkordi, M. G. Kanatzidis and M. J. Manos, Inorg. Chem. Front. 2016, 3, 635. |
| 1-$SO_4$ | 166 | 72 h | A. V. Desai, B. Manna, A. Karmakar, A. Sahu and S. K. Ghosh, Angew. Chem. Int. Ed. 2016, 55, 7811. |
| MOR-2 | 402 | 1 min | This work |
| MOR-2-HA | 338 | 1 min | This work |

Kinetics

Figure 25:
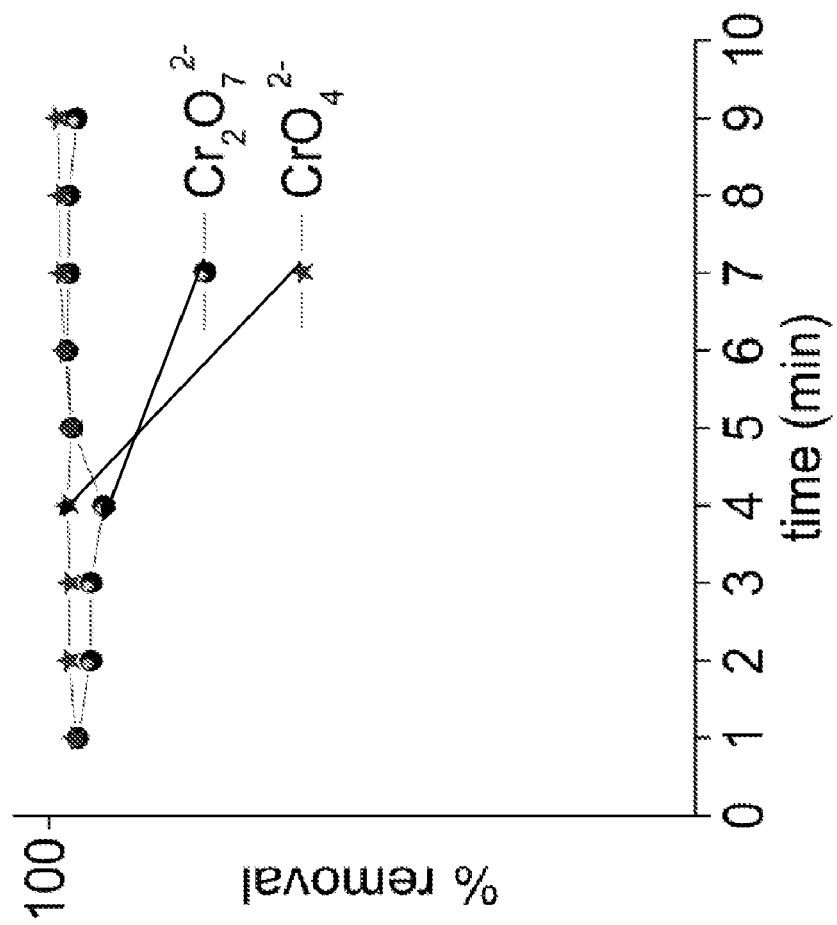
FIG. 25 depicts kinetics of dichromate and chromate sorption by MOR-2 (initial dichromate and chromate concentrations were 21.6 and 11.6 ppm respectively).

Interestingly, the sorption of dichromate anions by MOR-2 was found to be exceptionally fast. Equilibrium was reached within 1 min (for an initial $Cr_2O_7^{2-}$ concentration of 21.6 ppm) and 99.1% removal capacity was observed (FIG. 25). This was the fastest Cr(VI) sorption rate observed for MOFs (Table 2) and other anion-exchange sorbents (e.g., LDHs require several hours to reach the ion exchange equilibrium). This result reflected the rapid diffusion of $Cr_2O_7^{2-}$ ions into the crystalline porous network of MOR-2 and the particularly strong binding of dichromate by the pyridinium-methyl-ammonium functional groups of the material. The sorption kinetics were also studied for the MOR-2-HA composite. The removal of dichromate could be completed within 1 min, as in the case of pristine MOR-2 material. Presumably, the small (1% wt.) content of alginic acid had negligible influence on the dichromate exchange kinetics of the composite.

pH Dependence of Sorption

The sorption of dichromate was also investigated in solutions of various pH values (in the range 1-8). The results revealed 98.7-99.6% removal in pH~2-8 (initial dichromate concentration was 21.6 ppm) and highly efficient removal capacity (~87.8%) even at pH~1.

Selectivity Experiments

Common competitive ions for Cr(VI) ion exchange include $Cl^-$, $NO_3^-$, $Br^-$ and $SO_4^{2-}$. Dichromate exchange experiments in the presence of $Cl^-$, $NO_3^-$ or $Br^-$ indicated almost no effect on the Cr(VI) anion exchange process, since very high dichromate removal capacities (93-94%) were obtained even with 1000-fold excess of the competitive anions. This selectivity of MOR-2 for $Cr_2O_7^{2-}$ was not only due to the higher charge of this anionic species (compared to $Cl^-$, $NO_3^-$ or $Br^-$), but also to its strong interactions with the functional groups of the material (see below). $SO_4^{2-}$ had a larger effect on the dichromate sorption capacity. Still, high removal capacities (52-96%) could be obtained with 2-4-fold excess of $SO_4^{2-}$. It should be noted that in industrial chrome plating solutions, the weight content of $SO_4^{2-}$ is much lower (80-100 times) than that of Cr(VI) species (N. V. Mandich and D. L. Snyder, Electrodeposition of Chromium, Modern Electroplating, 5th Edition, pg. 205-249; V. Boddu, K. H Abburi, J. L. Talbott and E. Smith, Environ. Sci. Technol., 2003, 37, 4449; L.-Y. Chang, Chrome reduction and heavy metals removal from wastewater—A pollution prevention approach, Proceedings of WM-01 Conference, Feb. 25-Mar. 1, 2001, Tucson, Ariz.). In such a concentration, the $SO_4^{2-}$ is not a serious competitor for dichromate exchange by MOR-2, as will be shown below in the experiments with industrial wastewater samples.

Chromate Ion Exchange

The sorption of chromate species by MOR-2 in terms of isotherm determination and kinetic studies were also investigated. Previous to this study no MOF had been investigated for sorption of both dichromate and chromate ions (see Table 2).

Figure 24B:
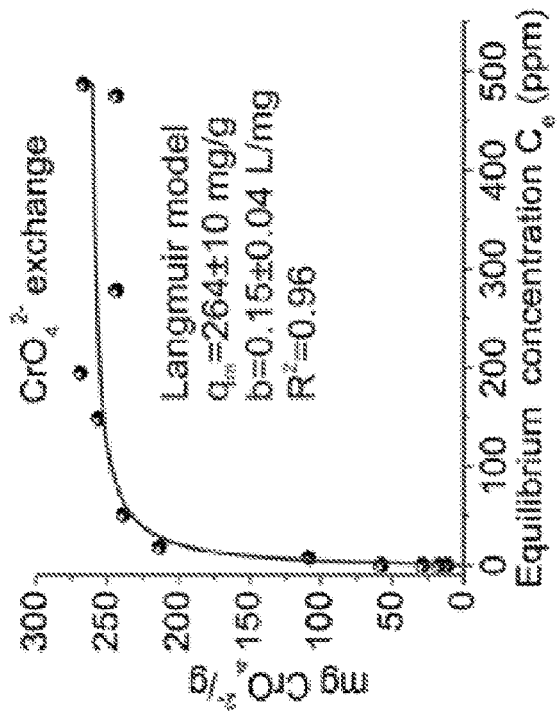
FIG. 24B depicts isotherm data for $CrO_4^{2-}$ exchange. The line represents the fitting of the data with the Langmuir model.

The isotherm exchange data were obtained at pH~7 (FIG. 24B). Fitting was performed with the Langmuir model, and the results indicated a maximum capacity of 264±10 mg/g. This value indicated exchange of 8 $Cl^-$ by 6 Cr(VI) ionic species (4 $HCrO_4^-$ and 2 $CrO_4^{2-}$, see below). This capacity was ~4 times higher than that of MOF-based chromate exchangers (Table 2). A $Pb^{2+}$ MOF recently reported showed higher chromate capacity (~324 mg/g) than MOR-2. However, a $Pb^{2+}$ material would be of no practical interest for environmental remediation (L. Aboutorabi, A. Morsali, E. Tahmasebi O. Buyukgungor, Inorg. Chem. 2016, 55, 5507). In addition, exceptional high $K_d$ values (up to $2.2 \times 10^5$ mL/g) were obtained for the chromate exchange by MOR-2.

The investigation of the kinetics of $CrO_4^{2-}$ exchange revealed that the sorption is completed within 1 min (FIG. 25), and ≥99.2% removal was observed. This excellent sorption rate, the fastest observed among MOFs (Table 2) and other materials, indicated strong interactions between $CrO_4^{2-}$ and the functional groups of MOR-2.

The selectivity of MOR-2 for chromate vs. various competitive ions ($Cl^-$, $NO_3^-$, $CO_3^{2-}$ etc) was very high, as observed from the results with potable and industrial water samples described below.

The isotherm chromate sorption and kinetics data were also obtained for the composite MOR-2-HA. The results revealed that the maximum sorption capacity of the composite (243±15 mg/g) was very close to that of MOR-2. In addition, the chromate sorption rate for MOR-2-HA was as fast as that for MOR-2, with the exchange equilibrium reached within 1 min (≥99.5% removal capacity was observed).

Experiments with Potable and Industrial Water Solutions

Although a number of MOF materials have been studied for their Cr(VI) exchange properties, there was a lack of data for sorption tests with real-world samples. Thus, the Cr(VI) sorption properties of MOR-2 for industrial wastewater samples and potable water solutions intentionally contaminated with traces of Cr(VI) were investigated. The results are presented in Table 3.

The industrial wastewater used in the ion exchange investigations was chrome plating water samples. The chrome plating wastewater was generated by rinsing the plated parts upon their removal from the plating bath. Depending on the amount of water used in the rinsing step, the Cr(VI) concentrations ranged from very high (>1000 ppm) to moderate (<100 ppm) or low (<10 ppm) levels. In addition, the chrome plating wastewater included a small amount of $H_2SO_4$ (typically the mass ratio of $CrO_3$ to $H_2SO_4$, used for the preparation of the chrome plating solution, is 50-100).

Two different types of chrome plating waste were provided by a metal plating company (located in Thessaloniki, Greece): One acidic sample (A) with dichromate ions in extremely high concentration (5170 ppm, pH~1.8); and a second alkaline one (B) with chromate ions in moderate concentration (52 ppm, pH~8).

Sample A was too concentrated (5170 ppm) to be treated on a laboratory scale. Thus, Cr(VI)-containing wastewater was prepared by diluting the original sample A to ~1 ppm of $Cr_2O_7^{2-}$ (pH~3 after the dilution), and subsequently used in ion-exchange tests with MOR-2. Both original and diluted (~1 ppm $CrO_4^{2-}$) samples B were treated by MOR-2.

The results of the ion-exchange experiments with the chrome plating solutions indicated removal capacities in the range 90-96.% (Table 3). For the experiments with the dilute samples, the total Cr content in the final solutions was found <50 ppb, below the acceptable limit in water (100 and 50 ppb for the US EPA and EU, respectively).

The potable water samples were natural spring water solutions in which $CrO_4^{2-}$ traces (total Cr was 31-448 ppb) were added. These samples contained a huge excess of various competitive anions, such as $Cl^-$, $HCO_3^-$ and $SO_4^{2-}$. Specifically, the molar concentrations of $Cl^-$, $HCO_3^-$ and $SO_4^{2-}$ were 68-978, 167-2391 and 34-483 times higher respectively than that of Cr(VI). Still, MOR-2 showed a remarkable capability to capture $CrO_4^{2-}$ from these solutions and the removal capacities were found to be 90-99.6%. The final total Cr content of the potable water solutions, after their treatment with MOR-2, was found to be 2-9 ppb, i.e., well below the acceptable Cr levels (Table 3). These results revealed an exceptional selectivity of MOR-2 for $CrO_4^{2-}$ anions.

TABLE 3

Results of ion exchange experiments with industrial and potable water solutions

| Sample | pH | $C_0$(ppb)[a] | $C_e$(ppb)[a] | % removal |
|---|---|---|---|---|
| Chrome plating[b] | 8 | 23300 | 870[c] | 96.3 |
| Chrome plating[d] | 7 | 448.3 | 42.2 | 90.6 |
| Chrome plating[e] | 3 | 481.5 | 49.8 | 89.7 |
| Potable water[f] | 7 | 31.4 | 3.1 | 90.1 |
| Potable water[f] | 7 | 107.6 | 9.0 | 91.6 |
| Potable water[f] | 7 | 273.5 | 2.0 | 99.3 |
| Potable water[f] | 7 | 448.3 | 1.8 | 99.6 |

[a]Total Cr measured with ICP-MS;
[b]As received sample;
[c]This final concentration was achieved by using V/m ratio of 500 mL/g. In all other experiments, V/m ratio of 1000 mL/g was used;
[d]Sample after dilution of the chrome plating waste with initial Cr concentration of 23.3 ppm, pH~8;
[e]Sample after dilution of the chrome plating waste with initial Cr concentration of 5170 ppm, pH~2;
[f]Natural spring water with $Ca^{2+}$:30.5 ppm, $Mg^{2+}$:12.2 ppm, $K^+$:1.2 ppm, $Na^+$:21.4 ppm, $HCO_3^-$:88 ppm, $Cl^-$:21 ppm, $SO_4^{2-}$:28 ppm.

Column Ion-Exchange Data

Initial Check of the Sorbents

As reported above, MOR-2 is not suitable for use in ion-exchange columns since it forms very fine suspensions in water. Thus, passing water through a column containing MOR-2 mixed with silica sand (an inert material) resulted in the formation of a fine water suspension flowing out of the column. In contrast, MOR-2-HA remained fixed in the column and the effluents were clear solutions as indicated by testing them with a laser beam.

The stationary phases in the columns used for the ion exchange experiments were mixtures of MOR-2-HA and silica sand. The use of such mixtures instead of pure MOR-2-HA provided a stable flow of the solution through the column due to the immobilization of the composite particles in the sand. Furthermore, mixing the composite with an abundant material such as sand was economically attractive. In fact, the columns prepared contained only 1-2 wt. % of MOR-2-HA, so the main component of the stationary phase was sand. Still, the columns were highly efficient for the decontamination of Cr(VI)-containing solutions.

Dichromate Ion Exchange

Figure 26A:
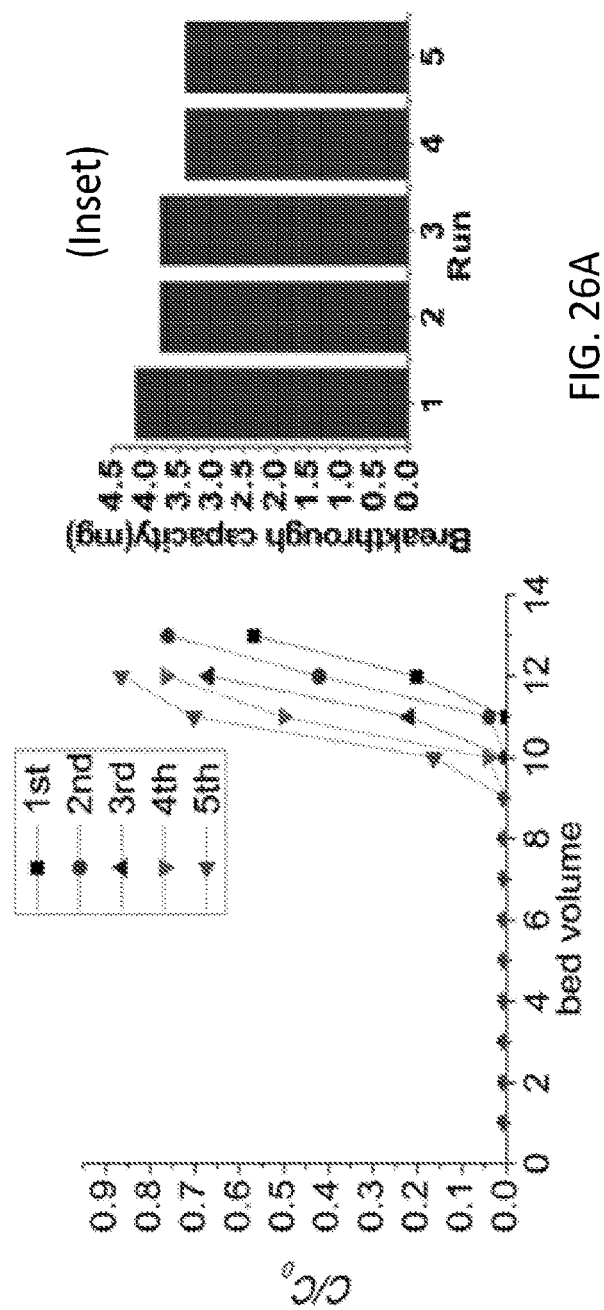
FIG. 26A depicts breakthrough curves for five column ion exchange runs (C=$Cr_2O_7^{2-}$ concentration of the effluent, $C_0$=initial $Cr_2O_7^{2-}$ concentration=108 ppm, pH~3, flow rate~1.75 mL/min, one bed volume=3.5 mL, stationary phase MOR-2-HA/sand=0.05 g:5 g). The lines are only a guide for the eye. Inset: Breakthrough capacities obtained from the five column ion exchange runs.

Column exchange experiments with a solution of dichromate with an initial concentration of 108 ppm and a stationary phase containing 5 and 0.05 g of sand and MOR-2-HA, respectively, were carried out. The dichromate sorption could be seen even with the naked eye. The results indicated that 11 bed volumes (bed volume=bed height (cm)×cross sectional area (cm$^2$)=3.5 mL) of the effluent samples showed a total Cr content ≤10 ppb, i.e., well below the acceptable safety levels (FIG. 26A). The column could be easily regenerated by treating it with 4 M HCl acid. The regeneration process could be visually observed by the decolorization of the (yellow-brown colored) column. A second run showed only a small decrease of the sorption capacity (1 bed volume less) compared with the initial run of the column. Even after 5 runs of the column, the sorption capacity remained high (9 bed volumes till the breakthrough) (FIG. 26A). The breakthrough capacity $Q_b$ (mg) could be defined by the equation (eq. 3)

$$Q = C_0 \times V_b \quad (3)$$

where $C_0$ and $V_b$ are the initial concentration of dichromate (mg/L) and the volume (L) of the effluent passing until the breakpoint concentration (defined as the maximum allowed level of the contaminant).

Thus, the breakthrough capacities from the five runs of the column were ~4.2 (1$^{st}$ run), 3.8 (2$^{nd}$ and 3$^{rd}$ runs) and 3.4 (4$^{th}$ and 5$^{th}$ runs) mg (FIG. 26A, inset).

Figure 26B:
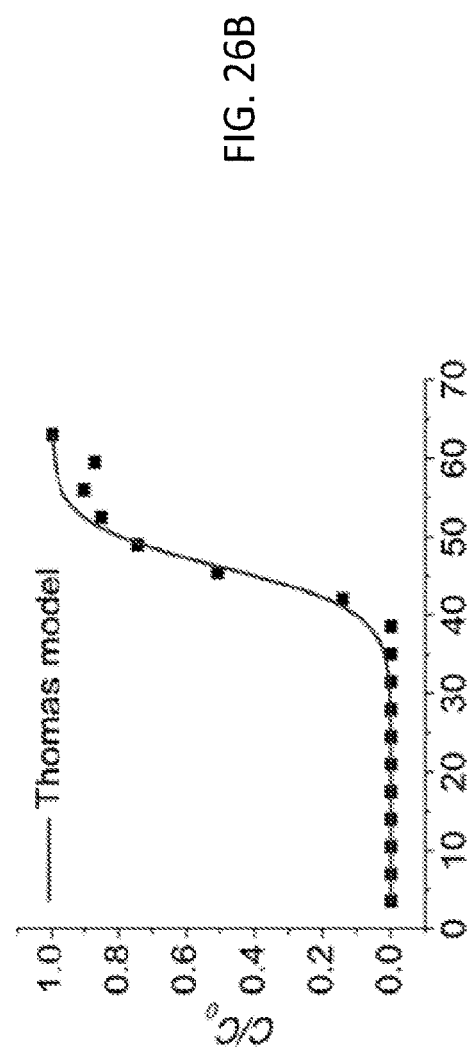
FIG. 26B depicts fitting of the column sorption data with the Thomas equation (fitting results: $q_{max}$=100 mg/g, $k_{Th}$=0.006 L mg min$^{-1}$, $R^2$=0.985).

In order to calculate the total column sorption capacity, the column was loaded until saturation was reached (the point that the concentration of dichromate in the effluent was identical to the initial dichromate concentration) (FIG. 26B). Then, the data were fitted with the Thomas equation (eq. 4):

$$\frac{C}{C_0} = \frac{1}{1 + \exp\left(\frac{k_{Th}}{Q}(q_{max}m - C_0 V_{eff})\right)} \quad (4)$$

where C, $C_0$ are the concentration (mg/L) of the ion in the effluent and its initial concentration (mg/L), respectively; km (L mg$^{-1}$ min$^{-1}$) is the Thomas model or sorption rate constant; $q_{max}$(mg/g) is the predicted maximum sorption capacity; m (mg) is the mass of the sorbent; Q (mL min') is the volumetric flow and $V_{eff}$ is the effluent volume (mL).

This model assumes that the external (fluid-film) and the intra-particle mass transfer resistance have no effect on the column ion exchange process.

The results of the fitting revealed a maximum sorption capacity of ~100 mg/g, close to the experimentally calculated (98.2 mg/g). The latter was determined by the difference of the dichromate content of the initial and effluent solutions. Another important parameter for an ion-exchange column is the degree of column utilization, which is defined as the ratio of breakthrough to total column sorption capacity. This ratio should be as close as possible to 1 (or 100%). The degree of column utilization in the case of the MOR-2-HA/sand column was calculated to be 84.6%. Such a high value indicated highly efficient performance of the column.

Column experiments after doubling the quantity (100 mg) of MOR-2-HA in the column were also performed. Thus, for the same initial dichromate concentration (108 ppm), more than double breakthrough capacity (9.8 mg) was obtained. Even after 5 runs of the column, the breakthrough capacity remained relatively high (6.8 mg).

Figure 27:
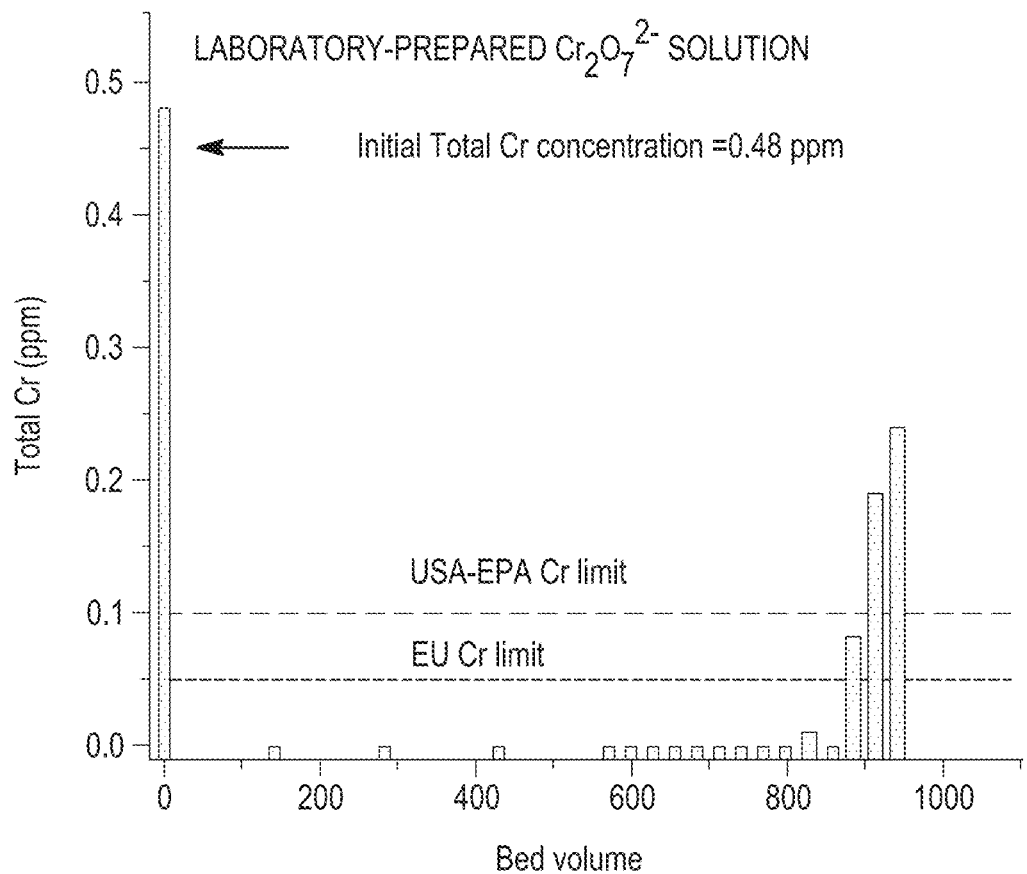
FIG. 27 shows total Cr content (ppm) vs. bed volume (1 bed vole=3.5 mL) of a dichromate aqueous solution (initial total concentration=0.48 ppm, pH~3), after passing it through the MOR-2-HA/sand column (flow rate~1.75 mL/min, stationary phase MOR-2-HA/sand=0.05 g:5 g).

Column ion exchange experiments also have been conducted with a dichromate solution of very low concentration (total Cr content was 0.48 ppm, pH~3) which, however, was above acceptable levels. The treatment of such dilute solutions is usually challenging, since conventional methods like precipitation are not effective in removing the contaminants in ppb levels. Remarkably, a MOR-2-HA/sand column containing only 50 mg of the composite (and 5 g of sand) was found to be efficient for the decontamination of 3 L (~857 bed volumes) of the dilute Cr(VI) solution, which showed a total Cr concentration <12 ppb after passing it through the column (FIG. 27).

Chromate Ion Exchange

Chromate ion exchange with a MOR-2-HA/sand column was also investigated (the stationary phase was composed of 0.1 and 5 g of MOR-2-HA and sand, respectively). This was the first study conducted for a MOF-based sorbent. Five column ion exchange runs were performed (initial $CrO_4^{2-}$ concentration was 52 ppm, pH~7). Upon sorption of chromate anions, the stationary phase of the column turned yellow. The regeneration of the sorbent was carried out by acid treatment (HCl 4M), and the stationary phase restored its initial color.

Figure 28:
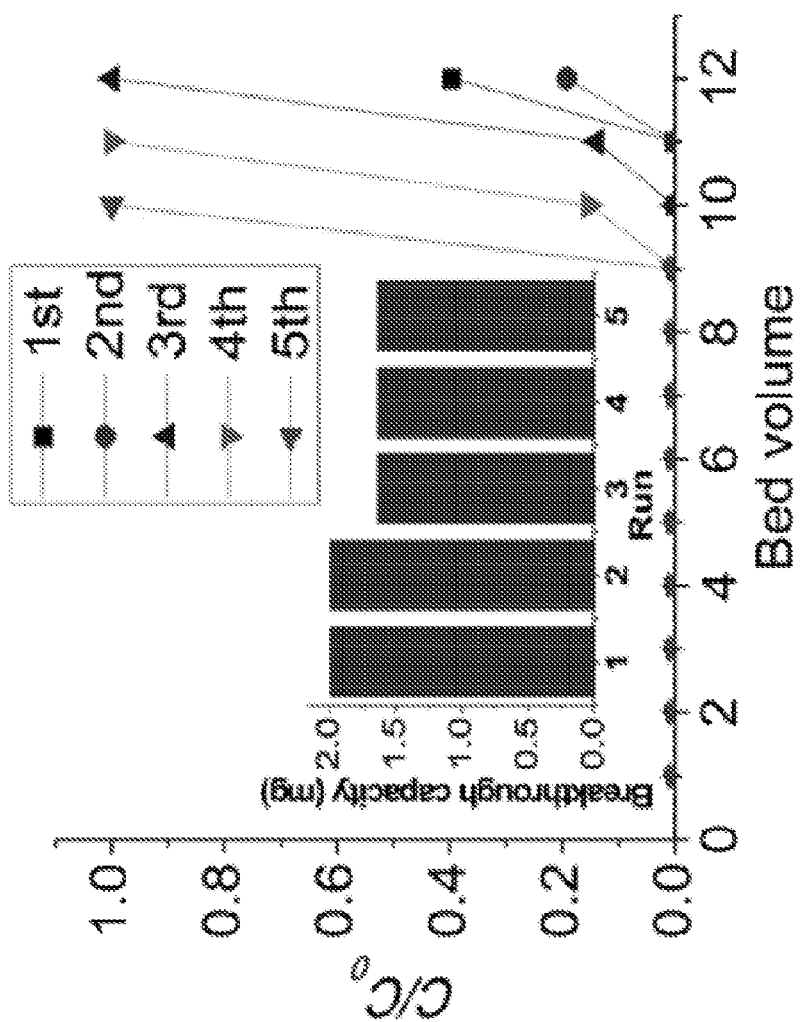
FIG. 28 shows breakthrough curves for five column ion exchange runs (C=$CrO_4^{2-}$ concentration of the effluent, $C_0$=initial $CrO_4^{2-}$ concentration=52 ppm, pH~7, flow rate~1.0 mL/min, one bed volume=3.5 mL, stationary phase MOR-2-HA/sand=0.1 g:5 g). The lines are only a guide for the eye. Inset: Breakthrough capacities obtained from the five column ion exchange runs.

In the first and second column runs, 11 bed volumes (breakthrough capacity=2 mg of $CrO_4^{2-}$) of the effluent solution contained total Cr in a concentration <47 ppb (i.e. below the acceptable limit) (FIG. 28). A small decrease (two bed volumes less) of the breakthrough sorption capacity (=1.638 mg of $CrO_4^{2-}$) was observed for the third run (FIG. 28). However, this breakthrough capacity remained unchanged even after a 5$^{th}$ run of the column (FIG. 28).

Column Tests with Industrial (Chrome-Plating) Samples

Figure 29:
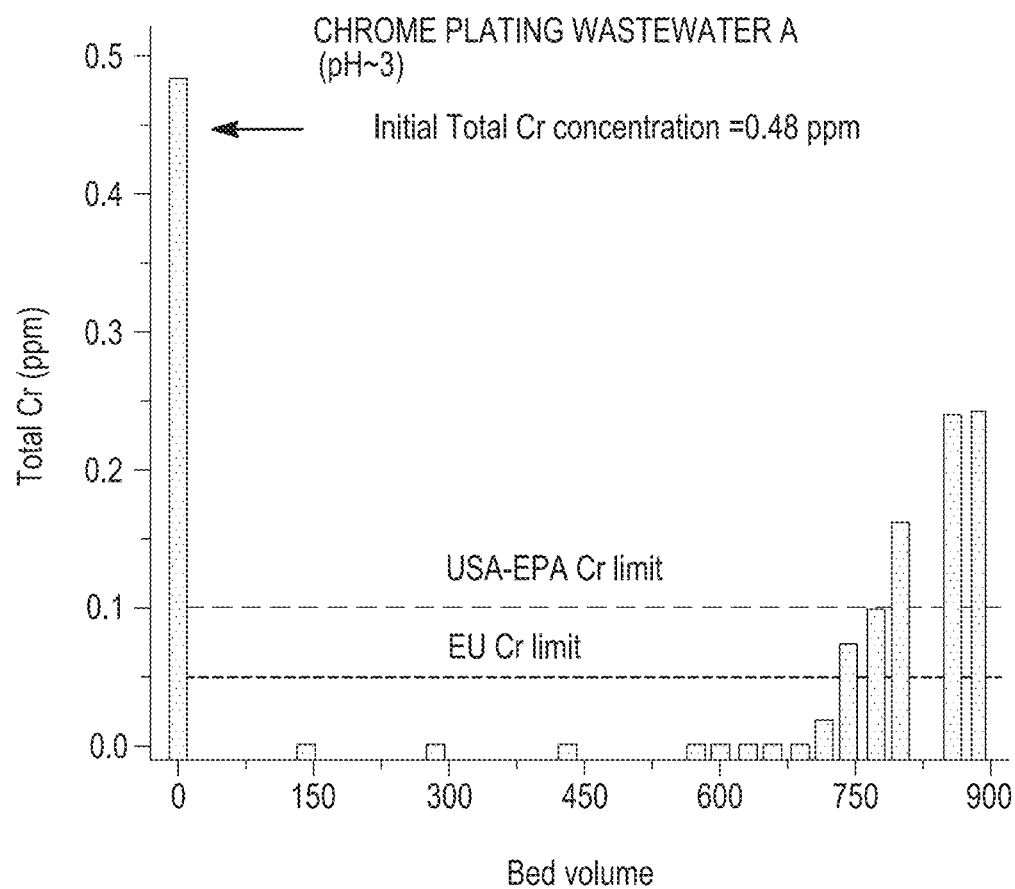
FIG. 29 shows total Cr content (ppm) vs. bed volume (1 bed vole=3.5 mL) of chrome plating solution A (initial total concentration=0.48 ppm, pH~3), after passing it through the MOR-2-HA/sand column (flow rate~1.75 mL/min, stationary phase MOR-2-HA/sand=0.05 g:5 g).

The last part of the column ion exchange studies involved tests with chrome plating wastewater samples. One sample tested was the diluted (total Cr ~0.48 ppm, pH~3) chrome plating solution A (see above). The MOR-2-HA/sand column was found particularly capable of decontaminating this wastewater sample. Specifically, 2.5 L (~714 bed volumes) of the diluted chrome plating solution had a total Cr content <18 ppb, after passing it through the MOR-2-HA/sand column (FIG. 29).

This result was similar to that obtained with the laboratory prepared dichromate solution (FIG. 27).

The second industrial sample tested was the original (as received) chrome plating solution B (initial total Cr content ~23.3 ppm, pH~8). The MOR-2-HA/sand column was to be found highly efficient for the decontamination of this wastewater sample. This process could even be visually observed. The color of the stationary phase changed to yellow after it was fully loaded by the Cr(VI) species. The regeneration of the column also could be achieved by its treatment with 4 M HCl solution, and the stationary phase restored its original color.

Figure 30A:
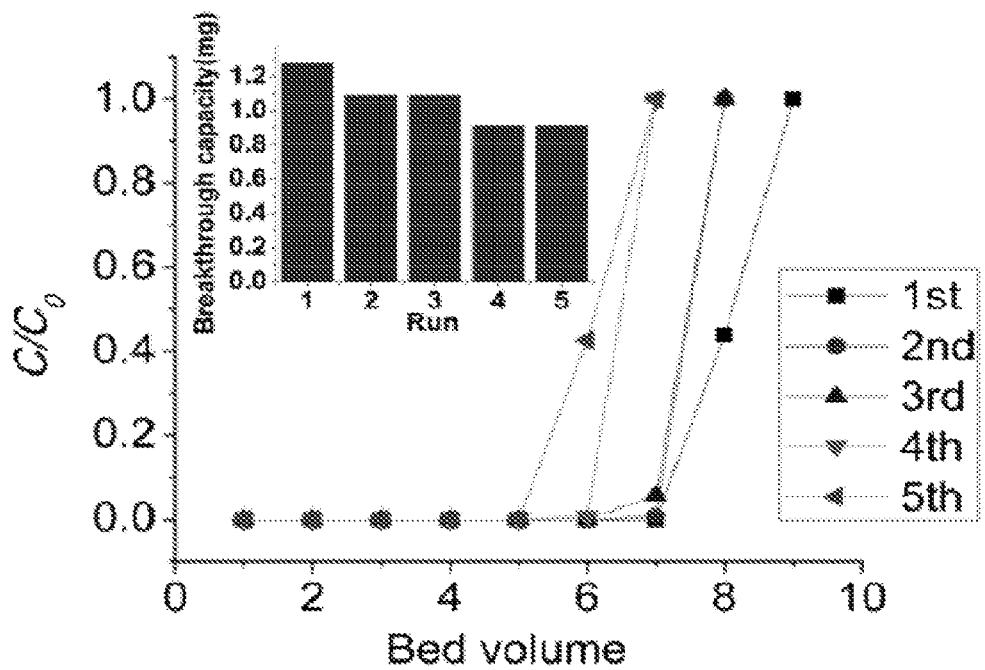
FIG. 30A shows breakthrough curves for five column ion exchange runs with the chrome plating solution B (C=$CrO_4^{2-}$ concentration of the effluent, $C_0$=initial $CrO_4^{2-}$ concentration=52 ppm, pH~8, flow rate~1.0 mL/min, one bed volume=3.5 mL, stationary phase MOR-2-HA/sand=0.1 g:5 g). The lines are only a guide for the eye. Inset: Breakthrough capacities obtained from the five column ion exchange runs.

Five ion exchange runs were carried out. In the first run, 7 bed volumes of the effluent solution had a total Cr content <10 ppb (Cr removal ~100%, breakthrough capacity ~1.27 mg) (FIG. 30A). A small decrease in the breakthrough capacity (only 1 bed volume less, or 1.09 mg) was observed in the second and third runs (FIG. 30A). Even in the 4$^{th}$ and 5$^{th}$ runs, the column largely retained its initial breakthrough capacity (5 bed volumes, 0.91 mg) (FIG. 30A).

Figure 30B:
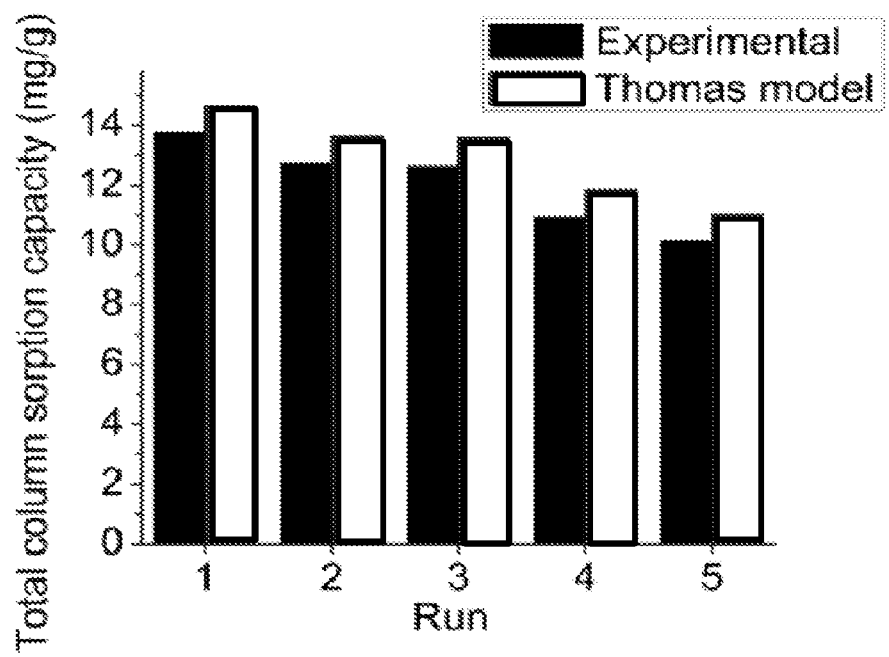
FIG. 30B shows the predicted (by the Thomas model) and experimentally found total column sorption capacities.

The column sorption data for the five runs of the column could be well described by the Thomas equation. The total column sorption capacities predicted by the Thomas model were 11-14.6 mg $CrO_4^{2-}$/g of MOR-2-HA. Those are close to the experimentally found capacities (10.1-13.8 mg/g) (FIG. 30B). In addition, a high degree of column utilization (83.4-92.6%) was found for the column ion exchange tests with the chrome plating solution B, which is another indication of the excellent performance of the MOR-2-HA/sand column.

Mechanism of the Cr(VI) Sorption Processes

In aqueous solution, hexavalent chromium exists as oxido-forms in a variety of species depending on pH and Cr(VI) concentration. For the oxo species of hexavalent chromium, three main pH regions may be distinguished:
(1) $H_2CrO_4$ (pH<0);
(2) $HCrO_4^-$ and $Cr_2O_7^{2-}$ (pH 2-6); and
(3) $CrO_4^{2-}$ (pH>6).

Depending on the concentration and acidity, hexavalent chromium can exist either as chromate $CrO_4^{2-}$ or dichromate $Cr_2O_7^{2-}$. The common dissolved chromium species (all hexavalent chromium) are $HCrO_4^-$, $CrO_4^{2-}$ and $Cr_2O_7^{2-}$. Another species possibly present in aqueous solutions of oxido-Cr(VI) species is chromic anhydride $CrO_3$, which can be formed in the course of the strongly exothermic interactions of $CrO_4^{2-}$ or $Cr_2O_7^{2-}$ anions with protons from the strongly acidic aqueous solutions, or with the protons of the protonated amine groups of MOR-2, according to the reactions (eq. 5,6):

$$CrO_4^{2-}+2H^+\rightarrow CrO_3+H_2O+334.4 \text{ kcal/mol} \quad (5)$$

$$Cr_2O_7^{2-}+2H^+\rightarrow 2CrO_3+H_2O+258.1 \text{ kcal/mol} \quad (6)$$

Which entity will dominate in a particular environment depends upon the specific conditions, including, for example, pH, $E_h$ (redox potential), total concentration of chromium, and the overall aqueous chemistry.

Therefore, the possible interaction modes of MOR-2@$CrO_4^{2-}$, MOR-2@$HCrO_4^-$, MOR-2@$Cr_2O_7^{2-}$ and MOR-2@$CrO_3$, and the thermodynamics of possible reactions involved in the oxido-Cr(VI) anion exchange processes taking place in the MOR-2-HA columns by means of DFT computational protocols, were explored. Comparable results were obtained employing the wB97XD/Def2-TZVPP DFT method.

Figure 31:
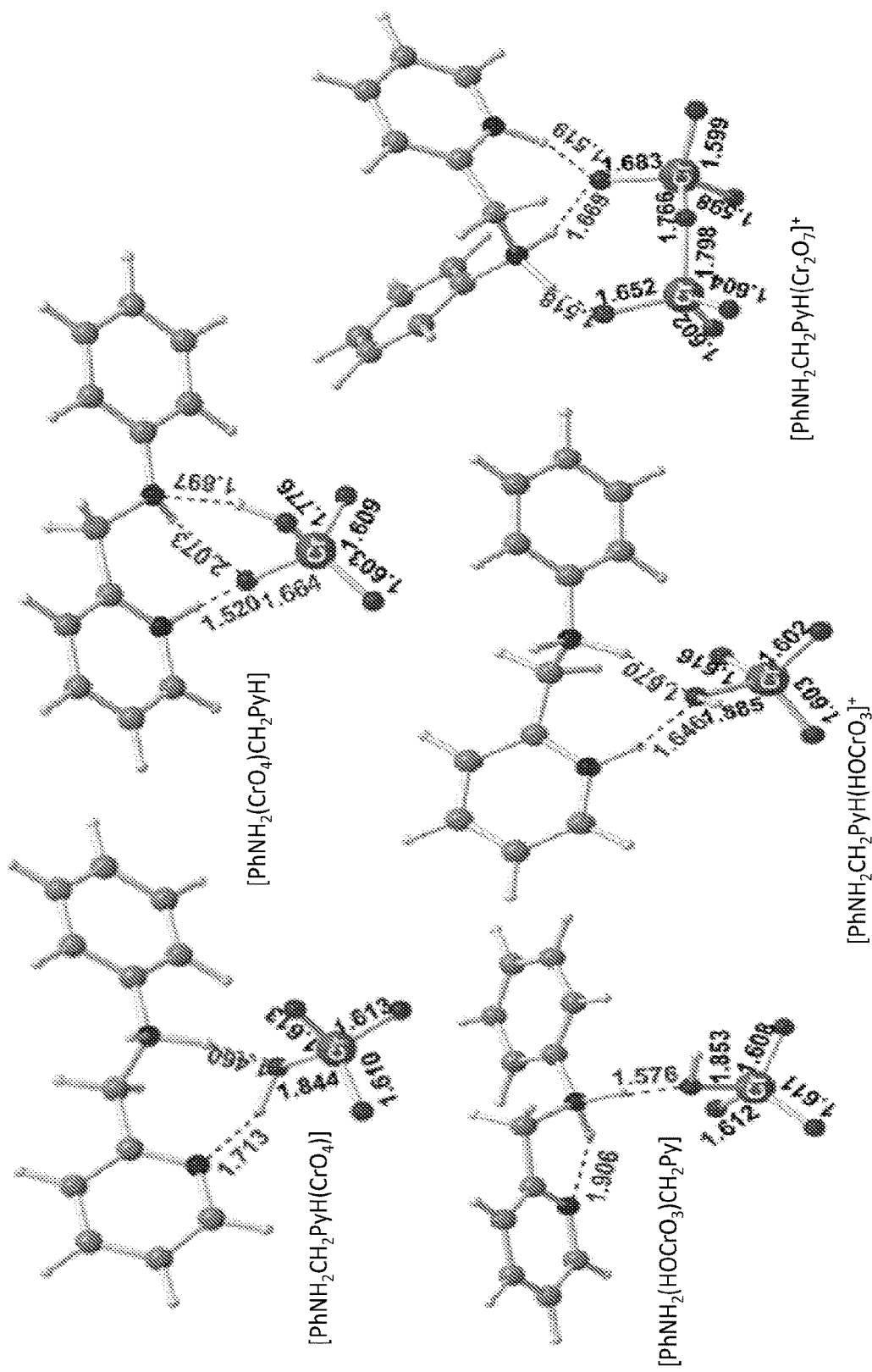
FIG. 31 depicts possible associations of the functional groups of MOR-2 with chromate and dichromate species optimized at the BP86/6-31G(d,p) level of theory (C, grey; H, white; N, blue; O, red).

The proton affinities of pyridine and methylamine moieties of the PhNHCH$_2$Py ligand used as a model of the PATP ligand predicted to be −157.5 and −151.7 kcal/mol, respectively, at the BP86/6-31G(d,p) level of theory indicate the slightly more basic character of pyridine compared to methylamine moieties. On the other hand, the proton affinities of $CrO_4^{2-}$ and $Cr_2O_7^{2-}$ are predicted to be −203.0 and −164.5 kcal/mol, respectively. The detachment of the proton either from the pyridinium or methylammonium moieties of the [PhNH$_2$CH$_2$PyH]$^{2+}$ ligand by the $CrO_4^{2-}$ dianions according to the reactions (eq. 7,8):

$$[PhNH_2CH_2PyH]^{2+}+CrO_4^{2-}\rightarrow [PhNH_2CH_2Py]^{+}+HCrO_4^{-} \quad (7)$$

$$[PhNH_2CH_2PyH]^{2+}+CrO_4^{2-}\rightarrow [PhNHCH_2PyH]^{+}+HCrO_4^{-} \quad (8)$$

are slightly less exothermic (−45.1 kcal/mol) for the proton detachment process from pyridinium than methylammonium moieties (−51.3 kcal/mol). The deprotonation of the pyridinium or methylammonium moieties by the chromate anions was clearly shown in the structures of the [PhNH$_2$CH$_2$PyH(CrO$_4$)] and [PhNH$_2$(CrO$_4$)CH$_2$PyH] associations optimized at the BP86/6-31G(d,p) level of theory (FIG. 31).

It could be observed that the $CrO_4^{2-}$ anions deprotonating either the pyridinium or methylammonium moieties were transformed to $HCrO_4^-$ species associated with the [PhNHCH$_2$Py] ligand through hydrogen bonds.

The $HCrO_4^-$ species interacting with the [PhNH$_2$CH$_2$Py]$^+$ and PhNH$_2$CH$_2$PyH]$^{2+}$ ligands yielded the [PhNH$_2$(HO-CrO$_3$)CH$_2$Py] and PhNH$_2$CH$_2$PyH(HOCrO$_3$)]$^+$ weak associations, respectively, supported by N—H . . . O—H hydrogen bonds (FIG. 31). The interaction energies for the [PhNH$_2$(HOCrO$_3$)CH$_2$Py] and PhNH$_2$CH$_2$PyH(HOCrO$_3$)]$^+$ associations are 11.6 and 23.9 kcal·mol respectively at the BP86/6-31G(d,p) level of theory.

Similarly, the deprotonation of the pyridinium or methylammonium moieties of the [PhNH$_2$CH$_2$PyH]$^{2+}$ ligand by the $Cr_2O_7^{2-}$ dianions according to the reactions:

$$[PhNH_2CH_2PyH]^{2+}+Cr_2O_7^{2-}\rightarrow [PhNH_2CH_2Py]^{+}+HCr_2O_7^{-}$$

$$[PhNH_2CH_2PyH]^{2+}+Cr_2O_7^{2-}\rightarrow [PhNHCH_2PyH]^{+}+HCr_2O_7^{-}$$

are predicted to be slightly exothermic, the estimated exothermicities being −7.1 and −12.8 kcal/mol, respectively. Therefore, the dichromate anions do not deprotonate the pyridinium or methylammonium moieties of the [PhNH$_2$CH$_2$PyH]$^{2+}$ ligand. Rather, interacting with [PhNH$_2$CH$_2$PyH]' ligand yields the weak association [PhNH$_2$CH$_2$PyH(Cr$_2$O$_7$)] supported by three hydrogen bonds (FIG. 31). The estimated interaction energy was −37.3 kcal/mol.

The above calculations indicated that (no protonated) the dichromate anions were capable of strongly interacting with the functional groups of MOR-2. The results from the sorption experiments revealed that 4.5 $Cr_2O_7^{2-}$ anions (per formula unit of the material) could be inserted into the pores of the material at the same time all Cl$^-$ anions were removed. Combining the theoretical and experimental findings, it is suggested that 4$Cr_2O_7^{2-}$ exchange 8 Cl$^-$ anions. Additional 0.5 $Cr_2O_7^{2-}$ could be incorporated into the structure, presumably with the simultaneous removal of one OH$^-$ terminal ligand (which may be replaced by a water molecule).

In the case of chromate exchange, the calculations clearly showed the tendency of $CrO_4^{2-}$ to withdraw one proton from either pyridinium or methylammonium functional groups of MOR-2, thus forming $HCrO_4^-$ species. The chromate exchange data revealed that ~6 Cr(VI) species are inserted per formula unit of the material, with the simultaneous removal of 8 Cl$^-$ anions. Given the capability of chromate anions to deprotonate the pyridinium or methylammonium moieties, it is suggested that 4 $HCrO_4^-$ will be incorporated into the pores of the material, removing 4 Cl$^-$ anions. The remaining 2 Cr(VI) species, exchanging the rest of Cl$^-$ anions, will be thus in the form of no protonated chromate anions.

All of the above can be summarized by the following equations (eq. 9,10):

$$H_{16}[Zr_6O_{16}(H_2PATP)_4]Cl_8+4.5Cr_2O_7^{2-}+H_2O\rightarrow H_{17}[Zr_6O_{16}(H_2PATP)_4](Cr_2O_7)_{4.5}+8Cl^-+OH^- \quad (9)$$

$$H_{16}[Zr_6O_{16}(H_2PATP)_4]Cl_8\pm 6CrO_4^{2-}\rightarrow H_{16}[Zr_6O_{16}(HPATP)_4](HCrO_4)_4(CrO_4)_2+8Cl^- \quad (10)$$

Importantly, among all oxido-Cr(VI) species participating in the anion exchange processes, only chromic anhydride, $CrO_3$, is attached to the N donor atoms of the HPATP and PATP model ligands yielding tetrahedral $[PhNH_2CH_2Py(CrO_3)]^+$, $[PhNHCH_2Py(CrO_3)]$, $[PhNH(CrO_3)CH_2PyH]^+$, $[PhNH(CrO_3)CH_2Py]$, and $[PhNH(CrO_3)CH_2Py(CrO_3)]$ complexes (FIG. 31).

The estimated binding energies for the $[PhNH_2CH_2Py(CrO_3)]^+$, $[PhNHCH_2Py(CrO_3)]$, $[PhNH(CrO_3)CH_2PyH]^P$, $[PhNH(CrO_3)CH_2Py]$, and $[PhNH(CrO_3)CH_2Py(CrO_3)]$ complexes were 34.0, 23.2, 39.6, 35.3 and 35.5 kcal/mol, respectively. It should be noted that $CrO_3$ formed stronger coordination bonds when coordinated to pyridine N donor atom than to amine N donor atom. The stronger Pyr-$CrO_3$ bond, compared to the PhN—$CrO_3$ bond, is reflected by the Pyr-$CrO_3$ and PhN—$CrO_3$ bond lengths, with the former being shorter than the latter.

The regeneration of the MOR-2-HA columns by treating them with concentrated HCl solutions (4 M) can be easily explained by the acidic hydrolysis of the weak associations, and the complexes involved in the oxido-Cr(VI) anion exchange processes taking place in the columns.

Photophysical Properties and Luminescence Sensing

Figure 32:
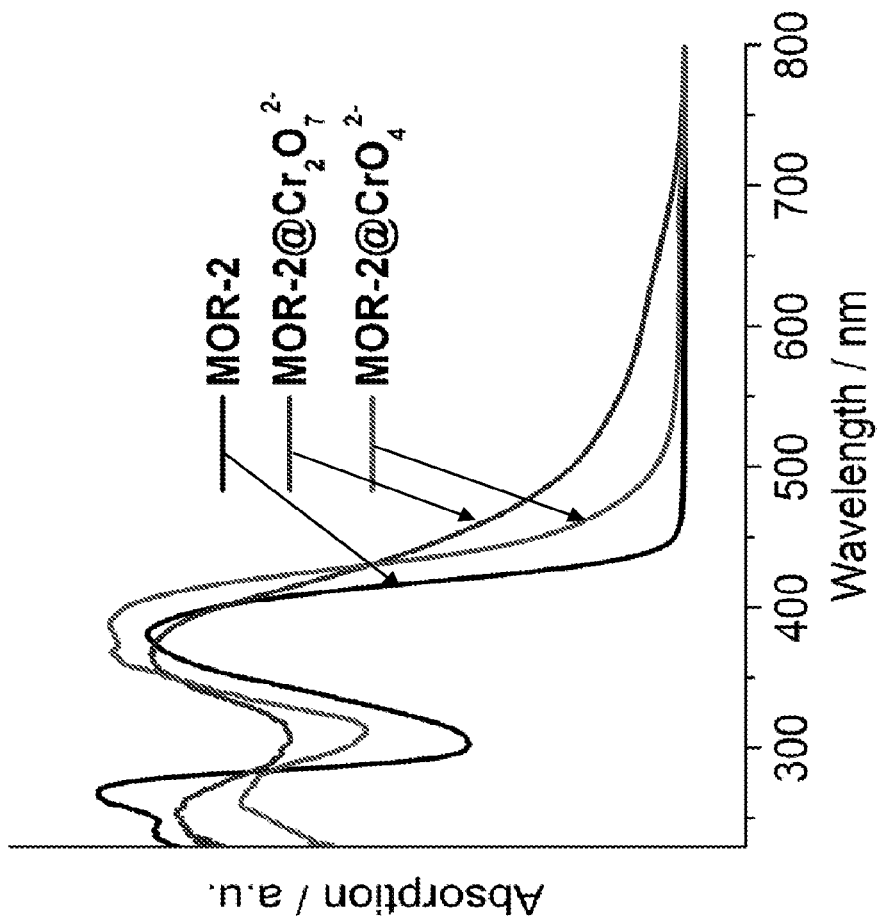
FIG. 32 shows solid state absorption profiles of MOR-2 and its $CrO_4^{2-}$ and $Cr_2O_7^{2-}$ adducts.

The photophysical properties of MOR-2 were studied by solid state UV-vis diffuse reflectance and steady state emission spectroscopy. The diffuse reflectance spectrum of MOR-2 (FIG. 32) showed an absorption band in the UV region ($\lambda_{max}$=266 nm) and a lower energy absorption signal which maximized at 380 nm and tailed off in the visible region at ca. 450 nm. These bands were attributed to ligand based singlet π-π* and n-π* transitions with the latter involving the lone pair on the amino group. The high-energy band also included a contribution from Zr cluster-based transitions. In the exchanged materials MOR-2@$CrO_4^{2-}$ and MOR-2@$Cr_2O_7^{2-}$ (vide supra), absorption extended further in the visible region tailing off at ca. 580 and 720 nm, respectively (FIG. 32). In the case of MOR-2@$Cr_2O_7^{2-}$, a shoulder at approximately 605 nm was also observed. These additional absorption features reflected the presence of the oxido-to-metal-charge-transfer transitions (LMCT) of the chromium species.

Upon excitation at 360 nm, MOR-2 exhibited turquoise fluorescence. The emission spectrum of MOR-2 (FIG. 33) included a broad band with maximum at ca. 470 nm originating mainly from radiative deactivation of a singlet n-π* excited state. The fluorescence of MOR-2, in combination with its ability to rapidly and efficiently sorb Cr(VI) from water, prompted the testing of MOR-2 as a luminescent sensor for Cr(VI) in aqueous media.

Figure 33:
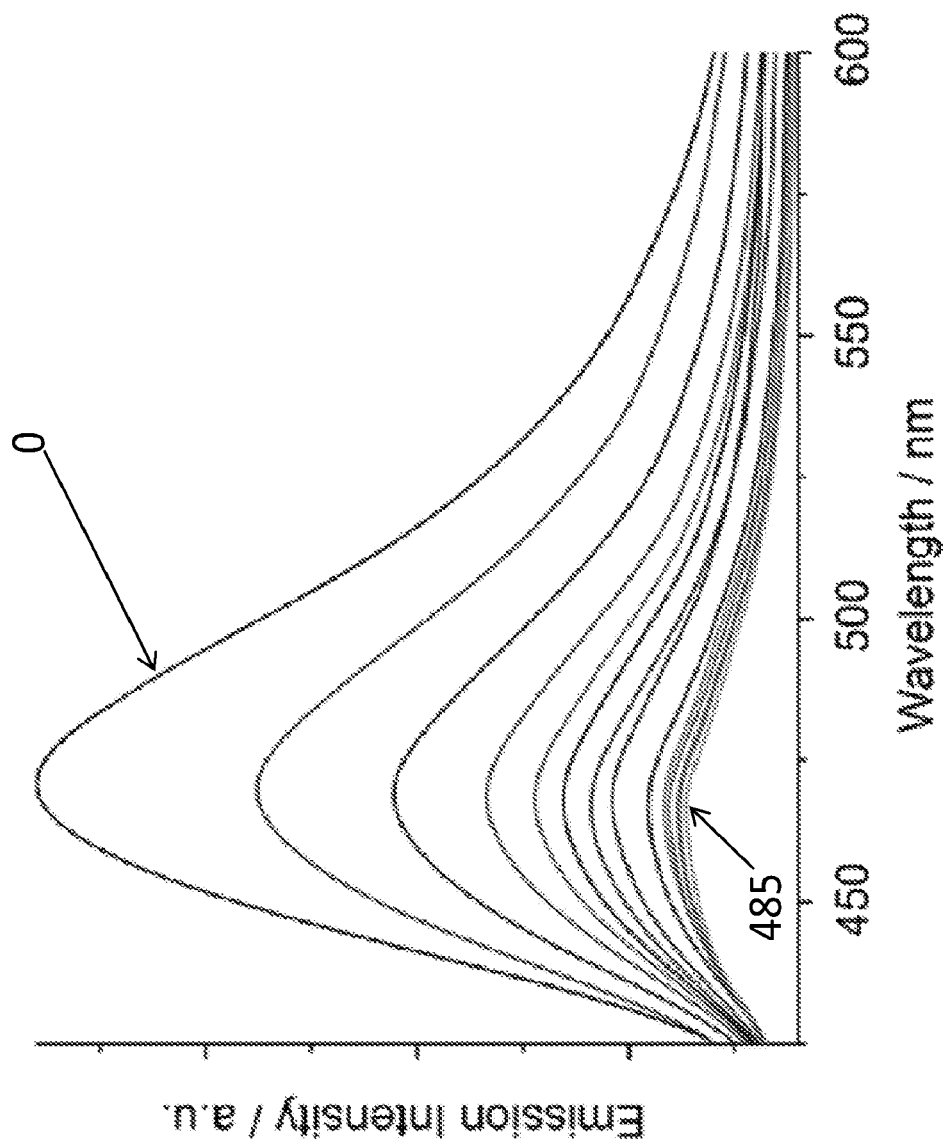
FIG. 33 depicts fluorescence titration ($\lambda_{exc}$=360 nm) of activated MOR-2 suspended in water upon the gradual addition of a $10^{-4}$ M aqueous solution of $K_2Cr_2O_7$ [corresponding to 10.4 ppm of Cr(VI)]. The experiment was carried out at pH 3. The numbers correspond to total added Cr(VI) in ppb. The inset shows a photograph of two samples of MOR-2 suspended in water at pH 3 and illuminated with a standard laboratory UV lamp (360 nm). The left sample is free of Cr(VI) while the left contains 500 ppb Cr(VI).

A titration experiment in which aliquots of a $10^{-4}$M aqueous standard stock solution of $K_2Cr_2O_7$ were added to a suspension of MOR-2 at pH 3 led to strong fluorescence quenching (FIG. 33). The fluorescence intensity continually decreased with concentrations of 25 ppm, 51 ppm, 76 ppm, 101 ppm, 126 ppm, 151 ppm, 180 ppm, 210 ppm, 249 ppm, 297 ppm, 345 ppm, 392 ppm, and 485 ppm. At the end of the titration, loss of more than 80% of the initial emission signal was observed, which was also evident to the naked eye. Notably, the MOR-2 was activated overnight in 4 M HCl prior to its use in order to ensure that pyridine and amino moieties were fully protonated. At this pH and at the low concentrations of the fluorescence experiments, Cr(VI) in solution was almost totally in the form of $HCrO_4^-$ ions. In the theoretical work of the previous section it is shown that $HCrO_4^-$ may interact via charge-assisted hydrogen bonding with the $[ArNH_2CH_2PyH]^{2+}$ units of MOR-2. However, it is more possible that once $HCrO_4^-$ ions enter the pores of MOR-2, the equilibrium $2HCrO_4^- \rightleftharpoons Cr_2O_7^{2-}+H_2O$ shifts to the right for two reasons: i) the concentration of Cr(VI) within the pores is greater than that in solution; and ii) the dichromate species is able to interact more strongly with the $[ArNH_2CH_2PyH]^{2+}$ units via the formation of three charge-assisted hydrogen bonds, thereby providing a driving force which renders its formation more favorable. A superposition of the absorption spectrum of MOR-2@$Cr_2O_7^{2-}$ and the emission spectrum of MOR-2 showed that there was a clear overlap between the latter and the absorption features attributable to the dichromate ion. Therefore, the observed emission quenching in the titration experiment may have been a result of energy transfer from the excited n-π* levels of the aromatic bridging ligands to the dichromate LMCT transitions. Additionally, given the great oxidizing ability of dichromates and the electron-donating nature of amino terephthalate derivatives, it is also highly possible that the quenching mechanism involved a bridging ligand to Cr(VI) electron transfer component.

Analysis of the calibration curve of the fluorescence titration allowed the limits of detection (LOD) and quantification (LOQ) at 4 and 13 ppb, respectively, to be determined. These values demonstrated the extremely high sensitivity of MOR-2 towards Cr(IV), as both the LOD and LOQ values were well below the EU and US EPA acceptable levels of Cr(VI) in water (50 and 100 ppb respectively).

Figure 34A:
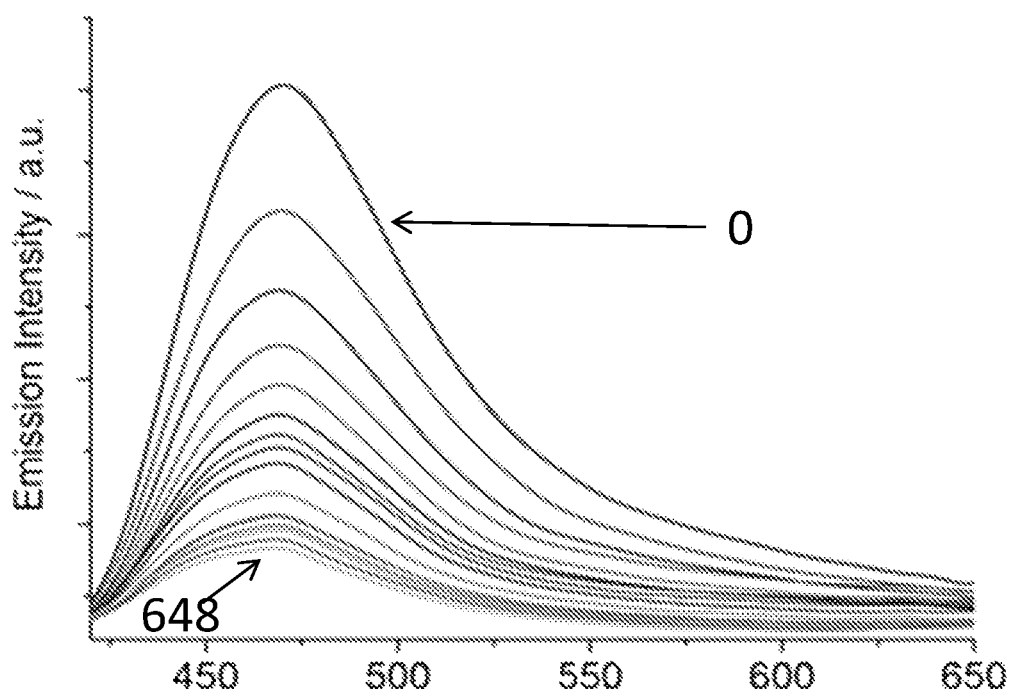
FIG. 34A shows fluorescence titrations ($\lambda_{exc}$=360 nm) of activated MOR-2 with 10 ppm M stock solution of a chromium plating waste sample, with MOR-2 suspended in distilled water. The experiment was carried out at pH 3, and the numbers represent total added Cr(VI) in ppb.
Figure 34B:
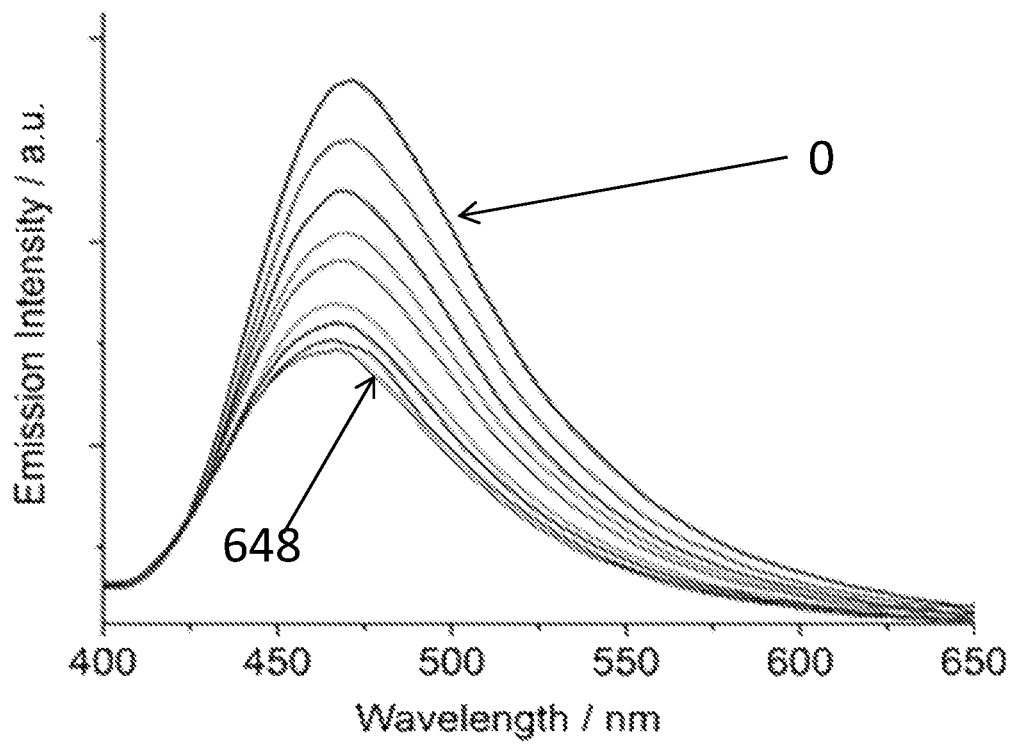
FIG. 34B shows fluorescence titrations ($\lambda_{exc}$=360 nm) of activated MOR-2 with 10 ppm M stock solution of a chromium plating waste sample, with MOR-2 suspended in potable water containing 10.5 ppm $SO_4^{2-}$ and 7.1 ppm $NO_3^-$. The experiment was carried out at pH 3, and the numbers represent total added Cr(VI) in ppb.

To further assess the sensing ability of MOR-2 towards Cr(IV) in real samples, two additional sensing experiments were performed using the lower concentration chrome plating waste sample B (vide supra) as a stock solution, after adjusting its pH to 3 and diluting it to achieve a Cr(VI) concentration of 10 ppm. In the first experiment, distilled water was used as a solvent both for the dilution of the Cr(VI) sample and as a suspension medium for MOR-2, while in the second experiment distilled water was replaced with potable water containing 10.5 ppm of the main competing anion $SO_4^{2-}$ (vide supra). As seen in FIG. 34A, in the first experiment, the system showed comparable response as in the case of the standard Cr(VI) sample, giving LOD and LOQ values of 6 and 18 ppb, respectively. However, when potable water was used as solvent (FIG. 34B), a considerable decrease in sensitivity, with LOD and LOQ values of 35 and 110 ppb, respectively, was observed. These results are in agreement with the competition results described above, which showed that in the presence of excess $SO_4^{2-}$ ions, the selectivity of MOR 2 towards dichromate ions was somewhat hindered. As shown in FIG. 34A, in the first experiment, the fluorescence intensity continually decreased with concentrations of 29 ppm, 57 ppm, 85 ppm, 113 ppm, 141 ppm, 169 ppm, 196 ppm, 224 ppm, 279 ppm, 333 ppm, 387 ppm, 440 ppm, 492 ppm, 545 ppm, and 648 ppm. As shown in FIG. 34B, in the second experiment, the fluorescence intensity continually decreased with concentrations of 57 ppm, 113 ppm, 169 ppm, 224 ppm, 333 ppm, 440 ppm, 545 ppm, and 645 ppm. Nevertheless, even in the latter case the LOD value was lower than the acceptable levels of Cr(VI) in water.

Conclusions

In conclusion, MOR-2, a microporous $Zr^{4+}$ MOF with pyridinium-methyl-ammonium functional groups, was described. MOR-2 was synthesized via direct solvothermal reaction of $Zr^{4+}$ salt and a pre-functionalized ligand, a strategy that ensured incorporation of the highest possible number of functional groups. MOR-2 represented a unique sorbent with capability to effectively capture both chromate and dichromate species. In fact, MOR-2 exhibited the highest capacity and the fastest kinetics for Cr(VI) sorption among all known materials. Remarkably, MOR-2 could sorb selectively Cr(VI) not only from synthetic solutions, but also from industrial waste and drinking water. The composite of MOR-2 with alginic acid (MOR-2-HA) was also prepared. Extensive Cr(VI) sorption studies were carried out with an ion exchange column filled mainly with silica sand and only a small quantity of MOR-2-HA (1-2 wt %). Such a simple and relatively inexpensive ion exchange column would be capable of decontaminating a large variety of Cr(VI)-containing solutions, including industrial waste with either high or quite low Cr(VI) content. The column could easily be regenerated by treating it with HCl solution and would be reusable for several cycles, a significant aspect for applications in wastewater treatment.

Theoretical studies revealed that MOR-2, through its functional groups, was involved in relatively strong interactions with the Cr(VI) species, with the interaction energies ranging from −11.6 up to −61.3 kcal/mol. These results explained the excellent Cr(VI) sorption property of MOR-2.

Besides being an excellent sorbent, MOR-2 was also shown to be a highly efficient sensor for Cr(VI) species, as shown by fluorescence titration experiments in acidic aqueous media. Maximum LOD and LOQ values were 4 and 13 ppb, while the system showed excellent sensitivity when real-world, rather than standard, samples were used. Considerable sensitivity even in the presence of excess competing $SO_4^{2-}$ anions was observed. Therefore, MOR-2 showed great promise as a fluorescent sensor for Cr(VI) in water.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of detecting metal ions in a sample, the method comprising:
   contacting the sample comprising the metal ions with a metal organic resin comprising metal organic frameworks and associated counter anions, wherein the metal organic frameworks comprise metal nodes coordinated via organic molecular linkers to form a connected porous network and the organic molecular linkers are protonated and amine-functionalized, and further wherein the metal organic resin is able to absorb ultraviolet radiation and produce fluorescence emission;
   illuminating the sample with ultraviolet radiation, whereby the metal organic resin absorbs the ultraviolet radiation; and
   measuring the fluorescence emission intensity, the fluorescence emission profile, or both.

2. The method of claim 1, wherein the metal ions are chromate or dichromate ions.

3. The method of claim 1, wherein the metal ions are $[PdCl_4]^{2-}$ or $[PdCl_4]^{2-}$ ions.

4. The method of claim 1, wherein the metal organic resin has a formula: $[Zr_6O_4(OH)_8(H_2O)_4(H_2PATP)_4]X^-_6$, or the same formula, but with oxo ligands, aquo ligands, or a combination thereof in place of some or all of the hydroxo (OH) ligands, where $H_2PATP$ is 2: ((pyridine-1-ium-2-ylm-ethyl)ammonio)terephthalate and X is a monovalent anion.

5. The method of claim 4, wherein the metal ions comprise Cr(VI).

6. The method of claim 1, wherein the metal ions comprise Cr(VI).

7. The method of claim 1, further comprising quantifying a concentration of the metal ions by comparing the fluorescence emission intensity, the fluorescence emission profile, or both with the fluorescence emission intensity, the fluorescence emission profile, or both of a standard sample that includes the metal organic resin without the metal ions.

8. The method of claim 4, further comprising quantifying a concentration of the metal ions by comparing the fluorescence emission intensity, the fluorescence emission profile, or both with the fluorescence emission intensity, the fluorescence emission profile, or both of a standard sample that includes the metal organic resin without the metal ions.

9. The method of claim 1, wherein the counter anions are halide anions.

10. The method of claim 9, wherein the halide anions are chloride ions.

11. The method of claim 1, wherein the metal nodes are $Zr_6$ nodes.

* * * * *